(12) United States Patent
Widmer et al.

(10) Patent No.: US 10,139,238 B2
(45) Date of Patent: Nov. 27, 2018

(54) SYSTEMS, METHODS, AND APPARATUS RELATED TO GUIDANCE AND ALIGNMENT FOR AN ELECTRIC VEHICLE AND CHARGING STATION

(71) Applicant: QUALCOMM Incorporated, San Diego, CA (US)

(72) Inventors: Hanspeter Widmer, Wohlenschwil (CH); Lukas Sieber, Olten (CH); Andreas Daetwyler, Unterenfelden (CH)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/480,999

(22) Filed: Sep. 9, 2014

(65) Prior Publication Data

US 2015/0073642 A1 Mar. 12, 2015

Related U.S. Application Data

(60) Provisional application No. 61/876,702, filed on Sep. 11, 2013.

(51) Int. Cl.
*G01C 21/00* (2006.01)
*G01C 21/36* (2006.01)

(52) U.S. Cl.
CPC ......... *G01C 21/36* (2013.01); *G01C 21/3635* (2013.01)

(58) Field of Classification Search
None
See application file for complete search history.

(56) References Cited

U.S. PATENT DOCUMENTS 7,039,504 B2 5/2006 Tanaka et al.
2005/0228586 A1 10/2005 Yuasa et al.
(Continued)

FOREIGN PATENT DOCUMENTS

CN 101764435 A 6/2010
CN 103029624 A 4/2013
(Continued)

OTHER PUBLICATIONS

Machine Translation of JP2011182608.*
(Continued)

*Primary Examiner* — James M McPherson
(74) *Attorney, Agent, or Firm* — Knobbe, Martens, Olson & Bear, LLP

(57) ABSTRACT

Systems, methods, and apparatus are disclosed for guiding and aligning an electric vehicle with a charging station. In one aspect, a method of guiding an electric vehicle is provided, including determining a location of a charging spot associated to a charging base in relation to a charging coupler of the electric vehicle. The method further includes displaying an indicator of the location of the charging spot in a three dimensional perspective view, the indicator displayed for guiding a user of the electric vehicle to position a charging coupler of the electric vehicle over the charging base within a tolerance area. The method further includes transitioning to displaying the indicator of the location of the charging spot in a two dimensional top-down view based on determining that an angle between a reference point and a point on ground related to the location of the charging spot satisfies a threshold.

34 Claims, 36 Drawing Sheets

(56) References Cited

U.S. PATENT DOCUMENTS

| | | | |
|---|---|---|---|
| 2008/0158011 A1* | 7/2008 | Yamanaka | B62D 15/0275 340/932.2 |
| 2010/0161217 A1 | 6/2010 | Yamamoto | |
| 2010/0235006 A1 | 9/2010 | Brown et al. | |
| 2010/0277121 A1 | 11/2010 | Hall et al. | |
| 2011/0254503 A1 | 10/2011 | Widmer et al. | |
| 2011/0285349 A1* | 11/2011 | Widmer | B60L 11/182 320/108 |
| 2012/0095617 A1* | 4/2012 | Martin | B60L 11/1833 701/1 |
| 2012/0262002 A1 | 10/2012 | Widmer et al. | |
| 2012/0320213 A1 | 12/2012 | Ikeda et al. | |
| 2013/0162825 A1 | 6/2013 | Yoon et al. | |
| 2013/0261953 A1* | 10/2013 | Kiyama | G01C 21/3476 701/400 |
| 2014/0092236 A1* | 4/2014 | Findeisen | G06K 9/00791 348/118 |
| 2015/0061897 A1* | 3/2015 | Kees | B60L 11/1846 340/932.2 |
| 2015/0239354 A1* | 8/2015 | Gorai | B60L 3/00 307/10.1 |
| 2015/0291048 A1* | 10/2015 | Ichikawa | B60L 11/182 701/22 |

FOREIGN PATENT DOCUMENTS

| | | |
|---|---|---|
| CN | 103171552 A | 6/2013 |
| EP | 2199141 A1 | 6/2010 |
| JP | H08292715 A | 11/1996 |
| JP | 2007328570 A | 12/2007 |
| JP | 2011015549 A | 1/2011 |
| JP | 2011182608 A | 9/2011 |
| JP | 2012210008 A | 10/2012 |
| WO | WO-2012142040 A1 | 10/2012 |

OTHER PUBLICATIONS

GPS Product Review Webpage, Mar. 2007.*
International Search Report and Written Opinion—PCT/US2014/054999—ISA/EPO—dated Dec. 4, 2014.

* cited by examiner

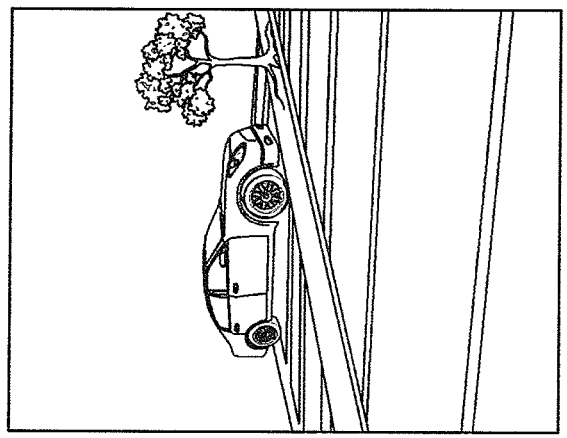
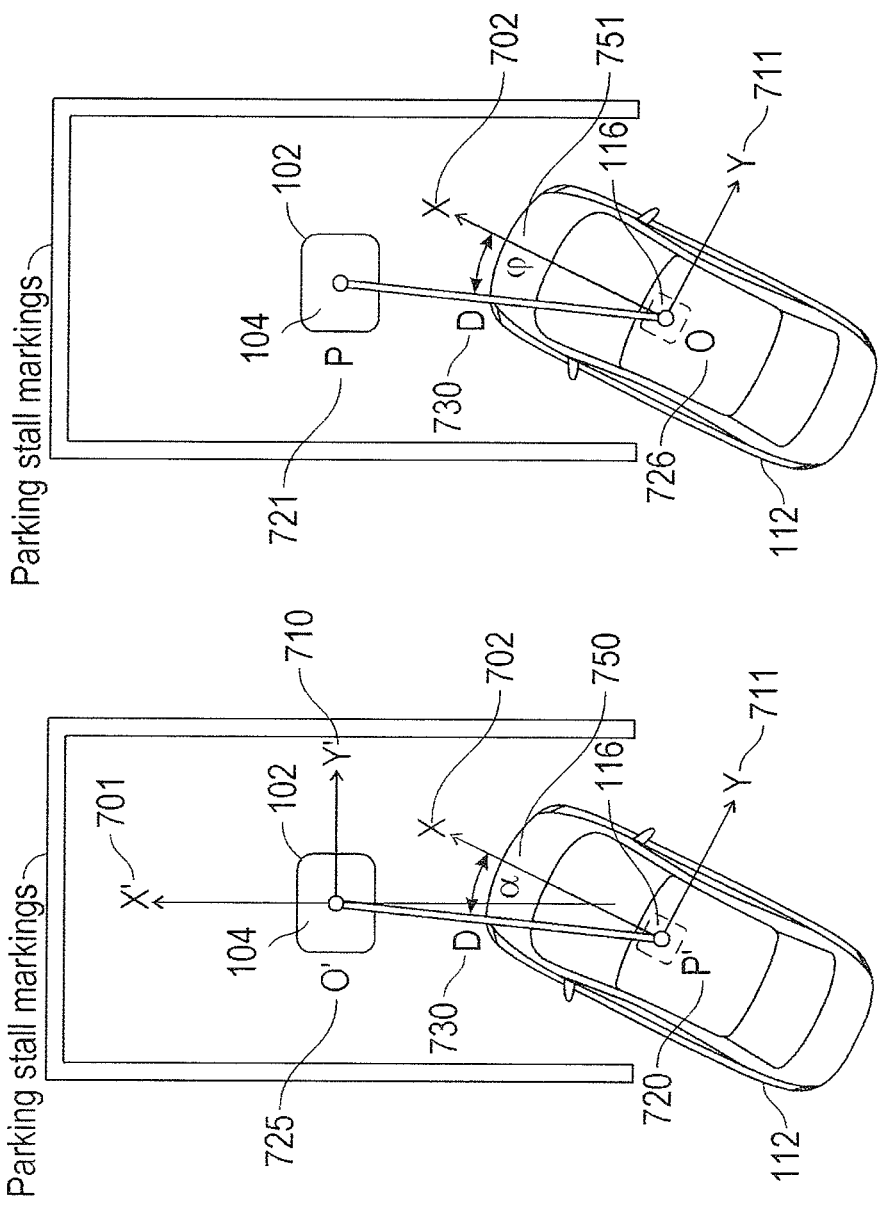
FIG. 7C
FIG. 7B
FIG. 7A

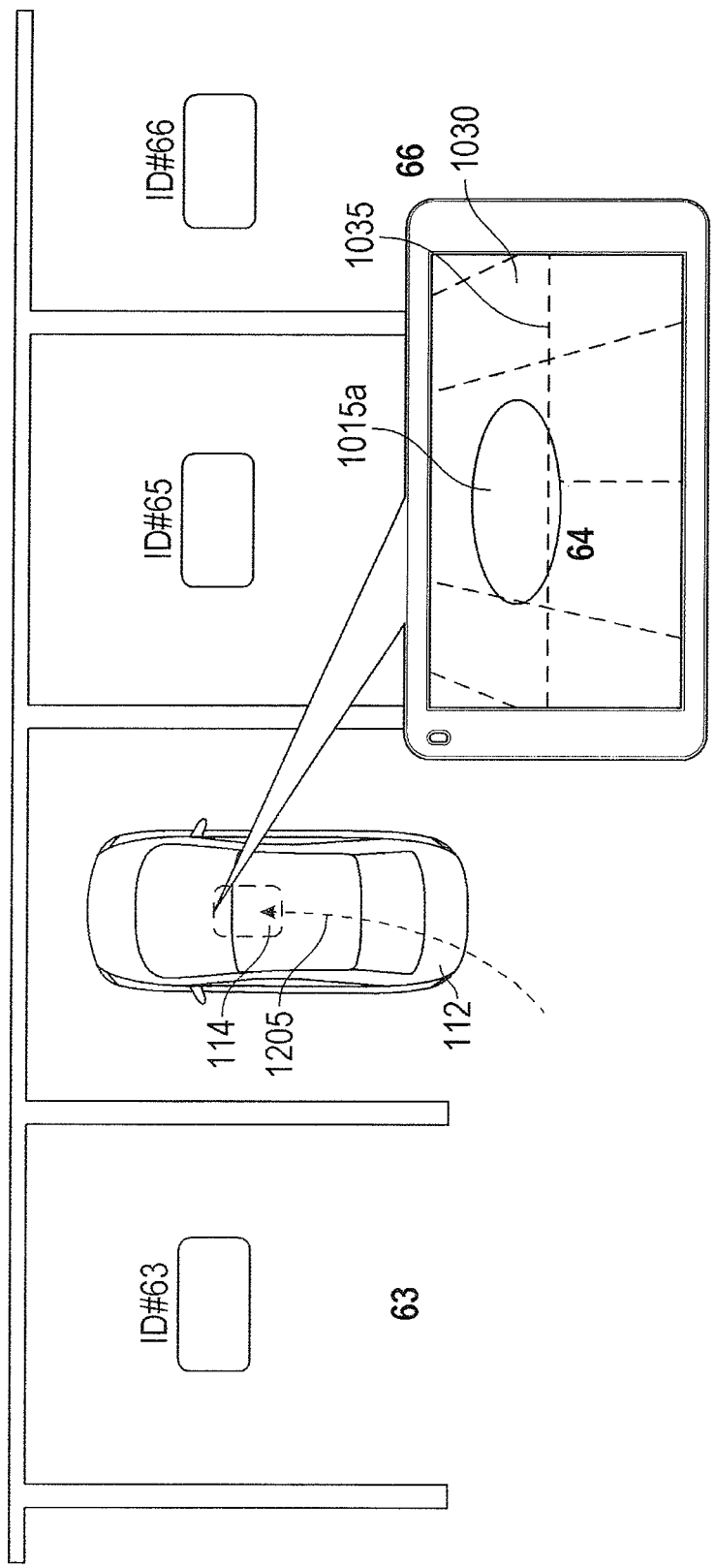

SYSTEMS, METHODS, AND APPARATUS RELATED TO GUIDANCE AND ALIGNMENT FOR AN ELECTRIC VEHICLE AND CHARGING STATION

CROSS REFERENCE TO RELATED APPLICATIONS

This application claims priority under 35 U.S.C. § 119(e) to U.S. Provisional Patent Application No. 61/876,702 entitled "SYSTEMS, METHODS, AND APPARATUS RELATED TO GUIDANCE AND ALIGNMENT FOR AN ELECTRIC VEHICLE AND CHARGING STATION" filed on Sep. 11, 2013 the disclosure of which is hereby incorporated by reference in its entirety.

FIELD

The present disclosure relates generally to wireless power transfer, and more specifically to devices, systems, and methods for guidance and alignment.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions.

A wireless charging system for electric vehicles may require transmit and receive couplers to be aligned within a certain degree. Adequate alignment of transmit and receive couplers within an electric vehicle wireless charging system may require proper positioning of an electric vehicle within a parking space, as well as fine alignment of coupler locations after the electric vehicle has been positioned within the parking space. There is a need for systems, devices, and methods related to an electric vehicle guidance system. Moreover, a need exists for devices, systems, and methods for fine alignment of couplers within an electric vehicle wireless charging system.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a device for guiding an electric vehicle. The device comprises a sensor configured to determine a location of a charging spot associated to a charging base in relation to a charging coupler of the electric vehicle. The device further comprises a processor configured to display an indicator of the location of the charging spot in a three dimensional perspective view. The location of the charging spot displayed for guiding a user of the electric vehicle to position the charging coupler of the electric vehicle over the charging base within a tolerance range. The device processor further configured to transition to displaying the indicator of the location of the charging spot in a two dimensional top-down view based on determining that an angle between a reference point and a point on ground related to the location of the charging spot satisfies a threshold.

Another aspect of the subject matter described in the disclosure provides a method for guiding an electric vehicle. The method includes determining a location of a charging spot associated to a charging base in relation to a charging coupler of an electric vehicle. The method further includes displaying an indicator of the location of the charging spot in a three dimensional perspective view. The location of the charging spot displayed for guiding a user of the electric vehicle to position the charging coupler of the electric vehicle over the charging base within a tolerance area. The method further includes transitioning to displaying the indicator of the location of the charging spot in a two dimensional top-down view based on determining that an angle between a reference point and a point on ground related to the location of the charging spot satisfies a threshold.

Another aspect of the subject matter described in the disclosure provides an apparatus for guiding an electric vehicle. The apparatus comprises means for determining a location of a charging spot associated to a charging base in relation to a charging coupler of an electric vehicle. The apparatus further comprises means for displaying an indicator of the location of the charging spot in a three dimensional perspective view. The location of the charging spot displayed for guiding a user of the electric vehicle to position the charging coupler of the electric vehicle over the charging base within a tolerance area. The apparatus further comprises means for transitioning to displaying the indicator of the location of the charging spot in a two dimensional top-down view based on determining that an angle between a reference point and a point on ground related to the location of the charging spot satisfies a threshold.

Another aspect of the subject matter described in the disclosure provides an apparatus for guiding an electric vehicle. The apparatus comprises a sensor system configured to determine a location of a charging spot associated to a charging base in relation to a charging coupler of the electric vehicle. The apparatus further comprises a processor configured to display an indicator of the location of the charging spot, an icon representing the electric vehicle, and a trajectory from the electric vehicle to the indicator in a two dimensional top-down view, the icon displayed in a fixed position relative to the indicator, the location of the charging spot and the trajectory displayed for guiding a user of the electric vehicle to position the charging coupler of the electric vehicle over the charging base within a tolerance area. The processor further configured to transition to displaying the indicator of the location of the charging spot and a cross-hair icon in a two dimensional top-down view based on determining that an angle between a reference point and a point on ground related to the location of the charging spot satisfies a threshold, the cross-hair icon representing a center position of the charging coupler of the electric vehicle and displayed in a fixed position relative to the indicator.

BRIEF DESCRIPTION OF THE DRAWINGS

FIG. 7A illustrates an electric vehicle entering a parking stall equipped with a charging base also showing a ground-based and a vehicle-based coordinate system as they may be needed to define a positional relationship.

FIG. 7B illustrates an electric vehicle entering a parking stall equipped with a charging base also showing a vehicle-based coordinate system as it may be needed to describe a simplified positional relationship.

FIG. 7C is a picture of a vehicle in a parking lot showing structures and parking lot markings that can be used for positioning and aligning the vehicle.

FIG. 25C illustrates an electric vehicle closely before reaching the charging spot in a scenario with a plurality of charging bases and a corresponding screenshot of an exemplary driver interface display.

Figure 1:
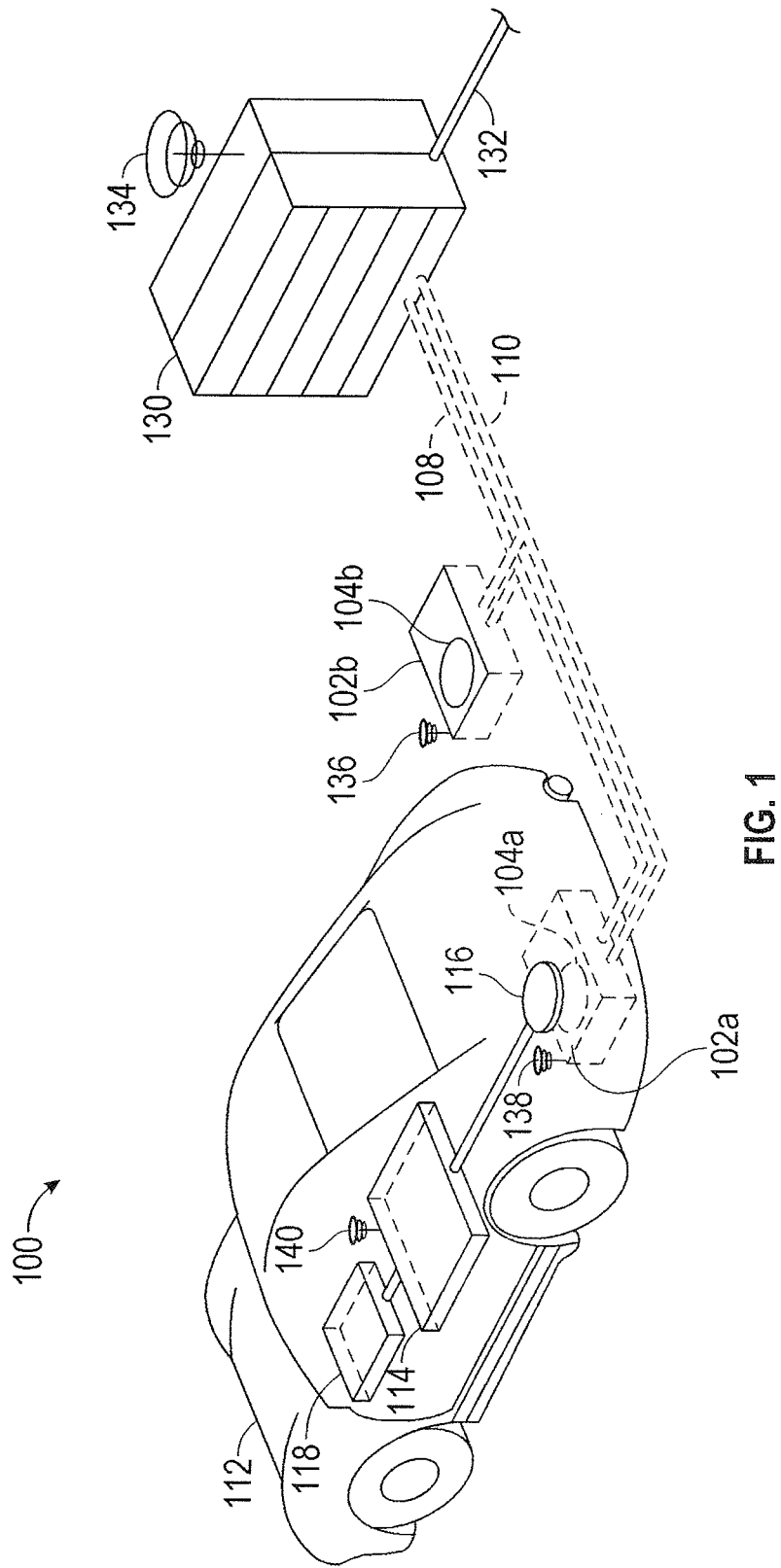
FIG. 1 illustrates an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle, in accordance with an exemplary embodiment. The wireless power transfer system 100 enables charging of an electric vehicle 112 while the electric vehicle 112 is parked such to efficiently couple with a base wireless charging system 102a. Spaces for two electric vehicles are illustrated in a parking area to be parked over corresponding base wireless charging systems 102a and 102b. In some embodiments, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also include a base coupler 104a and 104b, respectively, for wirelessly transferring (transmitting or receiving) power. In some other embodiments (not shown in FIG. 1), base couplers 104a or 104b may be stand-alone physical units and are not part of the base wireless charging system 102a or 102b.

The electric vehicle 112 may include a battery unit 118, an electric vehicle coupler 116, and an electric vehicle wireless charging unit 114. The electric vehicle wireless charging unit 114 and the electric vehicle coupler 116 constitute the electric vehicle wireless charging system. In some diagrams shown herein, the electric vehicle wireless charging unit 114 is also referred to as the vehicle charging unit (VCU). The electric vehicle coupler 116 may interact with the base coupler 104a for example, via a region of the electromagnetic field generated by the base coupler 104a.

In some exemplary embodiments, the electric vehicle coupler 116 may receive power when the electric vehicle coupler 116 is located in an energy field produced by the base coupler 104a. The field may correspond to a region where energy output by the base coupler 104a may be captured by the electric vehicle coupler 116. For example, the energy output by the base coupler 104a may be at a level sufficient to charge or power the electric vehicle 112. In some cases, the field may correspond to the "near field" of the base coupler 104a. The near-field may correspond to a region in which there are strong reactive fields resulting from the currents and charges in the base coupler 104a that do not radiate power away from the base coupler 104a. In some cases the near-field may correspond to a region that is within about $1/2\pi$ of wavelength of the base coupler 104a (and vice versa for the electric vehicle coupler 116) as will be further described below.

Local distribution center 130 may be configured to communicate with external sources (e.g., a power grid) via a communication backhaul 134, and with the base wireless charging system 102a via a communication link 108. The base common communication unit (BCC) as shown in some diagrams herein may be part of the local distribution center 130.

In some embodiments the electric vehicle coupler 116 may be aligned with the base coupler 104a and, therefore, disposed within a near-field region simply by the electric vehicle operator positioning the electric vehicle 112 such that the electric vehicle coupler 116 comes in sufficient alignment relative to the base coupler 104a. Alignment may be said sufficient when an alignment error has fallen below a tolerable value. In other embodiments, the operator may be given visual feedback, auditory feedback, or combinations thereof to determine when the electric vehicle 112 is properly placed within the tolerance area for wireless power transfer. In yet other embodiments, the electric vehicle 112 may be positioned by an autopilot system, which may move the electric vehicle 112 until sufficient alignment is achieved. This may be performed automatically and autonomously by the electric vehicle 112 without or with only minimal driver intervention. This may possible with an electric vehicle 112 that is equipped with a servo steering, radar sensors (e.g., ultrasonic sensors), and intelligence for safely maneuvering and adjusting the electric vehicle. In still other embodiments, the electric vehicle 112, the base wireless charging system 102a, or a combination thereof may have functionality for mechanically displacing and moving the couplers 116 and 104a, respectively, relative to each other to more accurately orient or align them and develop sufficient and/or otherwise more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
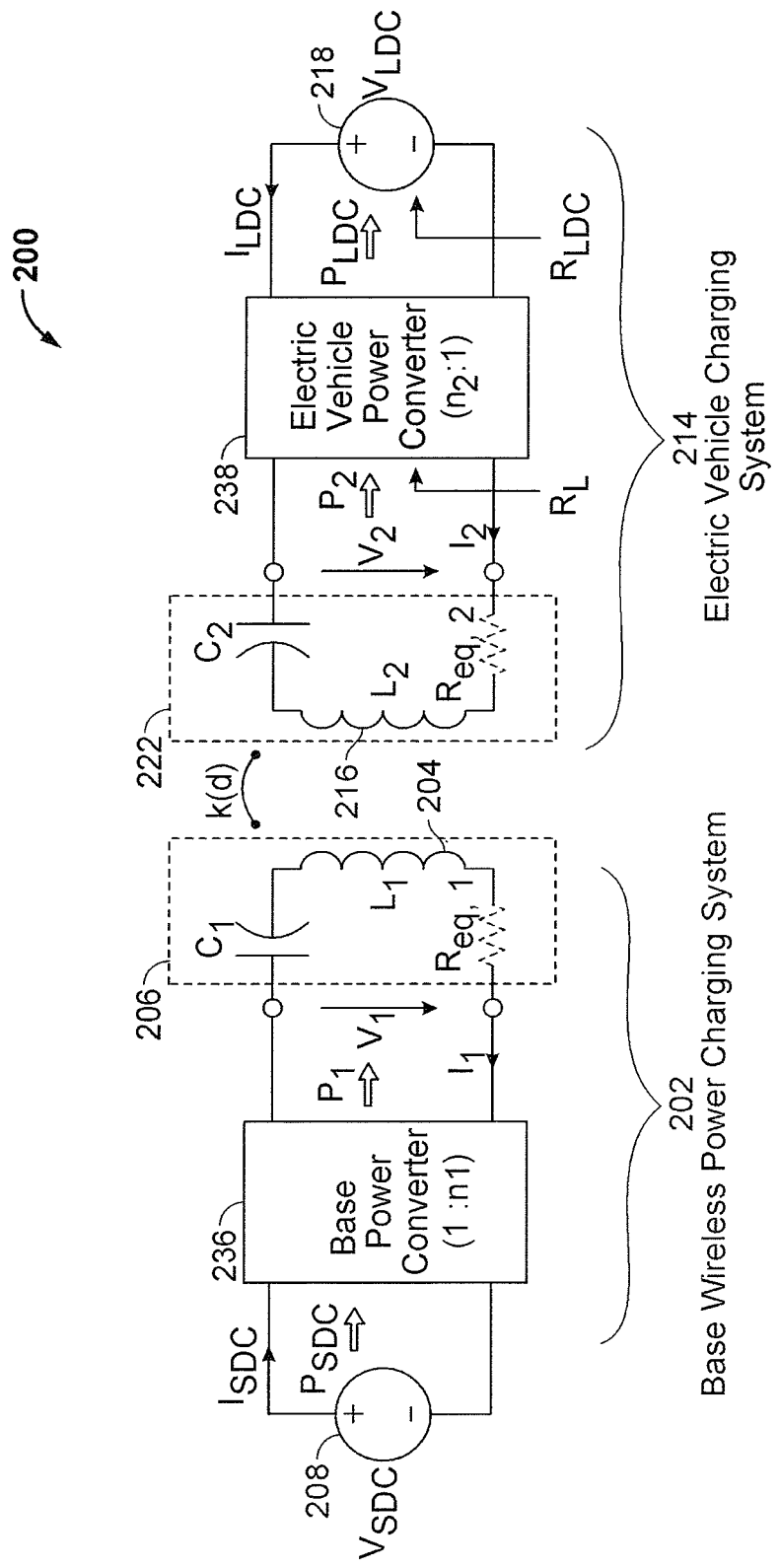
FIG. 2 is a schematic diagram of exemplary core components of the wireless power transfer system of FIG. 1.

FIG. 2 is a schematic diagram of showing exemplary components of wireless power transfer system 200, which may be employed in wireless power transfer system 100 of FIG. 1. As shown in FIG. 2, the wireless power transfer system 200 may include a base resonant circuit 206 including a base coupler 204 having an inductance $L_1$. The wireless power transfer system 200 further includes an electric vehicle resonant circuit 222 including an electric vehicle coupler 216 having an inductance $L_2$. Embodiments described herein may use capacitively loaded conductor loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle coupler 216 and the base coupler 204. Using resonant structures for coupling energy may be referred to "magnetic coupled resonance," "electromagnetic coupled resonance," and/or "resonant induction." The operation of the wireless power transfer system 200 will be described based on power transfer from a base coupler 204 to an electric vehicle 112 (not shown), but is not limited thereto. For example, as discussed above, energy may be also transferred in the reverse direction.

With reference to FIG. 2, a power supply 208 (e.g., AC or DC) supplies power $P_{SDC}$ to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 236 supplies power $P_1$ to the base resonant circuit 206 including tuning capacitor C1 in series with base coupler 204 to emit an electromagnetic field at the operating frequency. The series-tuned resonant circuit 206 should be construed exemplary. In another embodiment, the capacitor $C_1$ may be coupled with the base coupler 204 in parallel. In yet other embodiments, tuning may be formed of several reactive elements in any combination of parallel or series topology. The capacitor $C_1$ may be provided to form a resonant circuit with the base coupler 204 that resonates substantially at the operating frequency. The base coupler 204 receives the power $P_1$ and wirelessly transmits power at a level sufficient to charge or power the electric vehicle. For example, the power level provided wirelessly by the base coupler 204 may be on the order of kilowatts (kW) (e.g., anywhere from 1 kW to 110 kW or higher or lower).

The base resonant circuit 206 (including the base coupler 204 and tuning capacitor $C_1$) and the electric vehicle resonant circuit 222 (including the electric vehicle coupler 216 and tuning capacitor $C_2$) may be tuned to substantially the same frequency. The electric vehicle coupler 216 may be positioned within the near-field coupling mode region of the base coupler and vice versa, as further explained below. In this case, the base coupler 204 and the electric vehicle coupler 216 may become coupled to one another such that power may be transferred from the base coupler 204 to the electric vehicle coupler 216. The series capacitor $C_2$ may be provided to form a resonant circuit with the electric vehicle coupler 216 that resonates substantially at the operating frequency. The series-tuned resonant circuit 222 should be construed as being exemplary. In another embodiment, the capacitor $C_2$ may be coupled with the electric vehicle coupler 216 in parallel. In yet other embodiments, the electric vehicle resonant circuit 222 may be formed of several reactive elements in any combination of parallel or series topology. Element k(d) represents the mutual coupling coefficient resulting at coil separation d. Equivalent resistances $R_{eq,1}$ and $R_{eq,2}$, represent the losses that may be inherent to the base and electric vehicle couplers 204 and 216 and the tuning (anti-reactance) capacitors $C_1$ and $C_2$, respectively. The electric vehicle resonant circuit 222, including the electric vehicle coupler 216 and capacitor $C_2$, receives and provides the power $P_2$ to an electric vehicle power converter 238 of an electric vehicle charging system 214.

The electric vehicle power converter 238 may include, among other things, a LF-to-DC converter configured to convert power at an operating frequency back to DC power at a voltage level of the power sink 218 that may represent the electric vehicle battery unit. The electric vehicle power converter 238 may provide the converted power $P_{LDC}$ to the power sink 218. The power supply 208, base power converter 236, and base coupler 204 may be stationary and located at a variety of locations as discussed above. The electric vehicle power sink 218 (e.g., the electric vehicle battery unit), electric vehicle power converter 238, and electric vehicle coupler 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle coupler 216 to the base wireless power charging system 202 to feed power back to the grid. Each of the electric vehicle coupler 216 and the base coupler 204 may act as transmit or receive couplers based on the mode of operation.

While not shown, the wireless power transfer system 200 may include a load disconnect unit (LDU) to safely disconnect the electric vehicle power sink 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle coupler 216 to the electric vehicle power converter 238. Disconnecting the electric vehicle coupler 216 may suspend charging and also may change the "load" as "seen" by the base wireless power charging system 202 (acting as a transmitter), which may be used to "cloak" the electric vehicle charging system 214 (acting as the receiver) from the base wireless charging system 202. The load changes may be detected if the transmitter includes a load sensing circuit. Accordingly, the transmitter, such as the base wireless charging system 202, may have a mechanism for determining when receivers, such as the electric vehicle charging system 214, are present in the near-field coupling mode region of the base coupler 204 as further explained below.

As described above, in operation, during energy transfer towards the electric vehicle (e.g., electric vehicle 112 of FIG. 1), input power is provided from the power supply 208 such that the base coupler 204 generates an electromagnetic field for providing the energy transfer. The electric vehicle coupler 216 couples to the electromagnetic field and generates output power for storage or consumption by the electric vehicle 112. As described above, in some embodiments, the base resonant circuit 206 and electric vehicle resonant circuit 222 are configured and tuned according to a mutual resonant relationship such that they are resonating nearly or substantially at the operating frequency. Transmission losses between the base wireless power charging system 202 and electric vehicle charging system 214 are minimal when the electric vehicle coupler 216 is located in the near-field coupling mode region of the base coupler 204 as further explained below.

As stated, an efficient energy transfer occurs by transferring energy via an electromagnetic near-field rather than via electromagnetic waves in the far field, which may involve substantial losses due to radiation into the space. When in the near field, a coupling mode may be established between the transmit coupler and the receive coupler. The space around the couplers where this near field coupling may occur is referred to herein as a near field coupling mode region.

While not shown, the base power converter 236 and the electric vehicle power converter 238 if bidirectional may both include for the transmit mode an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle coupler 216 and base coupler 204 as described throughout the disclosed embodiments may be referred to or configured as "conductor loops", and more specifically, "multi-turn conductor loops" or coils. The base and electric vehicle couplers 204 and 216 may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 206) including a coupler (e.g., the base coupler 204 and capacitor $C_2$) as described above. As shown in FIG. 2, inductance may generally be the inductance of the coupler, whereas, capacitance may be added to the coupler to create a resonant structure at a desired resonant frequency. Accordingly, for larger size couplers using larger diameter coils exhibiting larger inductance, the value of capacitance needed to produce resonance may be lower. Inductance may also depend on a number of turns of a coil. Furthermore, as the size of the coupler increases, coupling efficiency may increase. This is mainly true if the size of both base and electric vehicle couplers increase. Furthermore a resonant circuit including coupler and tuning capacitor may be designed to have a high quality (Q) factor to improve energy transfer efficiency. For example, the Q factor may be 300 or greater.

As described above, according to some embodiments, coupling power between two couplers that are in the near field of one another is disclosed. As described above, the near field may correspond to a region around the coupler in which mainly reactive electromagnetic fields exist. If the physical size of the coupler is much smaller than the wavelength related to the frequency, there is no substantial loss of power due to waves propagating or radiating away from the coupler. Near-field coupling-mode regions may correspond to a volume that is near the physical volume of the coupler, typically within a small fraction of the wavelength. According to some embodiments, magnetic couplers, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" couplers (e.g., dipoles and monopoles) or a combination of magnetic and electric couplers may be used.

Figure 3:
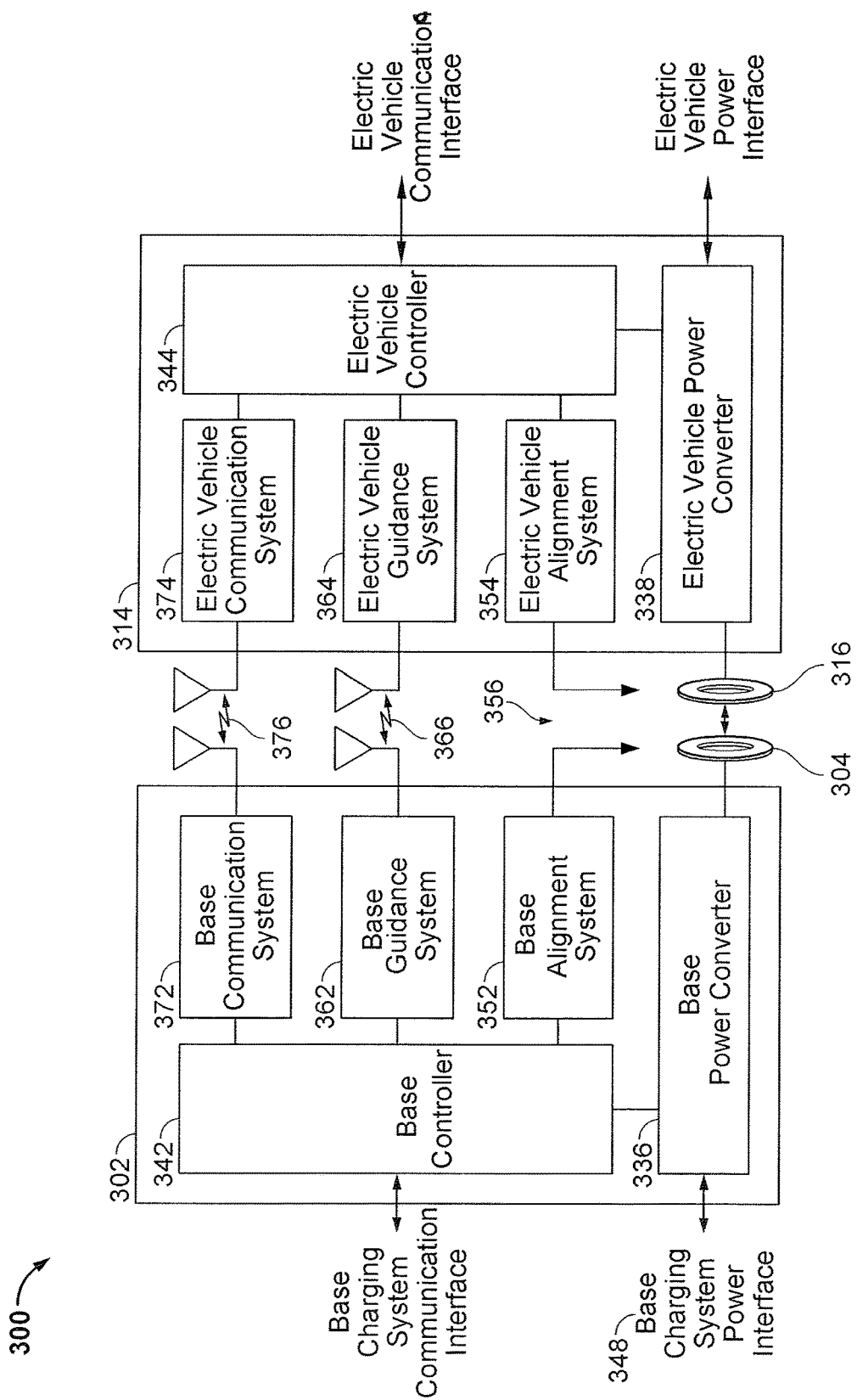
FIG. 3 is a functional block diagram showing exemplary core and ancillary components of the wireless power transfer system of FIG. 1.

FIG. 3 is a functional block diagram showing exemplary components of wireless power transfer system 300, which may be employed in wireless power transfer system 100 of FIG. 1 and/or in which wireless power transfer system 200 of FIG. 2 may be part of. The wireless power transfer system 300 illustrates a communication link 376, a guidance link 366, using, for example, a magnetic field signal for determining a position or direction, and an alignment mechanism 356 capable of mechanically moving one or both of the base coupler 304 and the electric vehicle coupler 316. Mechanical (kinematic) alignment of the base coupler 304 and the electric vehicle coupler 316 may be controlled by the base alignment system 352 and the electric vehicle charging alignment system 354, respectively. The guidance link 366 may be capable of bi-directional signaling, meaning that guidance signals may be emitted by the base guidance system or the electric vehicle guidance system or by both. As described above with reference to FIG. 1, when energy flows towards the electric vehicle 112, in FIG. 3 a base charging system power interface 348 may be configured to provide power to a base power converter 336 from a power source, such as an AC or DC power supply (not shown). The base power converter 336 may receive AC or DC power via the base charging system power interface 348 to drive the base coupler 304 at a frequency near or at the resonant frequency of the base resonant circuit 206 with reference to FIG. 2. The electric vehicle coupler 316, when in the near field coupling-mode region, may receive energy from the electromagnetic field to oscillate at or near the resonant frequency of the electric vehicle resonant circuit 222 with reference to FIG. 2. The electric vehicle power converter 338 converts the oscillating signal from the electric vehicle coupler 316 to a power signal suitable for charging a battery via the electric vehicle power interface.

The base wireless charging system 302 includes a base controller 342 and the electric vehicle charging system 314 includes an electric vehicle controller 344. The base controller 342 may provide a base charging system communication interface to other systems (not shown) such as, for example, a computer, a base common communication (BCC), a communications entity of the power distribution center, or a communications entity of a smart power grid. The electric vehicle controller 344 may provide an electric vehicle communication interface to other systems (not shown) such as, for example, an on-board computer on the vehicle, a battery management system, other systems within the vehicles, and remote systems.

The base communication system 372 and electric vehicle communication system 374 may include subsystems or modules for specific application with separate communication channels and also for wirelessly communicating with other communications entities not shown in the diagram of FIG. 3. These communications channels may be separate physical channels or separate logical channels. As non-limiting examples, a base alignment system 352 may communicate with an electric vehicle alignment system 354 through communication link 376 to provide a feedback mechanism for more closely aligning the base coupler 304 and the electric vehicle coupler 316, for example via autonomous mechanical (kinematic) alignment, by either the electric vehicle alignment system 352 or the base alignment system 302, or by both, or with operator assistance as described herein. Similarly, a base guidance system 362 may communicate with an electric vehicle guidance system 364 through communication link 376 and also using a guidance link 366 for determining a position or direction as needed to guide an operator to the charging spot and in aligning the base coupler 304 and electric vehicle coupler 316. In some embodiments, communications link 376 may comprise a plurality of separate, general-purpose communication channels supported by base communication system 372 and electric vehicle communication system 374 for communicating other information between the base wireless charging system 302 and the electric vehicle charging system 314. This information may include information about electric vehicle characteristics, battery characteristics, charging status, and power capabilities of both the base wireless charging system 302 and the electric vehicle charging system 314, as well as maintenance and diagnostic data for the electric vehicle. These communication channels may be separate logical channels or separate physical communication channels such as, for example, WLAN, Bluetooth, zigbee, cellular, etc.

In some embodiments, electric vehicle controller 344 may also include a battery management system (BMS) (not shown) that manages charge and discharge of the electric vehicle principal and/or auxiliary battery. As discussed herein, base guidance system 362 and electric vehicle guidance system 364 include the functions and sensors as needed for determining a position or direction, e.g., based on microwave, ultrasonic radar, or magnetic vectoring principles. Further, electric vehicle controller 344 may be configured to communicate with electric vehicle onboard systems. For example, electric vehicle controller 344 may provide, via the electric vehicle communication interface, position data, e.g., for a brake system configured to perform a semi-automatic parking operation, or for a steering servo system configured to assist with a largely automated parking "park by wire" that may provide more convenience and/or higher parking accuracy as may be needed in certain applications to provide sufficient alignment between base and electric vehicle couplers 304 and 316. Moreover, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may include other ancillary systems such as detection and sensor systems (not shown). For example, the wireless power transfer system 300 may include sensors for use with systems to determine a position as required by the guidance system (362, 364) to properly guide the driver or the vehicle to the charging spot, sensors to mutually align the couplers with the required separation/coupling, sensors to detect objects that may obstruct the electric vehicle coupler 316 from moving to a particular height and/or position to achieve coupling, and safety sensors for use with systems to perform a reliable, damage free, and safe operation of the system. For example, a safety sensor may include a sensor for detection of presence of animals or children approaching the base and electric vehicle couplers 304, 316 beyond a safety radius, detection of metal objects located near or in proximity of the base or electric vehicle coupler (304, 316) that may be heated up (induction heating), and for detection of hazardous events such as incandescent objects near the base or electric vehicle coupler (304, 316).

The wireless power transfer system 300 may also support plug-in charging via a wired connection, for example, by providing a wired charge port (not shown) at the electric vehicle charging system 314. The electric vehicle charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle charging system 314, the wireless power transfer system 300 may use in-band signaling via base and electric vehicle couplers 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle couplers 304 and 316 may also be configured to act as wireless communication couplers or antennas. Thus, some embodiments of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base power converter 336 may include a load sensing circuit (not shown) for detecting the presence or absence of active electric vehicle power receivers in the near-field coupling mode region of the base coupler 304. By way of example, a load sensing circuit monitors the current flowing to a power amplifier of the base power converter 336, which is affected by the presence or absence of active power receivers in the near-field coupling mode region of the base coupler 304. Detection of changes to the loading on the power amplifier may be monitored by the base controller 342 for use in determining whether to enable the base wireless charging system 302 for transmitting energy, to communicate with a receiver, or a combination thereof.

To enable wireless high power transfer, some embodiments may be configured to transfer power at a frequency in the range from 10-150 kHz. This low frequency coupling may allow highly efficient power conversion that may be achieved using solid state switching devices. In some embodiments, the wireless power transfer systems 100, 200, and 300 described herein may be used with a variety of electric vehicles 112 including rechargeable or replaceable batteries.

Figure 4:
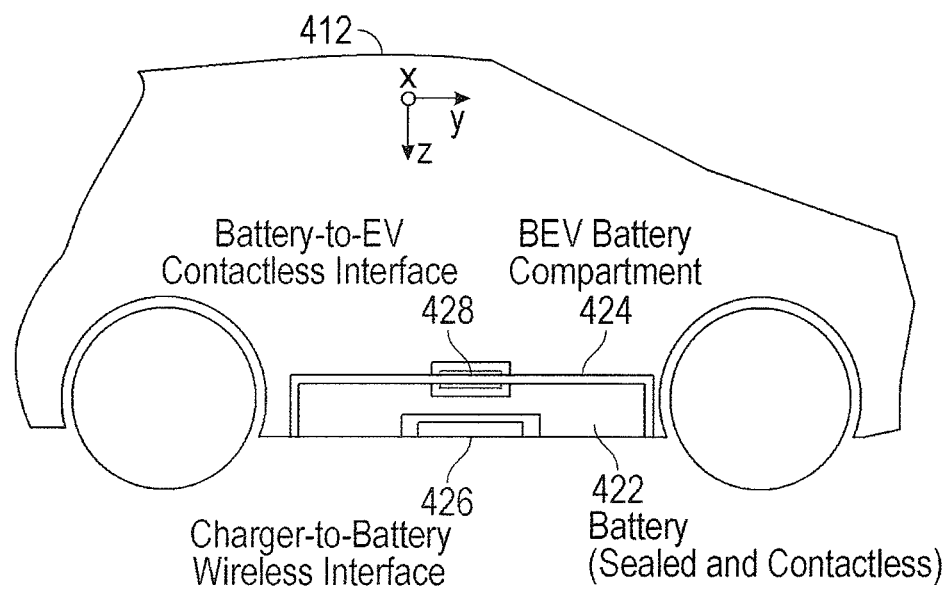
FIG. 4 illustrates the concept of a replaceable contactless battery disposed in an electric vehicle, in accordance with an exemplary embodiment of the invention.

FIG. 4 is a functional block diagram showing a replaceable contactless battery disposed in an electric vehicle 412, in accordance with an exemplary embodiment of the invention. In this embodiment, the low battery position may be useful for an electric vehicle battery unit (not shown) that integrates a wireless power interface (e.g., a charger-to-battery wireless interface 426) and that may receive power from a ground-based wireless charging unit (not shown), e.g., embedded in the ground. In FIG. 4, the electric vehicle battery unit may be a rechargeable battery unit, and may be accommodated in a battery compartment 424. The electric vehicle battery unit also provides the charger-to-battery wireless power interface 426, which may integrate the entire electric vehicle wireless power subsystem including a coupler, resonance tuning and power conversion circuitry, and other control and communications functions as needed for efficient and safe wireless energy transfer between the ground-based wireless charging unit and the electric vehicle battery unit.

It may be useful for a coupler of the electric vehicle (e.g., electric vehicle coupler 116) to be integrated flush with a bottom side of the electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. Beside the charger-to-battery wireless power interface 426 that may provide wireless power and communication between the electric vehicle 412 and the ground-based wireless charging unit, the electric vehicle battery unit 422 may also provide a battery-to-EV contactless interface 428, as shown in FIG. 4.

In some embodiments, and with reference to FIG. 1, the base coupler 104a and the electric vehicle coupler 116 may be in a fixed position and the couplers are brought within a near-field coupling mode region, e.g., by overall placement of the electric vehicle coupler 116 relative to the base wireless charging system 102a. However, in order to perform energy transfer rapidly, efficiently, and safely, the distance between the base coupler 104a and the electric vehicle coupler 116 may need to be reduced to improve coupling. Thus, in some embodiments, the base coupler 104a and/or the electric vehicle coupler 116 may be deployable and/or moveable in a vertical direction to bring them closer together (to reduce the air gap).

With reference to FIG. 1, the charging systems described above may be used in a variety of locations for charging the electric vehicle 112, or transferring power back to a power grid. For example, the transfer of power may occur in a parking lot environment. It is noted that a "parking area" may also be referred to herein as a "parking space" or a "parking stall." To enhance the efficiency of a wireless power transfer system 100, the electric vehicle 112 may be aligned along an X direction and a Y direction to enable the electric vehicle coupler 116 within the electric vehicle 112 to be adequately aligned with the base coupler 104a within an associated parking area.

Furthermore, the disclosed embodiments are applicable to parking lots having one or more parking spaces or parking areas, wherein at least one parking space within a parking lot may comprise the base wireless charging system 102a, in the following also referred to a charging base 102. In some embodiments, the charging base 102 may just comprise the base coupler 104a and the residual parts of the base wireless charging system are installed somewhere else. For example, a common parking area can contain a plurality of charging bases, each in a corresponding parking space of the common parking area. Guidance systems (not shown in FIG. 1) may be used to assist a vehicle operator in positioning the electric vehicle 112 in a parking area to align the electric vehicle coupler 116 within the electric vehicle 112 with the base coupler 104a as part of the base wireless charging system 102a. Guidance systems may include electronic based approaches (e.g., radio-based positioning, for example, using UWB signals, triangulation, position and/or direction finding principles based on magnetic field sensing (e.g., magnetic vectoring), and/or optical, quasi-optical and/or ultrasonic sensing methods), mechanical-based approaches (e.g., vehicle wheel guides, tracks or stops), or any combination thereof, for assisting an electric vehicle operator in positioning the electric vehicle 112 to enable the electric vehicle coupler 116 within the electric vehicle 112 to be adequately aligned with a base coupler 104a.

As discussed above, the electric vehicle charging unit 114 may be placed on the underside of the electric vehicle 112 for transmitting/receiving power to/from the base wireless charging system 102a. For example, the electric vehicle coupler 116 may be integrated into the vehicles underbody preferably near a center position providing maximum safety distance in regards to electromagnetic field exposure and permitting forward and reverse parking of the electric vehicle.

Figure 5A:
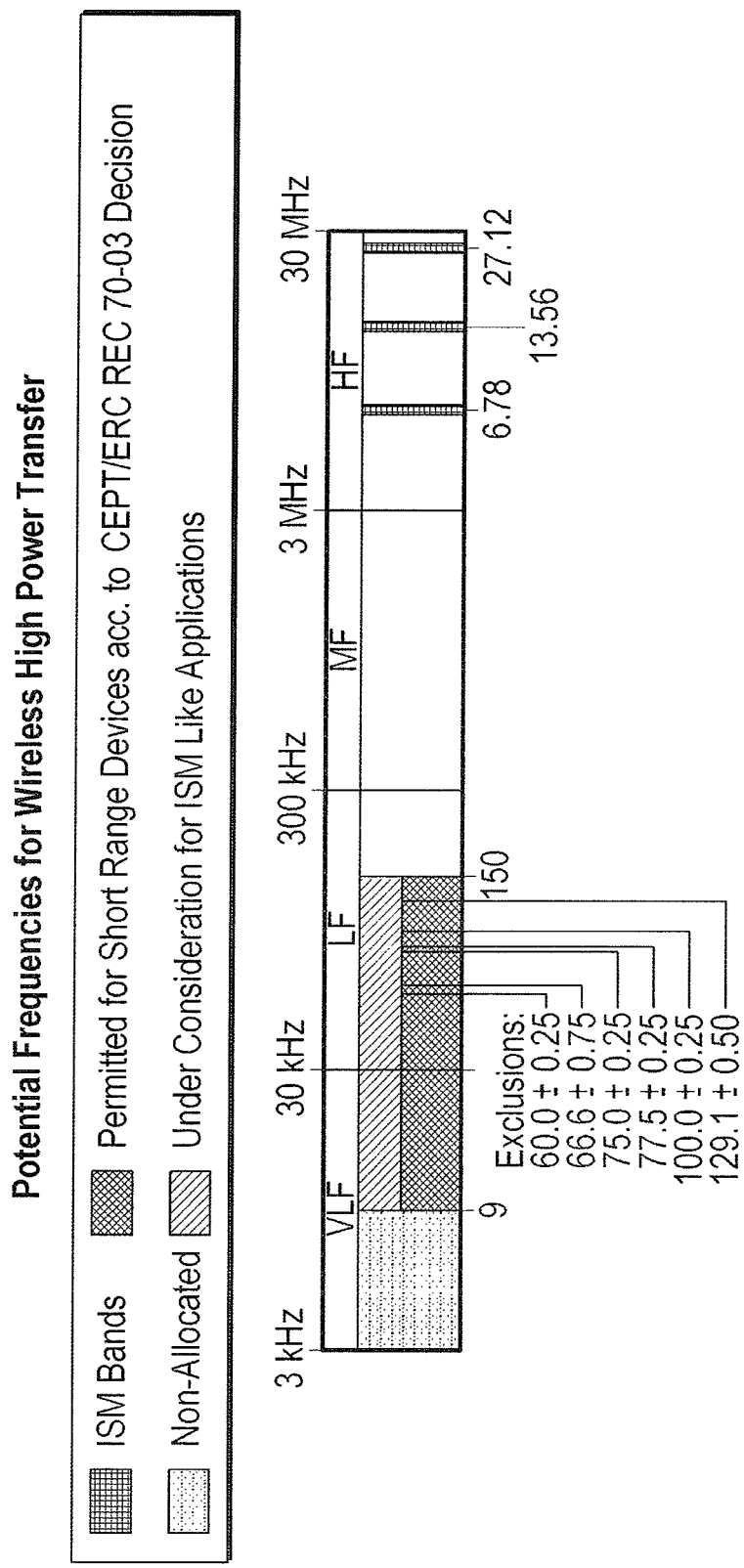
FIG. 5A is a chart of a frequency spectrum showing exemplary frequencies that may be used for wireless charging of an electric vehicle, in accordance with an exemplary embodiment of the invention.

FIG. 5A is a chart of a frequency spectrum showing exemplary frequencies that may be used for wireless charging the electric vehicle 112, in accordance with an exemplary embodiment of the invention. As shown in FIG. 5A, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 5B:
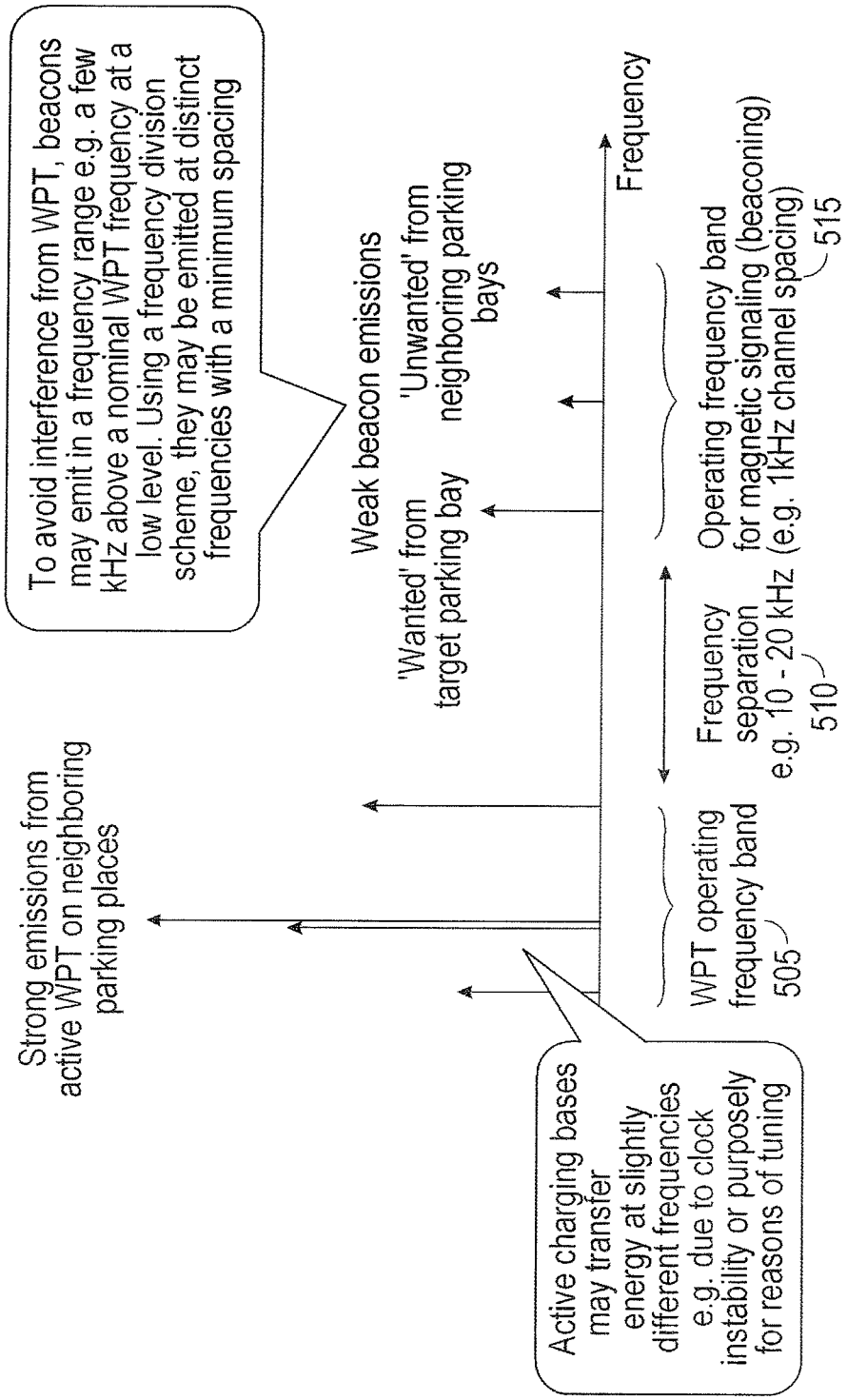
FIG. 5B is a chart of a frequency spectrum showing exemplary frequencies that may be used for wireless charging of an electric vehicle and for providing magnetic information/beacon signals, in accordance with an exemplary embodiment of the invention.

FIG. 5B is a diagram of a portion of a frequency spectrum showing exemplary frequencies that may be used for wireless power transfer (WPT) and exemplary frequencies for the low level magnetic information, or beacon, signals that may be used for ancillary purposes in wireless charging of electric vehicles, e.g., for positioning (magnetic vectoring) or pairing of electric vehicle communication entities with base communication entities, in accordance with an exemplary embodiment. As shown in FIG. 5B, WPT may occur within a WPT operating frequency band 505 at the lower end of the frequency spectrum portion shown in FIG. 5B. As shown, active charging bases may transfer power wirelessly at slightly different frequencies within the WPT operating frequency band 505, e.g., due to frequency instability or purposely for reasons of tuning. In some embodiments the WPT operating frequency band 505 may be located within one of the potential frequency ranges depicted in FIG. 5A. In some embodiments, an operating frequency band for magnetic signaling (beaconing) 515 may be offset from the WPT operating frequency band 505 by a frequency separation 510 to avoid interference. It may be located above the WPT operating frequency band 505 as shown in FIG. 5B. In some aspects, the frequency separation may comprise an offset of 10-20 kHz or more. In some aspects, using a frequency division scheme, active charging bases may emit magnetic beacons at distinct frequencies with certain channel spacing. In some aspects, the frequency channel spacing within the operating frequency band for magnetic signaling (beaconing) 515 may comprise 1 kHz channel spacing.

Figure 6:
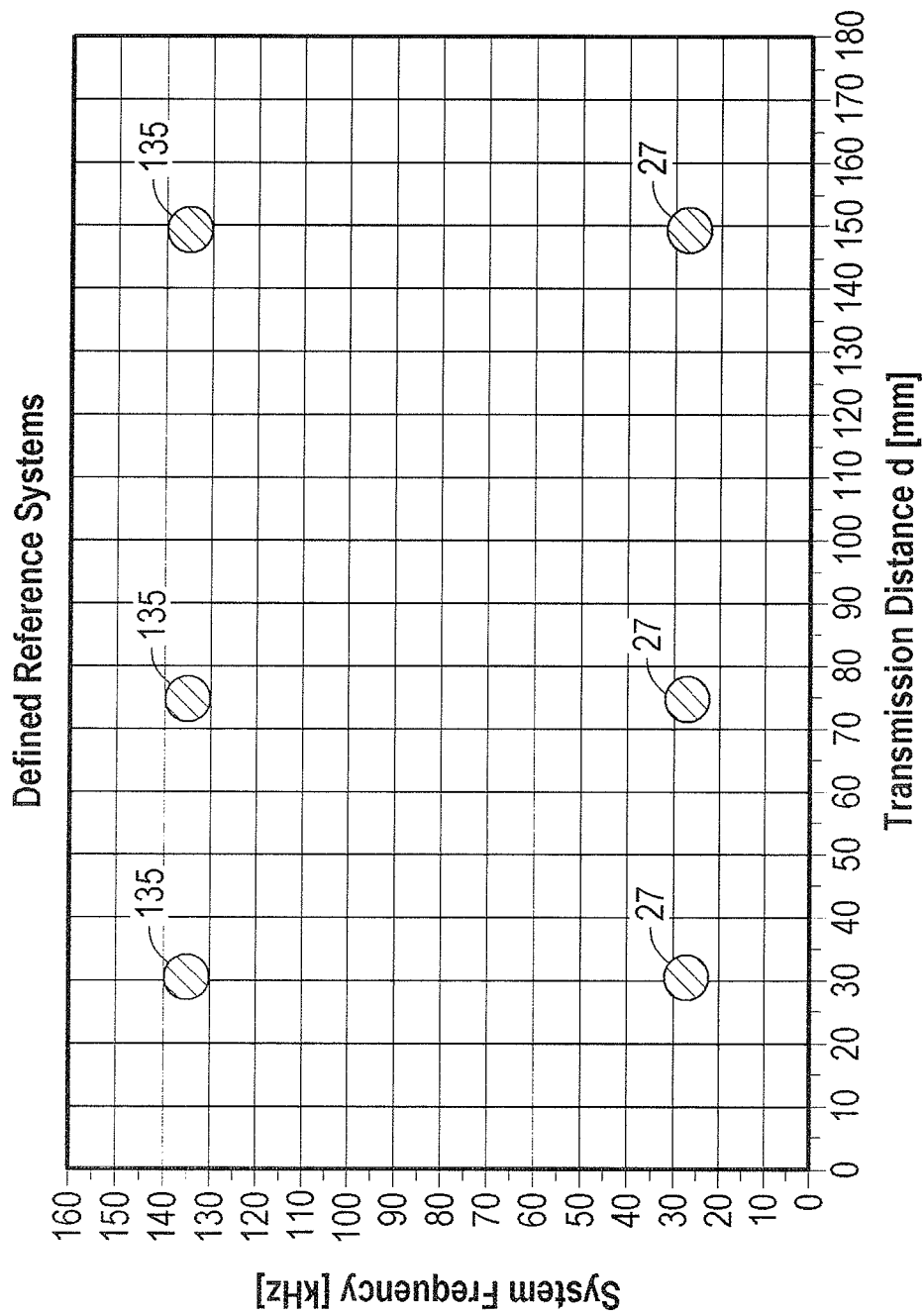
FIG. 6 is a chart showing exemplary frequencies and transmission distances that may be useful in wireless charging of electric vehicles, in accordance with an exemplary embodiment of the invention.

FIG. 6 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

During a charging cycle of the electric vehicle 112, the base wireless charging system 102a of the wireless power transfer system 100 with reference to FIG. 1 may go through various states of operation. The wireless power transfer system 100 may include one or more base wireless charging systems (e.g., 102a and 102b). The base wireless charging system 102a may include at least one of a controller and a power conversion unit, and a base coupler such as base controller 342, base power converter 336, and base coupler 304 as shown in FIG. 3. The wireless power transfer system 100 may include the local distribution center 130, as illustrated in FIG. 1, and may further include a central controller, a graphical user interface, a base common communications entity 2615 with reference to FIG. 26A, and a network connection to a remote server or group of servers.

To enhance the efficiency of a wireless power transfer system 100, the electric vehicle 112 may be aligned (e.g., using a magnetic field) along an X direction and a Y direction to enable the electric vehicle coupler 116 within the electric vehicle 112 to be adequately aligned with the base coupler 104 within an associated parking area. In order to achieve maximum power under regulatory constraints (e.g., electromagnetic field strength limits) and maximum transfer efficiencies, the alignment error between the base coupler 104a and the electric vehicle coupler 116 may be set as small as possible.

Guidance systems (such as the guidance systems 362 and 364, described above with respect to FIG. 3) may be used to assist a vehicle operator in positioning the electric vehicle 112 in a parking area to align the electric vehicle coupler 116 within the electric vehicle 112 with the base coupler 104a of the base wireless charging system 102a. When the electric vehicle coupler 116 and the base coupler 104 are aligned such that the coupling efficiency between electric vehicle coupler 116 and the base coupler 104a is above a certain threshold value, then the two are said to be within a "sweet-spot" (tolerance area) for wireless charging. This "sweet spot" area may be also defined in terms of emissions, e.g., if vehicle is parked in this tolerance area, the magnetic leakage field as measured in the surrounding of the vehicle is always below specified limits, e.g., human exposure limits.

Guidance systems may include various approaches. In one approach, guidance may include assisting an electric vehicle operator in positioning the electric vehicle on the "sweet spot" using a display or other optical or acoustic feedback based on determining a position and/or direction of the electric vehicle coupler relative to the base coupler. In another approach, guidance may include direct and automatic guiding of the vehicle based on determining a position and/or direction of the electric vehicle coupler 116 relative to the base coupler 104.

For determining a position and/or direction, various approaches may apply such as electromagnetic wave-based approaches (e.g., radio-based methods, using microwave wideband signals for propagation time measurements and triangulation), acoustic wave-based approaches (e.g., using ultrasonic waves for propagation time measurements and triangulation) optical or quasi-optical approaches (e.g., using optical sensors and electronic cameras), inertia-based approaches (e.g., using accelerometers and/or gyrometers), air pressure-based approaches (e.g., for determining floor level in a multi-story car park), inductive-based approaches (e.g., by sensing a magnetic field as generated by a WPT base coupler or other dedicated inductive loops).

In a further approach, guidance may include mechanical-based approaches (e.g., vehicle wheel guides, tracks or stops). In yet another approach, guidance may include any combination of above approaches and methods for guidance and determining a position and/or direction. The above guidance approaches may also apply for guidance in an extended area, e.g., inside a parking lot or a car park requiring a local area positioning system (e.g., indoor positioning) in which positioning refers to determining a position and/or direction.

A positioning or localization method may be considered practical and useful if it works reliably in all conditions as experienced in an automotive environment indoors (where there is no reception of a global satellite-based navigation system, such as GPS) and outdoors, in different seasonal weather conditions (snow, ice, water, foliage), at different day times (sun irradiation, darkness), with signal sources and sensors polluted (dirt, mud, dust, etc.), with different ground properties (asphalt, ferroconcrete), in presence of vehicles and other reflecting or obstructing objects (wheels of own vehicle, vehicles parked adjacent, etc.) Moreover, for the sake of minimizing infrastructure installation complexity and costs, methods not requiring installation of additional components (signal sources, antennas, sensors, etc.) external to the physical units of the base wireless charging system 302 (with reference to FIG. 3) may be preferable. This aspect may also apply to the vehicle-side. In a preferred embodiment, all vehicle-side components of the guidance system 364 including antennas and sensors are fully integrated into the physical units of the electric vehicle wireless charging system 314. Likewise, in a preferred embodiment, all base-side components of the guidance system 362 including antennas and sensors are fully integrated into the physical units of the base wireless charging system 302.

In one embodiment of an inductive-based approach and with reference to FIG. 3, either the base coupler 304 or the electric vehicle coupler 316, or any other dedicated inductive loops included in the base wireless charging system 302 or the electric vehicle charging system 314, may generate an alternating magnetic field also referred to as the "magnetic field beacon signal" or the "magnetic sense field") that can be sensed by a sensor system or circuit, which may be either included in the electric vehicle charging system 314 or included in the base wireless charging system 302, respectively. The frequency for the magnetic field beacon signal, which may be used for purposes of guidance and alignment (positioning) and pairing of communications entities, may be identical to the operating frequency of the WPT or different from the WPT frequency but low enough so that sensing for positioning takes place in the near-field. An example of one suitable frequency may be at low frequency (LF) (e.g., in the range from 20-150 kHz). The near-field property ($3^{rd}$ power law decay of field strength vs. distance) of a low frequency (LF) magnetic field beacon signal and the characteristics of the magnetic vector field pattern may be useful to determine a position with an accuracy sufficient for many cases. Furthermore, this inductive-based approach may be relatively insensitive to environmental effects as listed above. The magnetic field beacon signal may be generated using the same coil or the same coil arrangement as used for WPT. In some embodiments, one or more separate coils specifically for generating or sensing the magnetic field beacon signal may be used and may resolve some potential issues and provide a reliable and accurate solution.

In one aspect, sensing the magnetic field beacon signal may solely provide an alignment score that is representative for the WPT coupling but it may not be able to provide a vehicle operator with more information (e.g., an actual alignment error and how to correct in case of a failed parking attempt). In this aspect, the WPT coil of base and electric vehicle couplers may be used for generating and sensing the magnetic field and coupling efficiency between base and electric vehicle coupler may be determined by measuring the short circuit current or the open circuit voltage of the sensing WPT coil knowing the field generating current. The current required in this alignment (or measuring) mode may be lower than that typically used for normal WPT and the frequency may be the same.

In another aspect and with reference to FIG. 1, sensing the magnetic field may provide position information over an extended range which can be used to assist a driver in accurately parking the electric vehicle 112 in the "sweet spot" of the wireless charging station. Such a system may include dedicated active field sensors that are frequency selective and more sensitive than ordinary current or voltage transducers used in a WPT system. To comply with human exposure standards, the magnetic sense field may have to be reduced to levels below those used for measuring coupling efficiency as described above. This may be particularly true, if the base coupler 104 generates the magnetic sense field and the active surface of the base coupler 104 is not always covered by the electric vehicle 112.

In a different aspect, sensing a magnetic near field may also apply for positioning (guidance) outside a parking stall in an extended area, e.g., inside a car park. In this aspect, magnetic field sources may be road-embedded in the access aisles or drive ways.

In an embodiment of an electromagnetic-based approach, a guidance system may use ultra-wide band (UWB) technology. Techniques based on UWB technology operating at microwaves, e.g., in the K-Band (24 GHz) or E-Band (77 GHz) frequency range (for automotive use) have the potential of providing sufficient temporal resolution, enabling accurate ranging and mitigation of multi-path effects. A positioning method based on UWB may be robust enough to cope with wave propagation effects such as obstruction (e.g., obstruction by vehicle wheels), reflection (e.g. reflection from vehicles parked adjacent), diffraction as expected in a real environment assuming antennas integrated into at least one of the physical units of the base wireless charging system 102, the physical units of the electric vehicle wireless charging unit 114 and the vehicle coupler 116 as shown in FIG. 1 that is mounted at bottom of vehicle's chassis. A method based on a narrowband radio frequency (RF) technology (e.g., operating in the ultra-high frequency (UHF) band) and simply measuring radio signal strength (indicative for distance) may not provide sufficient accuracy and reliability in such an environment. As opposed to the field strength of the magnetic near field, field strength of radio waves in free space decreases only linearly with distance. Moreover signal strength may vary considerably due to fading as caused by multipath reception and path obstruction, making accurate ranging based on a signal strength vs. distance relationship difficult.

In one embodiment, either the base wireless charging system 102 or the electric vehicle 112 may emit and receive UWB signals from a plurality of integrated antennas sufficiently spaced to enable accurate triangulation. In one exemplary aspect, one or more UWB transponders are used onboard the electric vehicle 112 or in the base wireless charging system 102, respectively. A relative position can be determined by measuring signal round-trip delays and by performing triangulation.

In another aspect, either the base wireless charging system 102 or the electric vehicle 112 may emit UWB signals from a plurality of integrated antennas sufficiently spaced to enable accurate triangulation. A plurality of UWB receivers are mounted either on the electric vehicle 112 or are integrated into the base wireless charging system 102, respectively. Positioning is performed by measuring relative time of arrival (ToA) of all received signals and triangulation, similarly to a satellite-based positioning system (GPS).

In one aspect, UWB transceivers as part of the base wireless charging system 102 or an onboard system of the electric vehicle 112 may be also used (reused) for detection of foreign objects in a critical space, e.g., where the magnetic field as generated by the base wireless charging system 102 exceeds certain safety levels. These objects may be dead objects, e.g., metal objects subject to eddy current heating or living objects such as humans or animals subject to excessive magnetic field exposure.

FIGS. 7A and 7B show the electric vehicle 112 entering a parking stall having the charging base 102. The position of the electric vehicle coupler 116 relative to the charging base 102 may be defined in a ground-based coordinate system (x' 701, y' 710) or in a vehicle-based coordinate system (x 702, y 711) as illustrated in FIGS. 7A and 7B.

The ground-based coordinate systems may be defined as follows:
  x'-axis in parallel to the longitudinal (longer) axis of the parking stall (if outlined in parallel to the longer stripes);
  y'-axis perpendicular to the x'-axis; and
  Origin O' 725 on the magnetic center point of the base coupler 104.

The vehicle-based coordinate systems may be defined as follows:
  x-axis in parallel to the longitudinal (longer) axis of the vehicle (essentially in driving direction);
  y-axis perpendicular to the x-axis (lateral direction); and
  Origin O 726 on the magnetic center point of the electric vehicle coupler 116.

The magnetic center point in turn may be defined as the point where all symmetry axis of the magnetic field pattern as generated by the coupler intercept. This definition may apply to the base coupler 104 (primary) and the electric vehicle coupler 116 (secondary) and to any WPT coupler technology, provided that the magnetic field pattern that would be ideally generated by each of the WPT couplers exhibit two vertical symmetry planes.

A completely defined parking position may be described by (ref. FIG. 7A):
  a point P or P' defined in the vehicle-based or the ground-based coordinate system, respectively (P' 720 as shown in FIG. 7A); and
  an angle of rotation α (α 750 as shown in FIG. 7A) of the vehicle coordinate system relative to the ground coordinate system or vice versa.

An incompletely defined parking position may be described in a vehicle-based coordinate system by (ref. FIG. 7B):
  a point P $721=(x_P, y_P)$ in Cartesian coordinates; and
  a point P $721=(OP, \varphi)$ in polar coordinates.

For certain park assist applications, there may be no need for determining the skew of the vehicle relative to the parking stall. Instead, a vehicle operator may only care about correct orientation of the vehicle so that the vehicle is parked essentially parallel to the markings. If no markings are visible (e.g., due to snow), drivers may try to orient themselves on other visible objects and structures such as other parked vehicles, curbs, wheel stoppers, walls, etc. (ref. FIG. 7C) to align the vehicle. FIG. 7C is a picture of a vehicle parked in a parking lot with white parking stall markings and other visible structures. In parking lots where stalls are angled (e.g., 45 degrees), orientation may be more challenging.

As opposed to complete positioning requiring 3 values to be determined, only 2 values are needed for incomplete 2D positioning neglecting skew, potentially reducing system complexity and cost. A satellite-based Global Positioning System (GPS) is an example of a system that does not allow determining an azimuth of a vehicle with an inbuilt navigation device, if the vehicle is stationary. Only when the vehicle is moving, a direction of the movement/vehicle can be determined using subsequent position fixes (history data). To support the stationary case without history ("cold start") an additional means (e.g., a compass using the earth's magnetic field) may be desirable to provide an azimuth.

Determining the position of the charging base 102 in a vehicle's coordinate system (702, 711) as illustrated in FIG. 7B may be an approach to incomplete positioning. A positioning method based on sensing the magnetic field may directly provide the distance D 730 and the angle φ 751. For fully automatic vehicle parking with no or little driver intervention, the guidance and alignment system may rely on completely defined position data. Position of the electric vehicle coupler 116 relative to the charging base 102 may be defined in a ground-based coordinate system (x' 701, y' 710) or in a vehicle-based coordinate system (x 702, y 711) as illustrated in FIG. 7A.

A man-machine interface (MMI) (driver interface) of a global positioning system (GPS)-based automotive navigation system provides visually displayed information such as: a map indicating vehicle's instantaneous position and optionally other points of interests (Gasoline and service stations, parking, restaurants, etc.); numbers for distance to destination, to next branch-off or junction, estimated time of arrival, road speed limits and instantaneous vehicle speed; and audible information such as voice prompts for directions, warnings, speeding, etc.

As opposed to fully-automated parking (drive-by-wire), the driver may have still full control over the vehicle (steering, acceleration and breaking), thus fully responsible for the safety of parking. The driver should continuously watch out the surrounding of the vehicle for persons, objects, vehicles parked adjacent, etc., whilst staying concentrated and receptive on feedback provided by the guidance and alignment system via a driver interface. Guiding a driver to an available parking stall and aligning the electric vehicle coupler 116 with the base coupler 104 may include full reuse of current interface devices such as display, touch screen, speaker, haptic, etc. Adopting guidance and alignment systems for wireless power charging to current interface devices may provide continuity and "seamless" transitions from a global to a localized guidance system resulting in an enhanced user experience and faster user adoption.

Figure 8A:
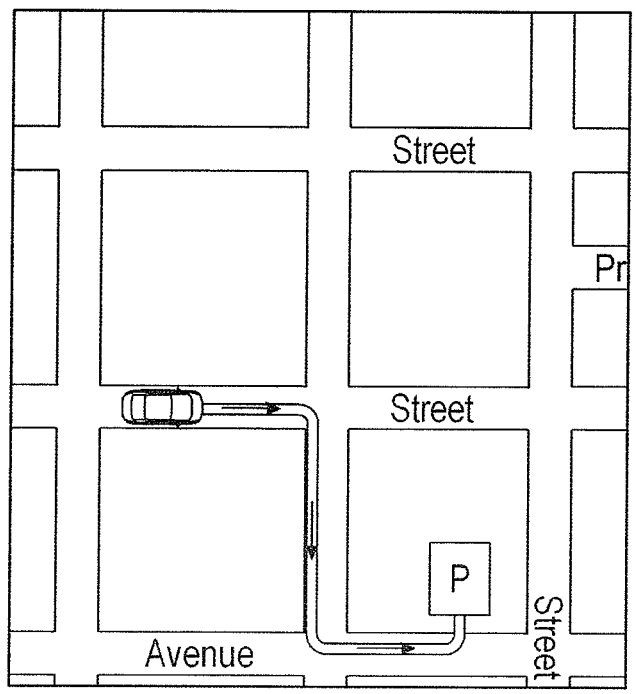
FIG. 8A shows an excerpt of a road map of an example city indicating a route to a car park and the position of the vehicle.
Figure 8B:
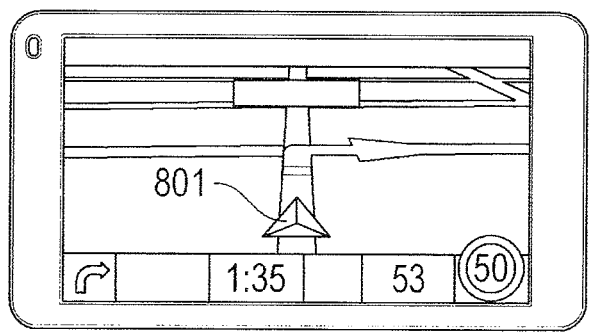
FIG. 8B is a representational screenshot of an exemplary display of a driver interface, the screenshot corresponding to the scenario shown in FIG. 8A.

FIG. 8A shows an excerpt of a map of an example city indicating a route to a car park and the position of the vehicle, the route calculated by an onboard navigation device that determines position data from signals received from a global positioning system. In this navigation mode, the screen of the driver interface may display the route map in a "bird's-eye" or "top plan" view. The view angle may represent a view from behind the vehicle icon, as shown in FIG. 8B. The vehicle's instantaneous position is indicated by the pyramid-shaped arrow 801.

Figure 9A:
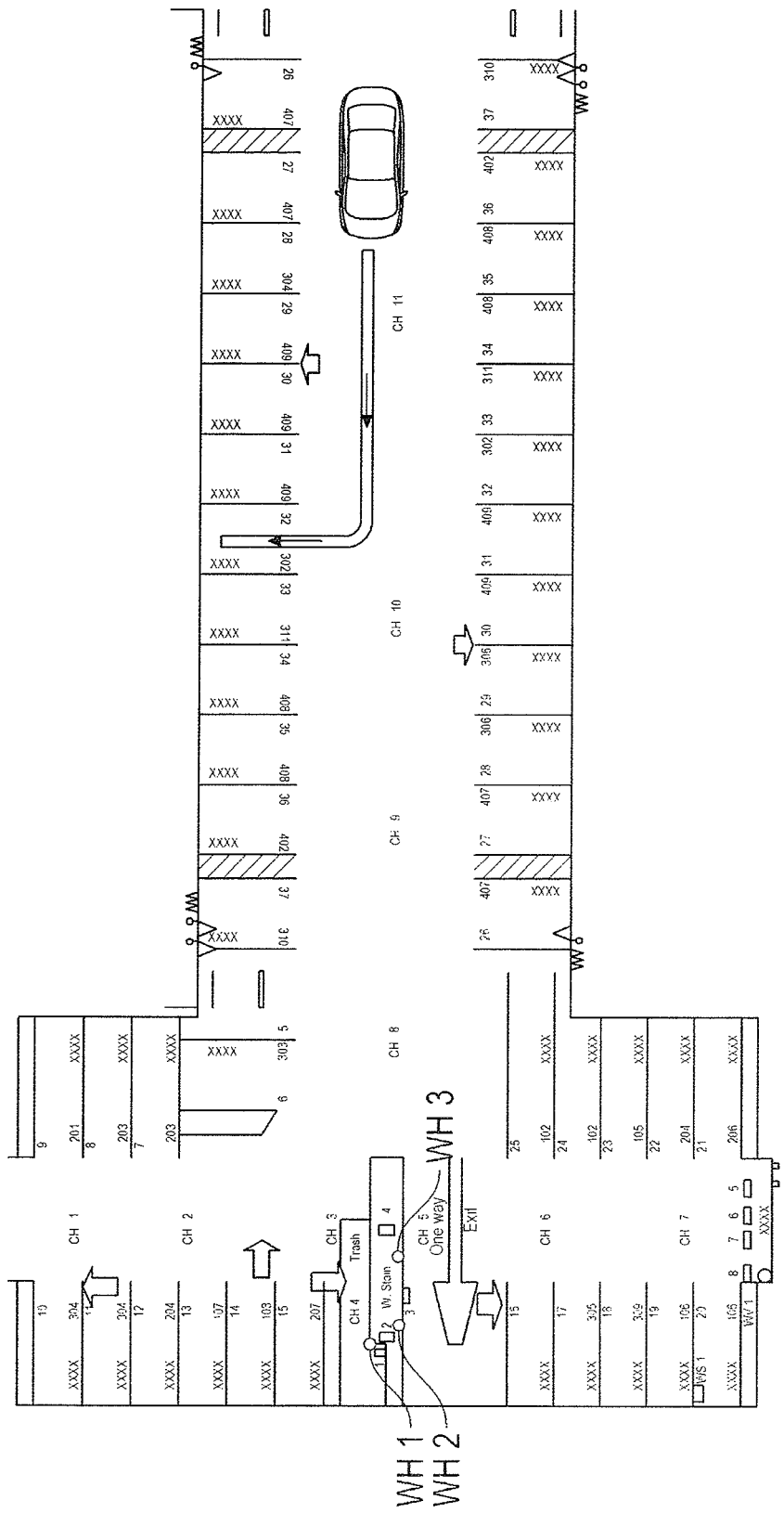
FIG. 9A is an excerpt of a floor plan of an exemplary car park indicating the vehicle's route to a parking stall and the position of the vehicle.
Figure 9B:
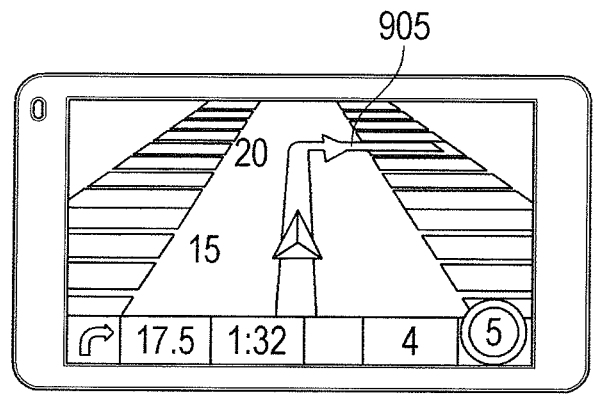
FIG. 9B is a representational screenshot of an exemplary display of a driver interface corresponding to the scenario shown in FIG. 9A.

FIG. 9A shows of a floor plan of an exemplary car park indicating the vehicle's route to a parking stall that may have been assigned by a car park management system. In this embodiment, in the absence of satellite reception, the onboard navigation system of the electric vehicle 112 may rely on a local (indoor) positioning system. FIG. 9B is a representational screenshot of an exemplary display of a driver interface in a local environment corresponding to the scenario shown in FIG. 9A. In this example, the driver interface may display a virtual local environment comprising a floor plan, route and position of the electric vehicle 112 in a local navigation mode in a bird's-eye view from behind the electric vehicle 112. In another embodiment, the driver interface may display the virtual local environment in a "driver's eye view" that may display the virtual local environment as if a virtual camera was located in the same position of a driver's head.

Figure 10A:
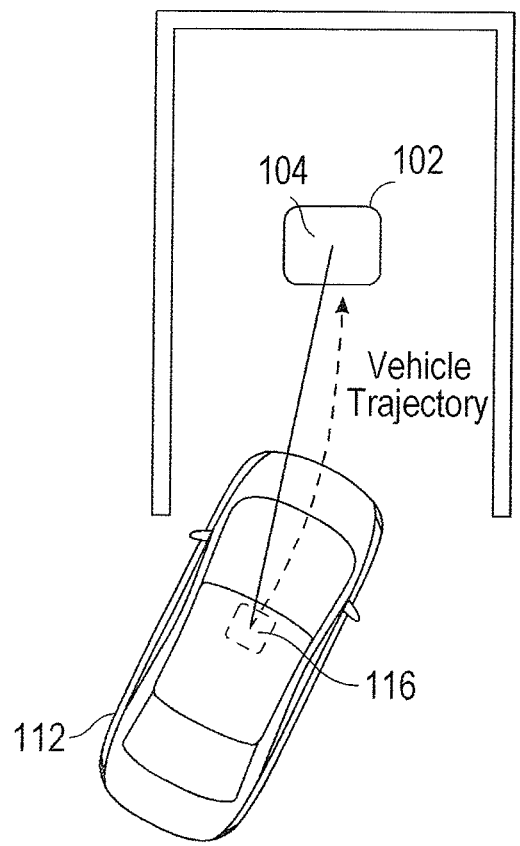
FIG. 10A illustrates a scenario of an electric vehicle approaching a parking stall equipped with a charging base, also indicating the vehicle's trajectory.

FIG. 10A illustrates a scenario of the electric vehicle 112 approaching a parking stall. In some embodiments, the local environment display as shown in FIG. 9B may transition from a virtual local environment positioning system to a park assist (guidance and alignment) system when the electric vehicle 112 is within a threshold distance to the charging base 102 including base coupler 104. In some embodiments, the onboard guidance system of the electric vehicle 112 may rely on positioning based on a magnetic field beacon signal emitted by the charging base 102, an alternative technology using UWB, acoustic-based approaches, or any other positioning systems.

Figure 10B:
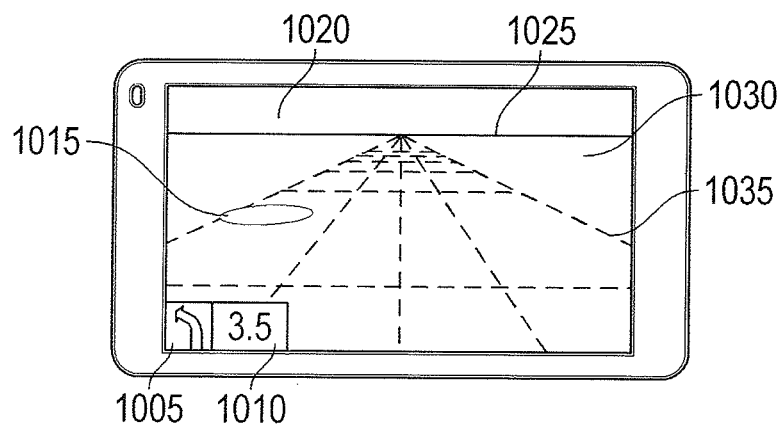
FIG. 10B is a representational screenshot of an exemplary display of a parking assist mode for parking and electric vehicle on a charging base, the screenshot corresponding to the scenario of FIG. 10A.

FIG. 10B is a representational screenshot of an exemplary display of a parking assist mode for parking and electric vehicle 112 on a charging base 102 indicated by charging spot 1015, the screenshot corresponding to the scenario illustrated in FIG. 10A The charging spot 1015 may represent the position of the "sweet spot" as defined above. In this example, the display is a display of a virtual environment based on the driver's-eye 3D view with a foreground and a background by means of a perspective coordinate grid overlay 1035 on the ground 1030 and by means of a horizon display 1025 and sky representation 1020 ("sky stripe"). In this aspect, the display may show a distance indicator 1010 indicating the estimated distance between electric vehicle coupler 116 and charging base 102 and a direction indicator 1005 to additionally assist the driver in optimally steering the vehicle to the target indicated by charging spot 1015. Alternative concepts capable of imparting the same information may also be used. The system may obtain such guidance information by continuously comparing in real-time a computed optimum parking trajectory with the actual trajectory. An actual parking trajectory can be obtained from a number of past position fixes (history data).

The perspective coordinate grid 1035 represents the vehicle's coordinate system that is moving with the electric vehicle 112. The center vertical dashed line corresponds to the x-axis passing through the magnetic center of electric vehicle coupler 116 in the vehicle's longitudinal direction. Its direction indicates the present heading of the electric vehicle 112 relative to the charging base 102 indicated by charging spot 1015. The horizontal dashed lines of the perspective coordinate grid 1035 represent equidistant lines that may serve as distance marks. A displayed circular spot 1015, as shown in FIG. 10B, indicates the present position of a charging spot in the vehicle's coordinate system. The charging spot 1015 may also be represented by other shapes or icons.

Figure 10C:
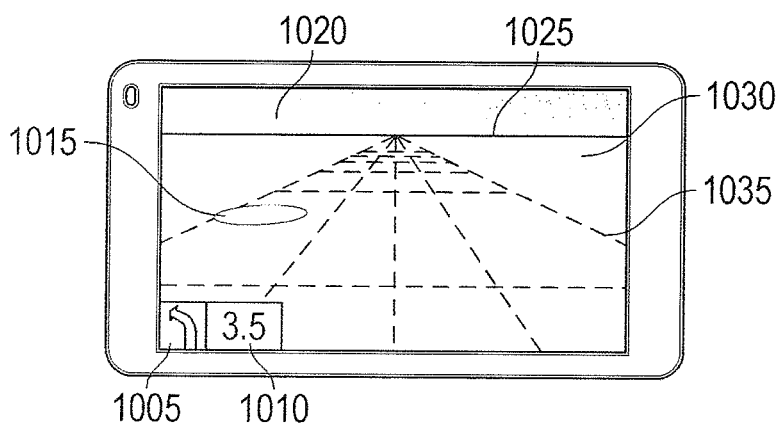
FIG. 10C is a representational screenshot of an exemplary driver interface display showing a "night-time" display mode, the screenshot corresponding to FIG. 10A.
Figure 10D:
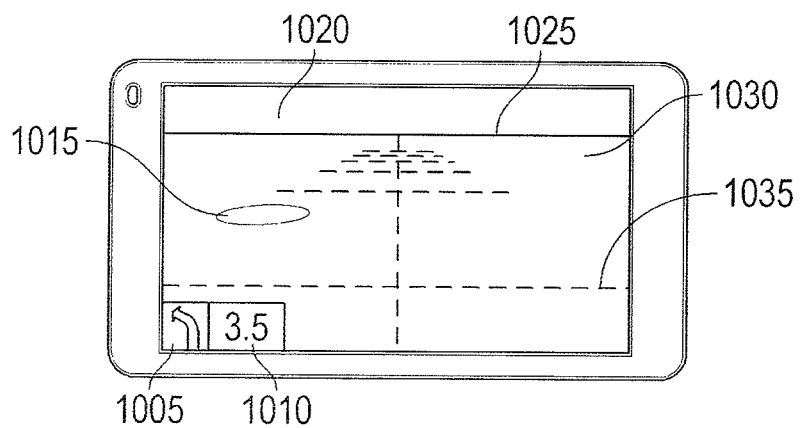
FIG. 10D is a representational screenshot of an alternative driver interface display mode, the screenshot corresponding to the scenario of FIG. 10A.
Figure 11A:
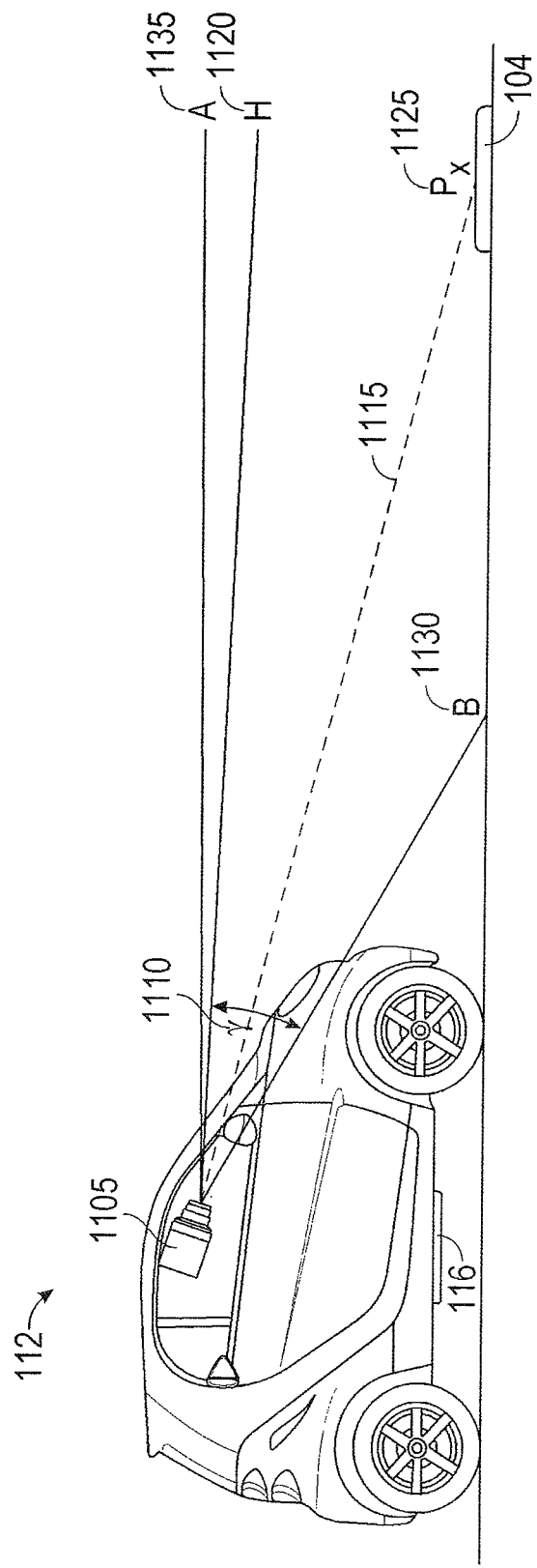
FIG. 11A is a diagram that illustrates how a driver's-eye view projection may be accomplished using a virtual camera in the scenario shown in FIG. 11A.
Figure 11B:
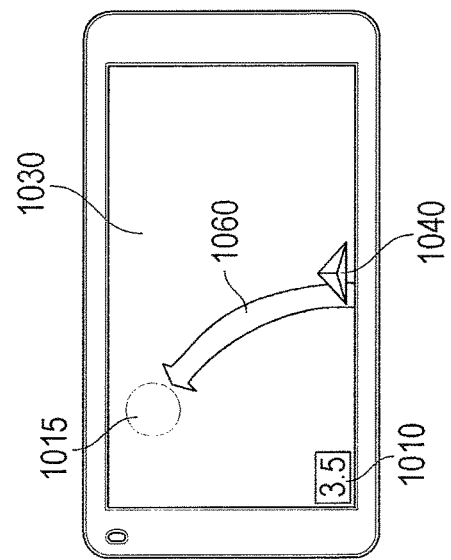
FIG. 11B illustrates how a driver's-eye view is mapped on an exemplary driver interface display in the scenario shown in FIG. 10A.
Figure 11D:
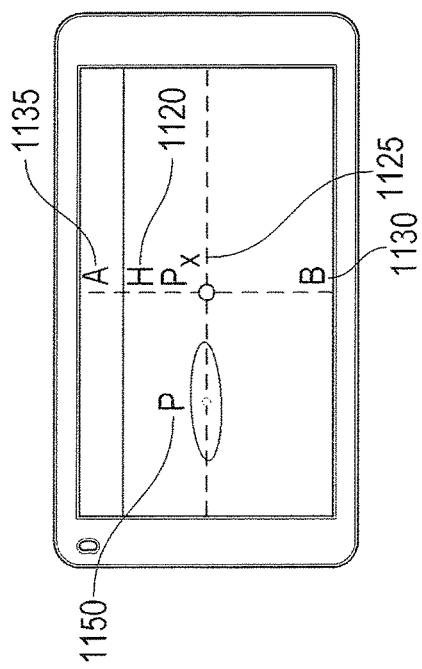
FIG. 11D is a representational screenshot of another alternative driver interface display mode, the screenshot corresponding to the scenario of FIG. 10A.
Figure 11C:
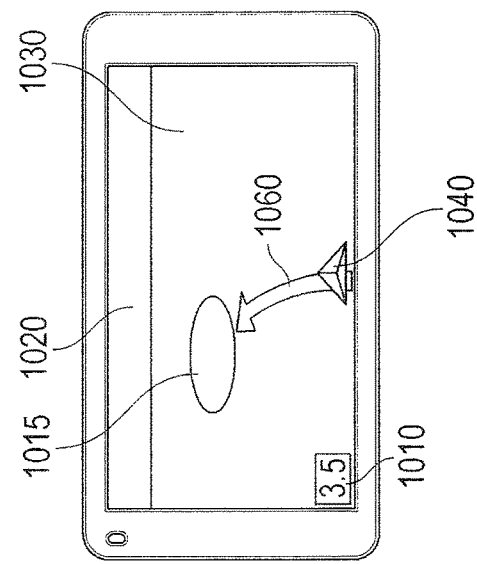
FIG. 11C is a representational screenshot of an alternative driver interface display mode, the screenshot corresponding to the scenario of FIG. 10A

FIG. 10C is a representational screenshot of an exemplary driver interface display showing a "night-time" display mode, for when parking occurs in the evenings. FIG. 10D is a screenshot of an exemplary driver interface display showing a "light" version of the perspective coordinate grid reduced to the essential elements required for providing a 3D view. The system may also display a calculated optimum trajectory to reach the charging spot (not shown). This may be indicated by a perspective arrow similar to the perspective arrow 905 shown in FIG. 9B (not shown in FIG. 10D) or FIG. 11C FIG. 11A is a diagram that illustrates how a driver's-eye view projection may be accomplished using a virtual camera 1105. In this example, the virtual camera 1105 is positioned perpendicularly above the magnetic center of the electric vehicle coupler 116. For example, as shown, the virtual camera 1105 is positioned substantially at the height of the driver's line of sight (driver's eye). The angle of the camera can be controlled so that its central optical axis 1115 (dashed line) is always pointing at $P_x$ 1125, which is a position P 1150 of the charging spot as shown in FIG. 11B projected on the x-axis (y=0). Moreover, the camera's vertical field of view (angle γ 1110) may be chosen large enough so that the upper edge of the image (A 1135) is above the mathematical horizon (H 1120) and the sky representation 1020 (sky stripe) may appear when the electric vehicle 112 is above a threshold distance, e.g., >3 meters or 10 feet. FIG. 11B illustrates how the driver's eye view is mapped onto an exemplary driver interface display in the scenario shown in FIG. 10A. It shows where the points A 1135 (upper edge), B 1130 (lower edge), P 1150 (Position of charging spot), H 1120 (Horizon), and $P_x$ 1125 (x-position of charging spot) are mapped onto the display.

FIG. 11C is a representational screenshot of an exemplary driver interface display showing an alternative display configuration based on a bird's-eye view showing the calculated (proposed) trajectory 1060 and the position of the electric vehicle coupler 116 with a fixed cursor 1040. FIG. 11D is a representational screenshot of an exemplary driver interface display showing a two-dimensional top down view. In these embodiments, an offset of the cursor 1040 from the overlaid trajectory 1060 indicates any deviation of the actual trajectory from the calculated trajectory 1060.

Figure 12A:
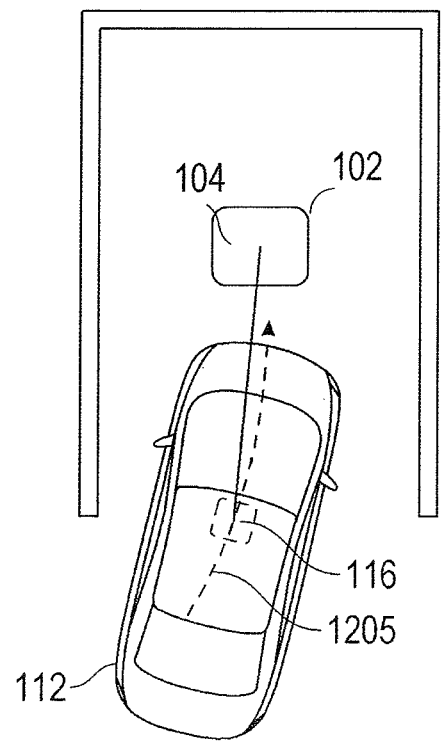
FIG. 12A illustrates a scenario of an electric vehicle approaching a charging base, also indicating the vehicle's trajectory.
Figure 12B:
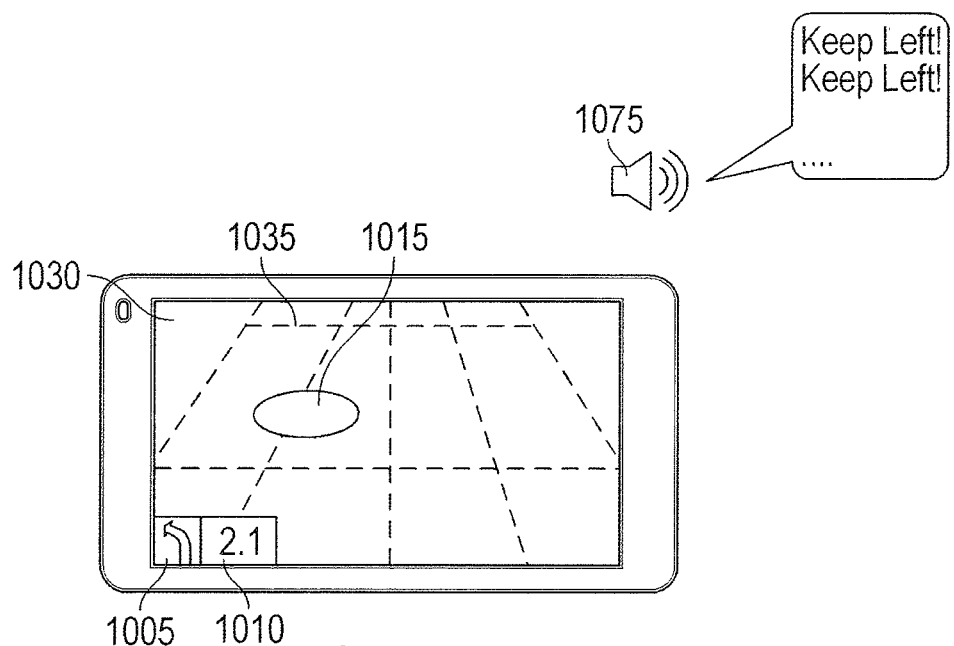
FIG. 12B shows a representational screenshot of an exemplary driver interface display and a voice command, the screenshot corresponding to the scenario of FIG. 12A.

FIG. 12A illustrates a scenario of the electric vehicle 112 approaching a charging base 102. In this embodiment, the electric vehicle is approaching the charging base 102 at a distance of approximately six feet along the trajectory 1205. FIG. 12B is a representational screenshot of an exemplary driver interface display showing the charging spot 1015, the screenshot corresponding to the scenario shown in FIG. 12A. In one aspect, as the electric vehicle 112 moves closer to the charging base 102, the charging spot 1015 on the display may become bigger indicating that the charging base 102 is getting closer to the electric vehicle coupler 116. In another aspect, as the electric vehicle 112 moves closer to the charging base 102, the charging spot 1015 may move closer to the center line indicating that the vehicle has changed its heading towards the charging spot 1015. In addition to the direction icon 1005, the system may output voice prompts 1075 (e.g., "keep left") and warnings if the actual trajectory deviates too much from the computed optimum trajectory.

Figure 13A:
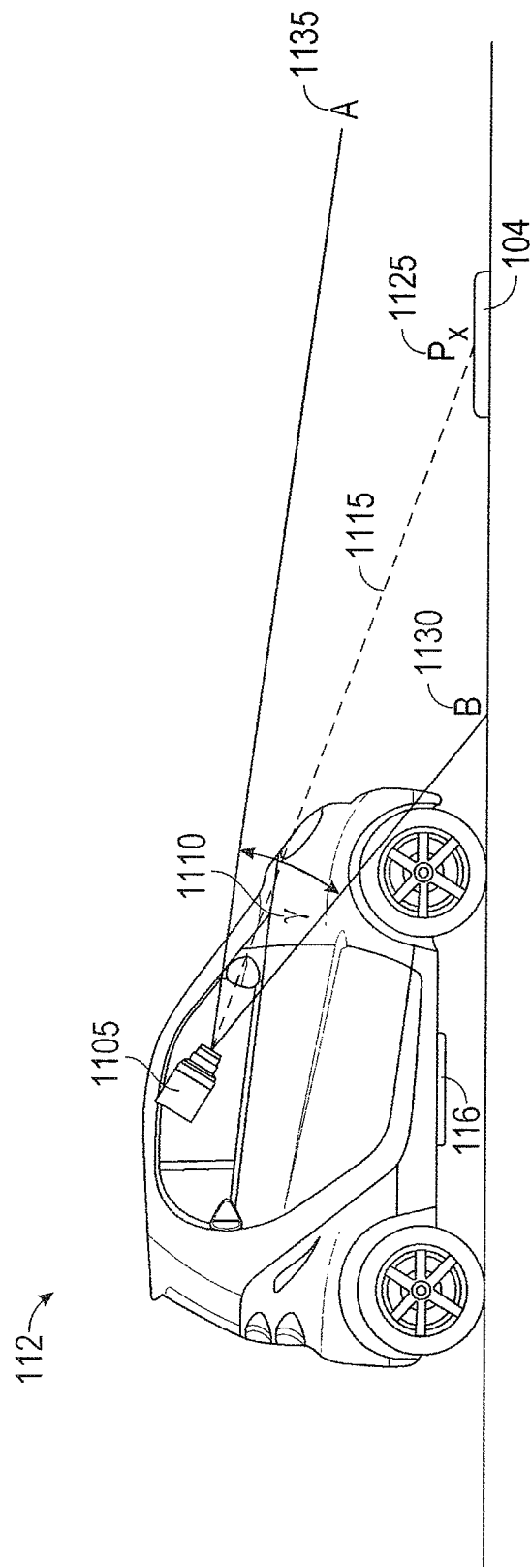
FIG. 13A is a diagram that illustrates how a driver's-eye view projection may be accomplished using a virtual camera in the scenario shown in FIG. 12A.
Figure 13B:
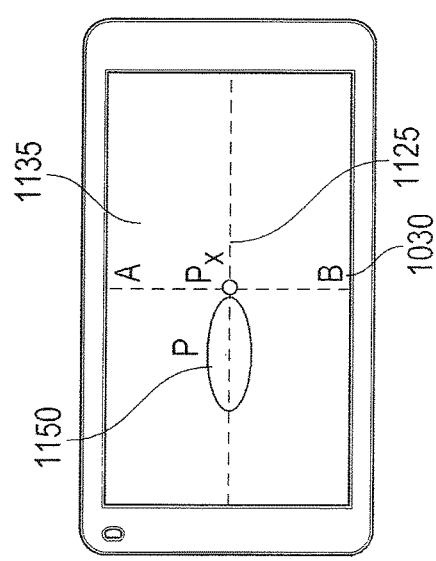
FIG. 13B illustrates how a driver's-eye view is mapped on an exemplary driver interface display in the scenario shown in FIG. 12A.

FIG. 13A illustrates an exemplary position of the virtual camera 1105 within the electric vehicle 112. In some embodiments, the virtual camera 1105 may be used to generate the displays of FIGS. 13B-D, 14B, 14D, 15B-C, 16B, 17B-C, 17E, 18B-C, 18E, 19B, 20B, 21B, 22B, 23B, 24B, 25B, and 25C. In this example corresponding to the scenario shown in FIG. 12A, the electric vehicle 112 has moved sufficiently close enough to the charging base 102 such that the upper edge of the image (A 1115) is below the mathematical horizon (H 1120, not shown) and the sky representation 1020 (sky stripe, not shown) is no longer visible. FIG. 13B illustrates how a driver's-eye view is mapped onto an exemplary driver interface display (scenario shown in FIG. 12A) showing the points A 1135 (upper edge), B 1130 (lower edge), P 1150 (Position of charging spot), and $P_x$ 1125 (x-position of charging spot). In this aspect, with respect to FIG. 11B, the charging spot 1015 may become larger and more circular to indicate the electric vehicle 112 is moving closer to the charging base 102.

Figure 13D:
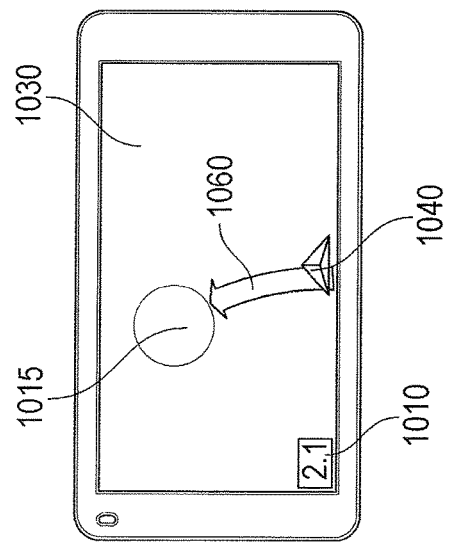
FIG. 13D is a representational screenshot of another alternative driver interface display mode, the screenshot corresponding to the scenario of FIG. 12A.
Figure 13C:
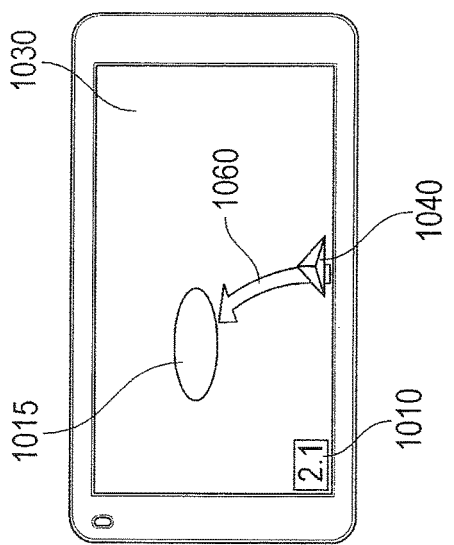
FIG. 13C is a representational screenshot of an alternative driver interface display mode, the screenshot corresponding to the scenario of FIG. 12A.

FIG. 13C is a representational screenshot of an exemplary driver interface displays showing an alternative display configuration based on a bird's-eye view showing the calculated (proposed) trajectory 1060 and the position of the electric vehicle coupler 116 with a fixed cursor 1040. FIG. 13D is a representational screenshot of an exemplary driver interface displays showing another alternative display configuration based on a two-dimensional top down view. In both display modes, distance is suggested by the size of the circular charging spot 1015 and the associated zoom effect. For example, as the electric vehicle 112 moves closer to the charging spot 1015, the charging spot 1015 may become larger. In another aspect, as the electric vehicle 112 moves closer to the charging spot 1015, the shape of the circular charging spot 1015 may change from a more elliptical aspect as in FIG. 11C to a more circular aspect as in FIG. 13C to indicate the electric vehicle 112 is moving closer to the charging base 102.

Figure 14A:
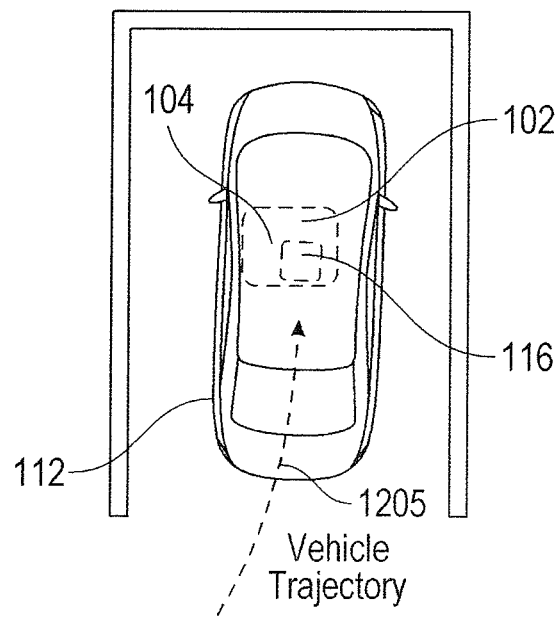
FIG. 14A illustrates a scenario of an electric vehicle entering the sweet spot of a charging base.

FIG. 14A illustrates a scenario where the electric vehicle 112 is above the charging base 102 and the electric vehicle coupler 116 is going to enter the sweet spot of the charging base 102. In this aspect, the system may transition from guidance to an alignment mode, which may happen at a distance of, for example, 1-2 feet from the magnetic center of the charging base 102. Such a transition may occur when a sensor circuit determines a location of sweet spot or base coupler 104 associated with the charging base 102 in relation to the electric vehicle coupler 116 and a processor determines that the distance between the location of the sweet spot/base coupler 104 and the electric vehicle coupler 116 satisfies a threshold. In some embodiments, the sensor circuit may comprise the sensors described with respect to the wireless power transfer system 300 of FIG. 3. Such a transition may appear on the driver interface by a gradual change from a 3D view (e.g., FIG. 13C) when the electric vehicle 112 is in the position shown in FIG. 12A or 13A to a virtually top down 2D view (e.g., FIG. 14B, 14D) when the electric vehicle 112 is in the position shown in FIG. 14A or 14C and as further explained below.

Figure 14B:
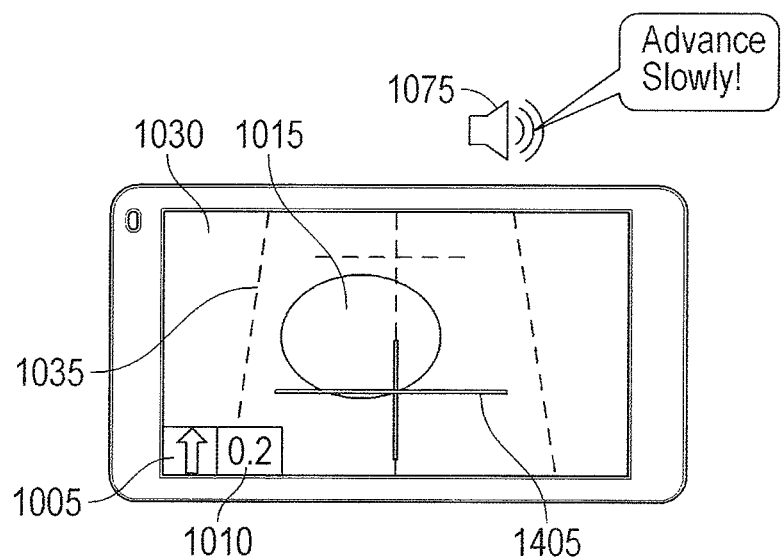
FIG. 14B is a representational screenshot of an exemplary driver interface display, the screenshot corresponding to the scenario of FIG. 14A.

FIG. 14B is a representational screenshot of an exemplary driver interface display, the screenshot corresponding to the scenario of FIG. 14A, showing an alignment mode with a crosshair 1405 indicating the origin of the vehicle coordinate system and the magnetic center of the electric vehicle coupler 116. The driver interface display of FIG. 14B also shows the charging spot 1015, the distance indicator 1010 indicating the estimated distance between magnetic centers of electric vehicle coupler 116 and charging base 102, the direction indicator 1005 to additionally assist the driver in steering the vehicle into alignment position, the coordinate grid 1035, and the ground 1030. In some aspects, the system may be considered in the alignment mode when the horizontal line of the crosshair 1405 becomes visible. In some other aspects, entry into an alignment mode corresponding to an alignment zone may be announced by a voice prompt 1075 "advance slowly" or other voice prompt 1075.

Figure 14C:
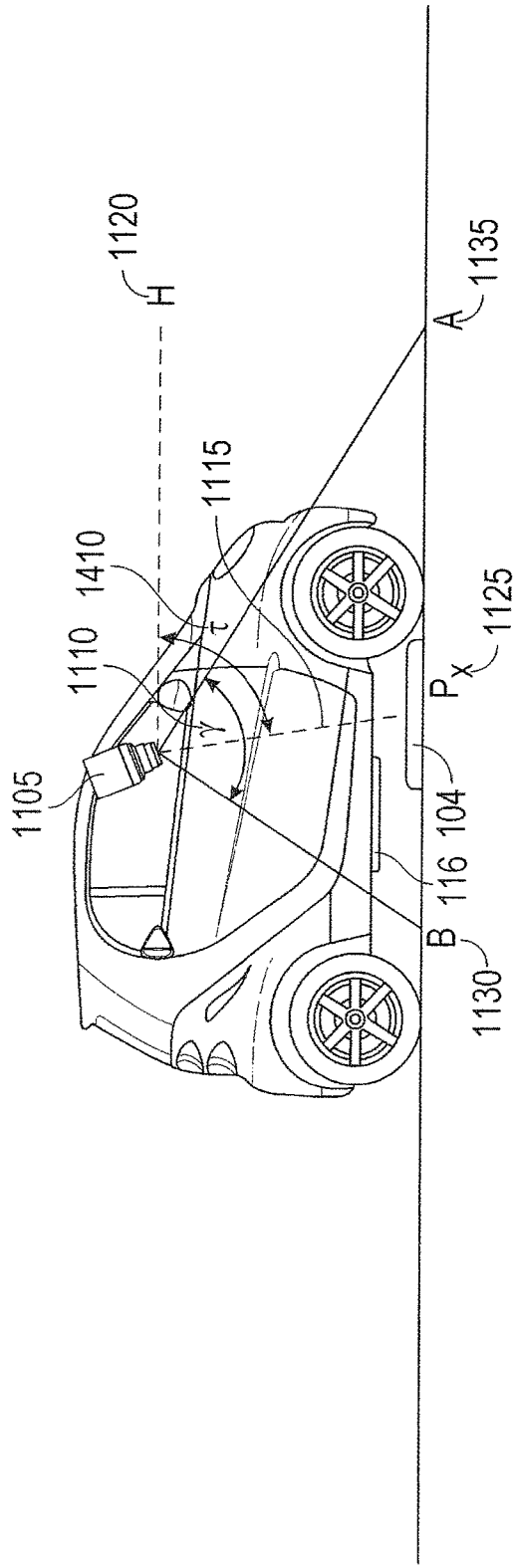
FIG. 14C is a diagram that illustrates how a driver's-eye view projection may be accomplished using a virtual camera in the scenario shown in FIG. 14A.
Figure 14D:
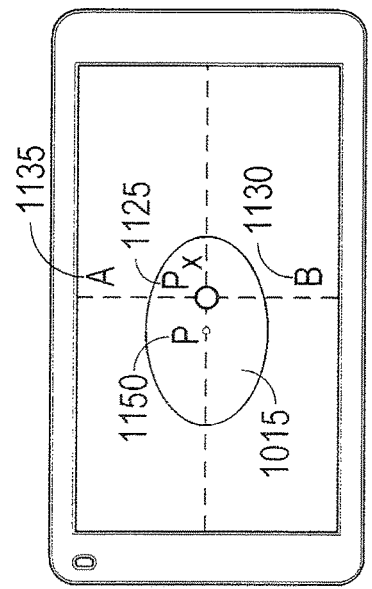
FIG. 14D illustrates how a driver's-eye view is mapped on an exemplary driver interface display in the scenario shown in FIG. 14A.

FIG. 14C is a diagram that illustrates a driver's-eye view projection using a virtual camera 1105 in an alignment zone. FIG. 14D illustrates how a driver's-eye view is mapped on an exemplary driver interface display in the alignment mode in the scenario shown in FIG. 14A.

In the alignment mode, the coordinate grid 1035 as shown in FIG. 14B appears in a substantially two-dimensional view above the charging spot 1015 since the virtual camera 1105 tracking $P_x$ 1125 is now near vertically tilted (nadir pointing) as shown in FIG. 14C by angle τ 1410. In the alignment mode, the displayed charging spot 1015 may now represent the area of the sweet spot. The zone of the alignment mode provides limited opportunity for lateral corrections of the vehicle's trajectory and the driver's responsibility is mainly to stop the electric vehicle 112 as soon as the center of the crosshair 1405 as shown in FIG. 14B is within the sweet spot marked by the charging spot 1015. In a case where the center of the crosshair 1405 was outside of the charging spot 1015, the driver would not be able to laterally move the electric vehicle 112 to bring the center of the crosshair 1405 into the charging spot 1015. But the driver may move the electric vehicle 112 either forward or backward to re-align the electric vehicle coupler 116 with the charging base 102 so that the magnetic center of the electric vehicle coupler 116 (indicated by cross hair 1415 in FIG. 14B) comes into the sweet spot of charging base 102 (indicated by charging spot 1015 in FIG. 14B).

In the zone of the alignment mode, alignment systems 352, 354, with reference to FIG. 3, may come into play to provide additional alignment feedback to the driver when the electric vehicle coupler 116 is within the sweet spot of the charging base 102, e.g., by changing a color of the charging spot, a voice prompt, or any other indication (not shown). This information may be determined using a method different from the method used by the guidance system, e.g., by continuously measuring of a coupling efficiency between base coupler and electric vehicle coupler and comparing with a defined threshold.

Figure 15B:
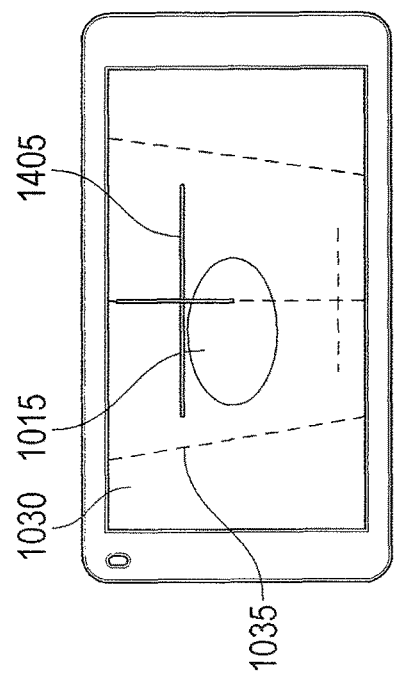
FIG. 15B is a representational screenshot of an exemplary driver interface display, the screenshot corresponding to the scenario of FIG. 15A.
Figure 15C:
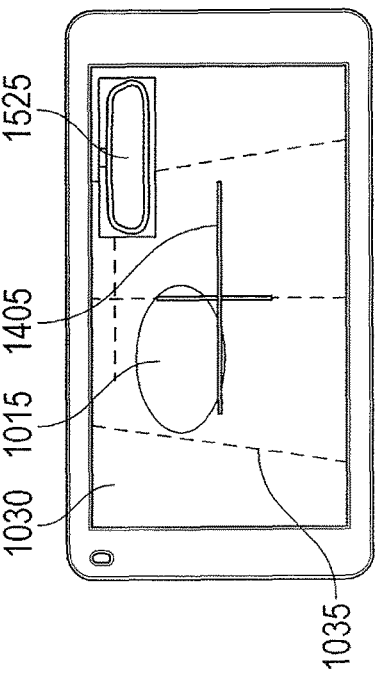
FIG. 15C is a representational screenshot of an alternative driver interface display, the screenshot corresponding to the scenario of FIG. 15A.
Figure 15A:
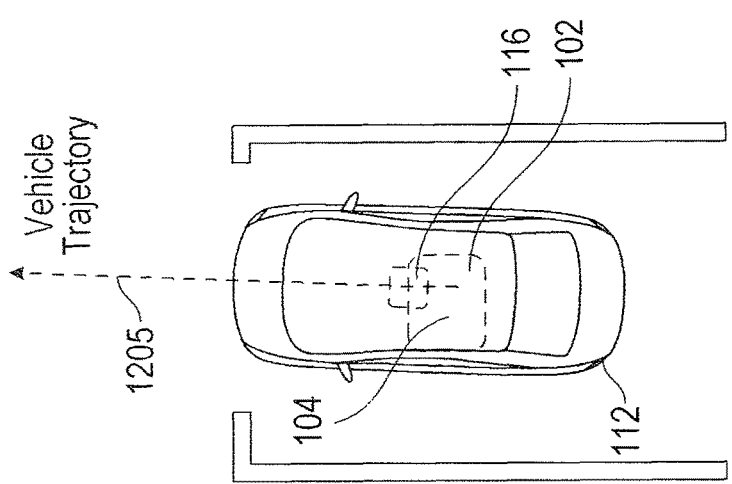
FIG. 15A illustrates a scenario of an electric vehicle leaving the sweet spot of charging base.

FIG. 15A illustrates a scenario of the electric vehicle 112 and electric vehicle coupler 116 leaving the sweet spot of charging base 102 at the rear side. FIG. 15B is a representational screenshot of an exemplary driver interface display showing an "upside-down" view that may be useful to distinguish a rearview from a front view of the charging spot 1015. The upside-down view may also appear in a reverse alignment as part of a reverse parking maneuver. FIG. 15C is a representational screenshot of an exemplary driver interface display showing an alternative "rearview mirror" view display mode for reverse parking, which may be indicated by a rearview mirror icon 1525 included in the display as soon as the tilt angle τ of the virtual camera 1105 exceeds 90 degrees. The rearview mirror icon 1525 may be any other icon or text indicating that the electric vehicle 112 is either reversing onto the charging spot 1015 or is moving away from the charging spot 1015. Both the upside-down and the rearview mirror view show the charging spot 1015 on the left of the x-axis and the driver's parking experience may be similar to reverse parking using a rearview mirror.

Figure 16A:
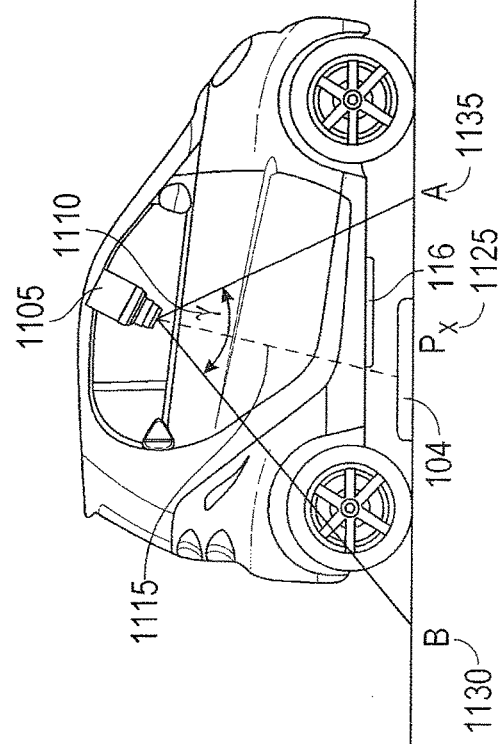
FIG. 16A is a diagram that illustrates how a driver's-eye view projection may be accomplished using a virtual camera in the scenario corresponding to FIG. 15A.
Figure 16B:
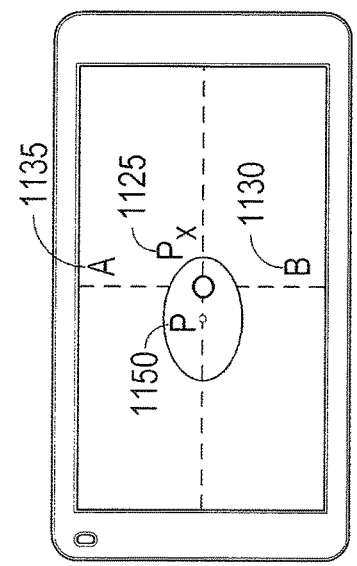
FIG. 16B illustrates how a driver's-eye view is mapped on an exemplary driver interface display in the scenario corresponding to the scenario of FIG. 15A.

FIG. 16A is a diagram that illustrates the position of the virtual camera 1105 within the electric vehicle 112 in an alignment zone, corresponding to the scenario of FIG. 16A where the electric vehicle 112 is leaving the sweet spot of the base coupler 104. In this embodiment, the virtual camera 1105 is still tracking $P_x$ 1125 and is tilted by an angle τ 1410 (not shown) >90 degrees. FIG. 16B illustrates how the driver's-eye view is mapped on an exemplary driver interface display in the scenario shown in FIG. 15A and for the display mode shown in FIG. 15B. The tilt of the camera (>90 degrees) and the mapping on the display (FIG. 16B), which is maintained as in previous scenarios (e.g., FIG. 14C), automatically produces an "upside-down" view as shown in FIG. 15B when the electric vehicle 112 has moved over the charging base 102.

Figure 17B:
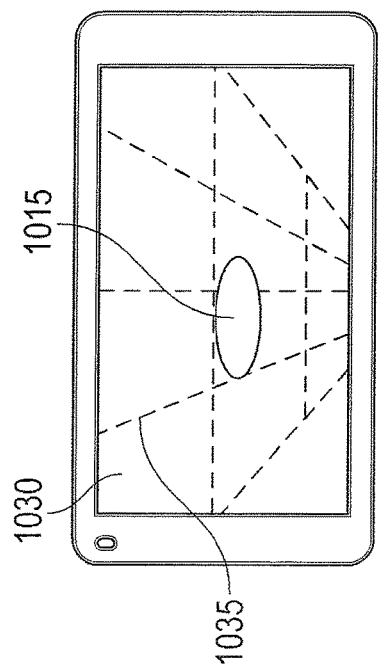
FIG. 17B is a representational screenshot of an exemplary driver interface display, the screenshot corresponding to the scenario of FIG. 17A.
Figure 17C:
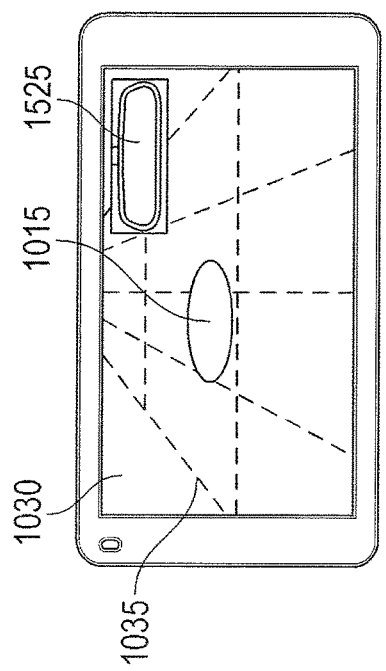
FIG. 17C is a representational screenshot of an alternative driver interface display mode, the screen shot corresponding to the scenario of FIG. 17A.
Figure 17A:
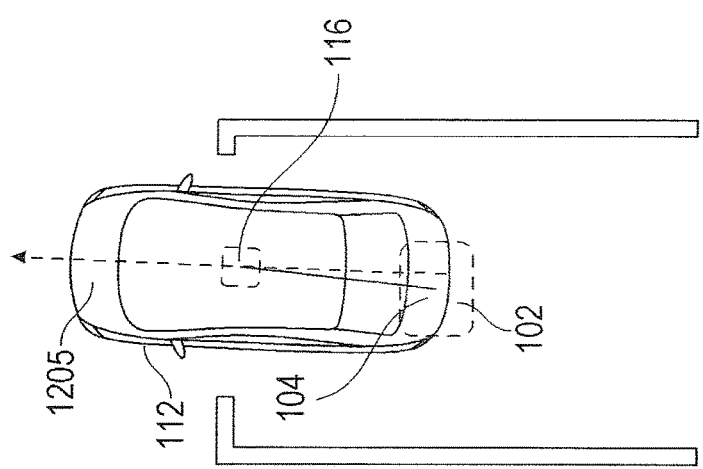
FIG. 17A illustrates a scenario of an electric vehicle departing from the charging base.
Figure 17D:
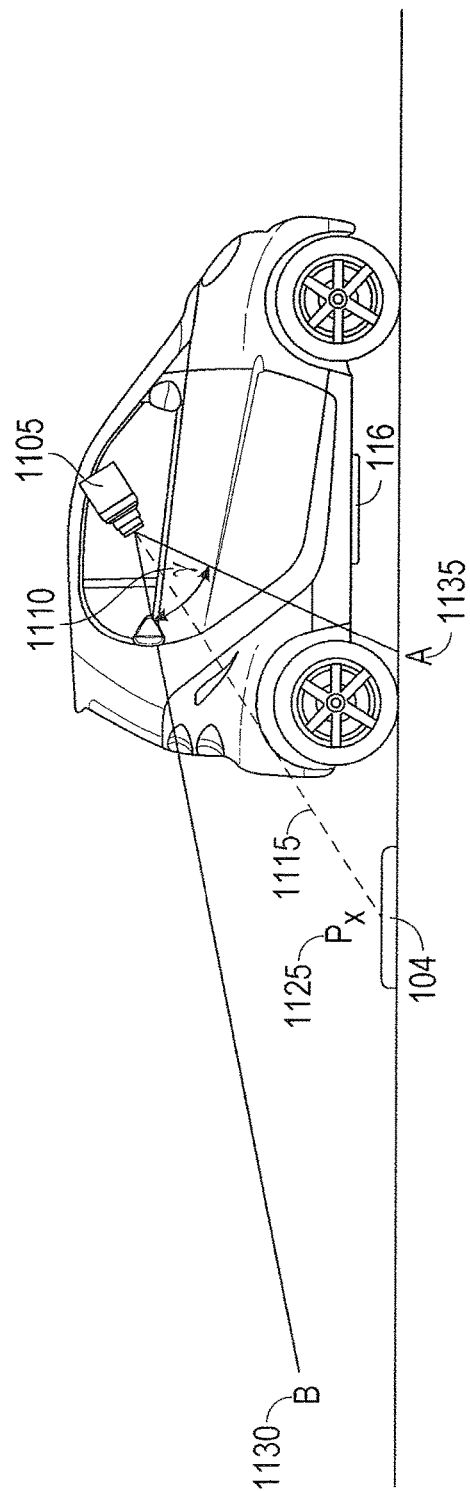
FIG. 17D is a diagram that illustrates how a driver's-eye view projection may be accomplished using a virtual camera in the scenario shown in FIG. 17A.

FIG. 17A illustrates the scenario of the electric vehicle 112 departing from the charging base 102, e.g., at a distance of about six feet. FIG. 17B and FIG. 17C are screenshots of exemplary driver interface displays showing an upside-down and an alternative rearview mirror view, respectively, of the coordinate system with the charging spot 1015 having shrunken as the electric vehicle 112 moves farther away from the charging base 102. In a reverse parking maneuver, one of these display views may be used for reverse guidance. In contrast to FIG. 16B, the size of the charging spot 1015 has become smaller and its appearance has become more elliptical indicating that the charging spot 1015 is farther away than in FIG. 15B or FIG. 15C. FIG. 17D is a diagram that illustrates the position of the virtual camera 1105 within the electric vehicle 112, corresponding to the scenario shown in FIG. 17A, when the vehicle is departing from the charging base 102. In this embodiment, in continuation of FIG. 16A, the virtual camera 1105 is still tracking $P_x$ 1125 and is tilted by an angle τ 1410 (not shown) >90 degrees. In this example, the electric vehicle 112 has moved farther away from the charging base 102 than the electric vehicle 112 depicted in FIG. 16A.

Figure 17E:
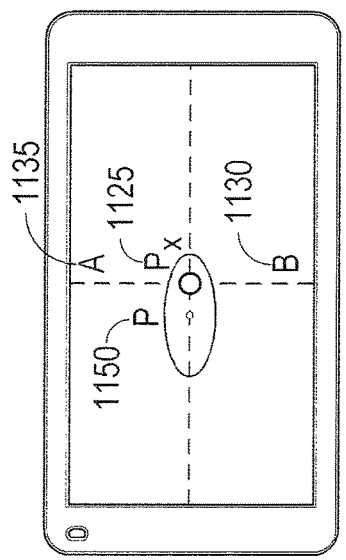
FIG. 17E illustrates how a driver's-eye view is mapped on an exemplary driver interface display in the scenario shown in FIG. 17A.
Figure 18B:
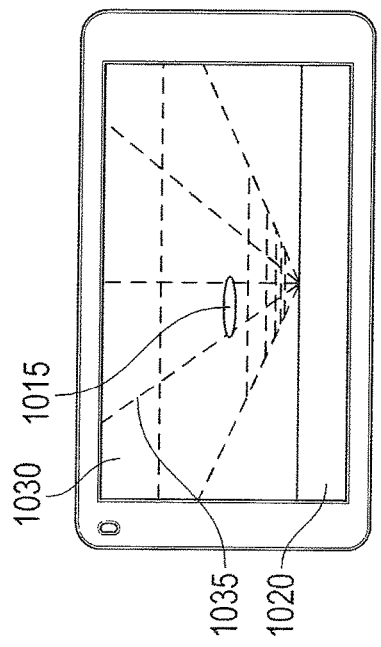
FIG. 18B is a representational screenshot of an exemplary driver interface display, the screenshot corresponding to the scenario of FIG. 18A.
Figure 18C:
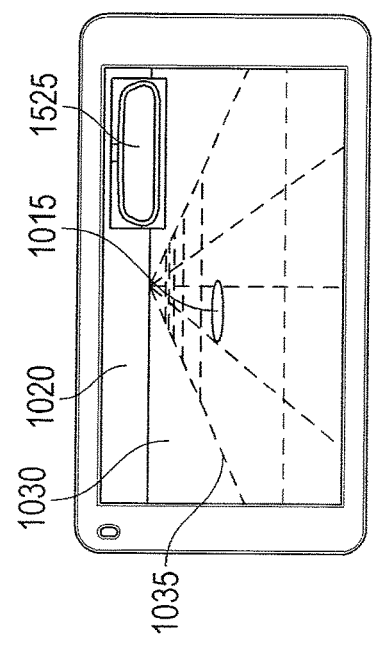
FIG. 18C is a representational screenshot of an alternative driver interface display mode, the screenshot corresponding to the scenario of FIG. 18A.
Figure 18A:
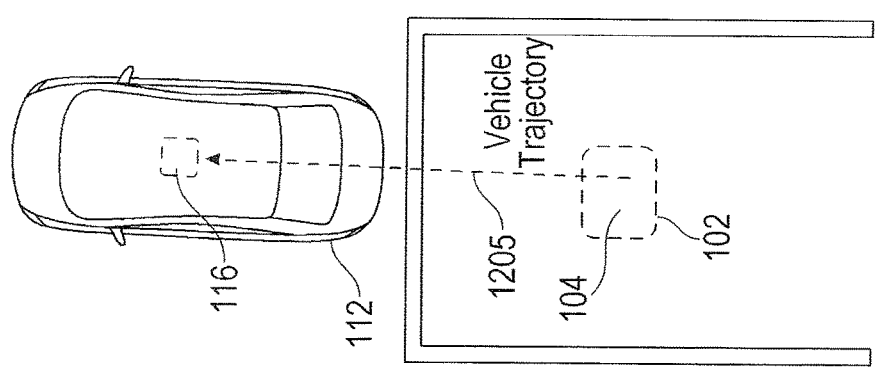
FIG. 18A illustrates a scenario of an electric vehicle having left the parking stall.

FIG. 17E illustrates how the driver's-eye view is mapped on an exemplary driver interface display in the scenario shown in FIG. 17A and for the display mode shown in FIG. 17B upside-down view. FIG. 18A illustrates a scenario (in contrast to FIG. 10A) when the vehicle has left the parking stall, e.g., at a distance of about 9-10 feet from the charging base 102. FIG. 18B and FIG. 18C are representational screenshots of exemplary driver interface displays showing an upside-down and an alternative rearview mirror view, respectively, of the coordinate system with the charging spot 1015 having further shrunken as the electric vehicle 112 moves farther away from the charging base 102. In a reverse parking maneuver, one of these display views may be used for reverse guidance.

Figure 18D:
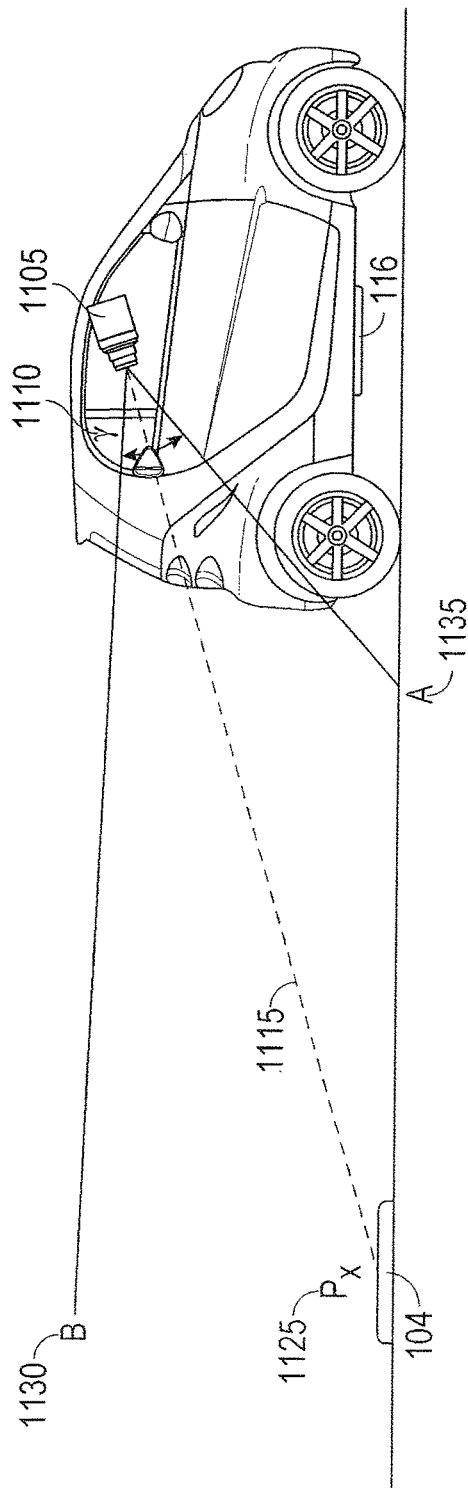
FIG. 18D is a diagram that illustrates how a driver's-eye view projection may be accomplished using a virtual camera in the scenario corresponding to FIG. 18A.
Figure 18E:
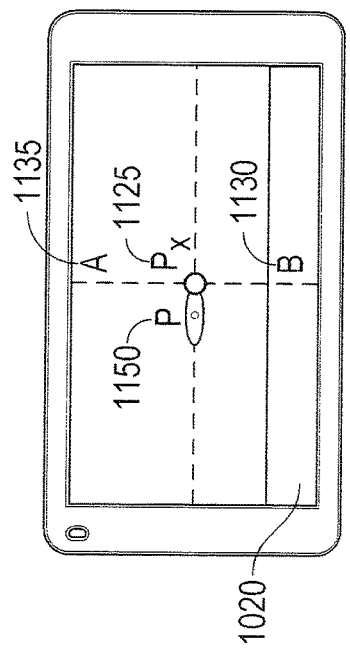
FIG. 18E illustrates how a driver's-eye view is mapped on an exemplary driver interface display in the scenario shown in FIG. 18A.

FIG. 18D is a diagram that illustrates the position of the virtual camera 1105 within the electric vehicle 112, corresponding to the scenario shown in FIG. 18A. In this embodiment, the virtual camera 1105 is still tracking $P_x$ 1125 and is tilted by an angle τ 1410 (not shown) >90 degrees. FIG. 18E illustrates how a driver's-eye view is mapped on an exemplary driver interface display in the scenario shown in FIG. 18A and for the display mode shown in FIG. 18B ("upside-down").

Figure 19A:
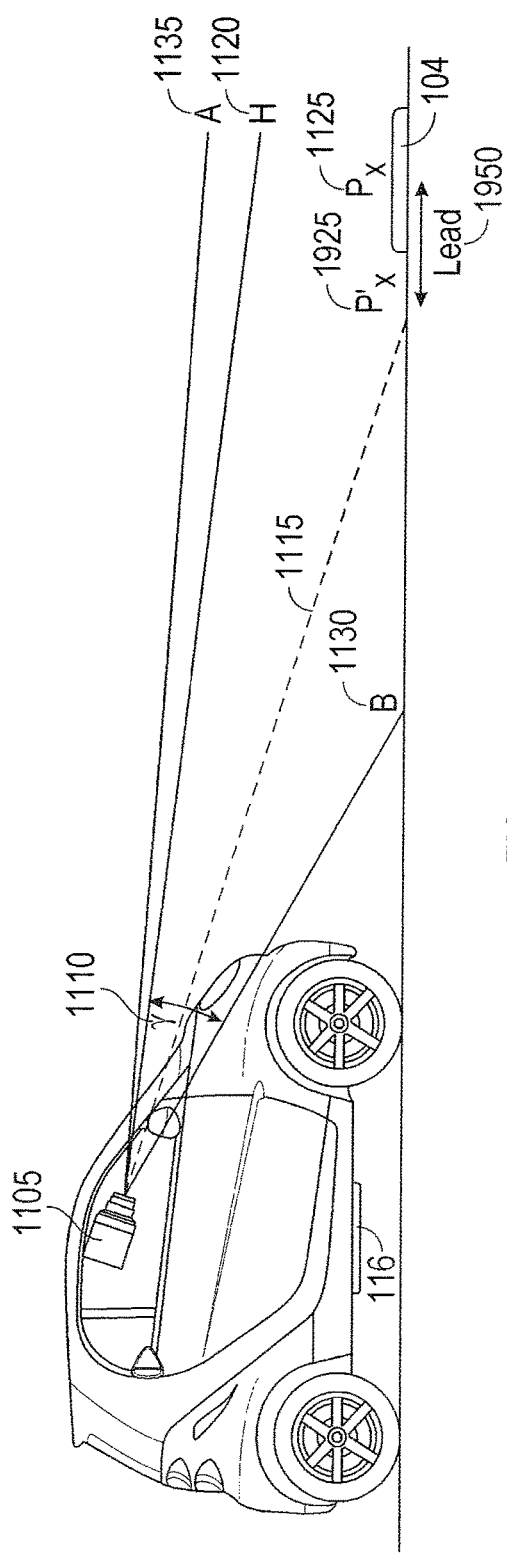
FIG. 19A is a diagram that illustrates how a driver's-eye view projection may be accomplished using a virtual camera in an alternative way for the scenario shown in FIG. 10A.
Figure 19B:
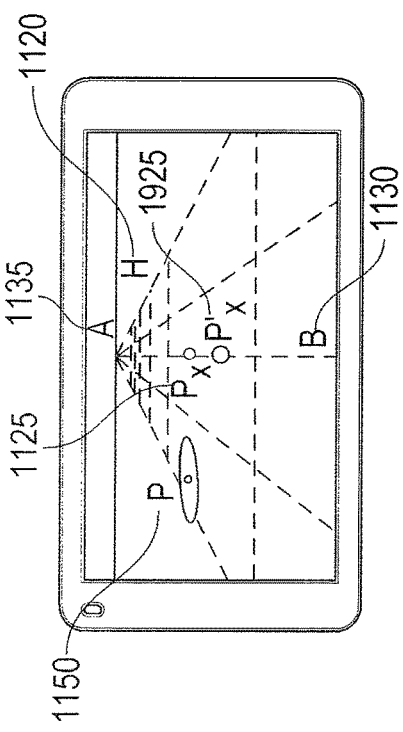
FIG. 19B illustrates how a driver's-eye view is mapped on an exemplary driver interface display in an alternative way for the scenario shown in FIG. 10A.

FIG. 19A is a diagram that illustrates the position of the virtual camera 1105 within the electric vehicle 112 in the scenario of FIG. 10A. In this embodiment, the virtual camera is slightly 'leading' when the electric vehicle 112 is approaching the charging base 102, meaning that it is tracking an artificial point $P'_x$ 1925, which is nearer to the electric vehicle 112 by a certain length referred to as the "lead" length 1950 (FIG. 19A). The lead length 1950 is normally constant, except when the electric vehicle coupler 116 is located in the zone of the alignment mode, which will be further explained below. In this aspect, the point $P'_x$ 1925 may be mapped onto the center of the display. FIG. 19B illustrates how a driver's-eye view is mapped on an exemplary driver interface display in the scenario shown in FIG. 10A and for a leading camera tracking point $P'_x$ 1925 as illustrated in FIG. 19A. In this mapping scheme, the camera tracking point $P'_x$ is still mapped onto the center of the display, thus the charging spot 1015 will appear in the upper half of the displayed area. The charging spot 1015 may also be represented by other shapes or icons.

Figure 20A:
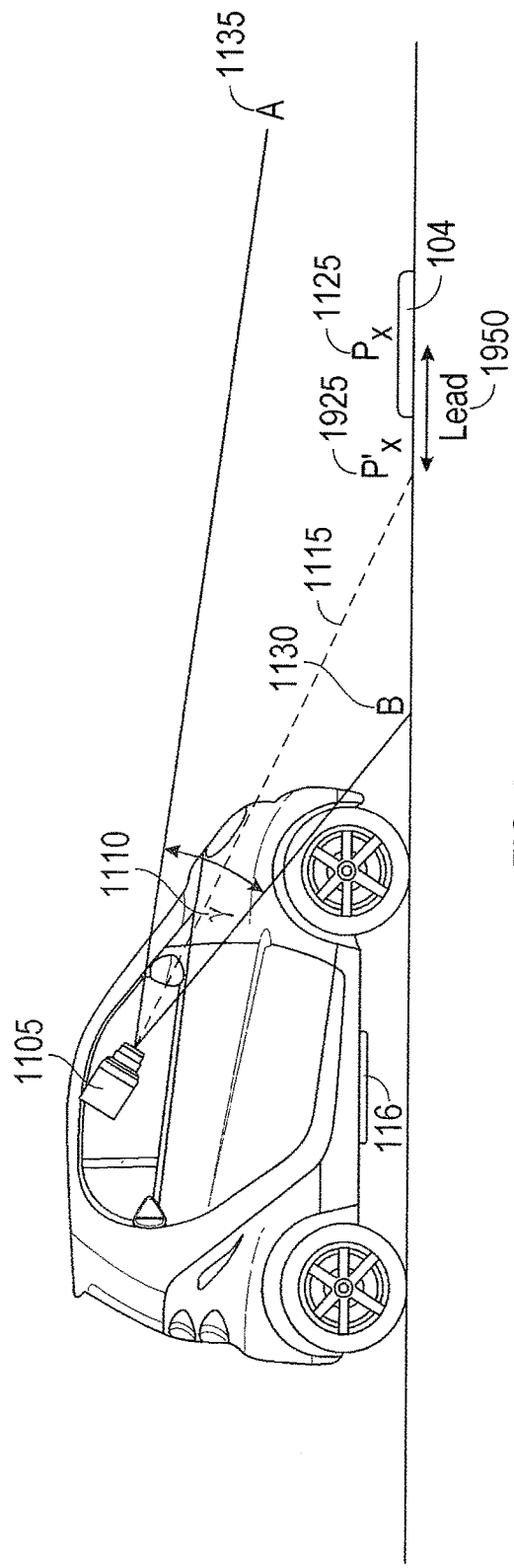
FIG. 20A is a diagram that illustrates how a driver's-eye view projection may be accomplished using a virtual camera in an alternative way for the scenario shown in FIG. 12A.
Figure 20B:
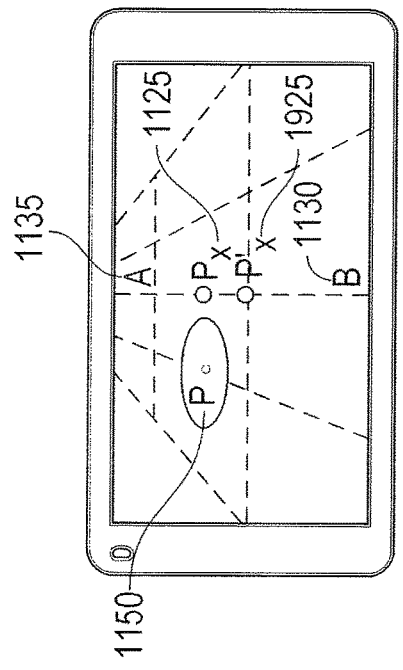
FIG. 20B illustrates how a driver's-eye view is mapped on an exemplary driver interface display in an alternative way for the scenario shown in FIG. 12A.

FIG. 20A is a diagram that illustrates the position of the virtual camera 1105 of the electric vehicle 112 where the virtual camera is slightly leading when the electric vehicle 112 is approaching the charging base 102, corresponding to the scenario shown FIG. 12A. In this embodiment, the lead length 1950 is still constant and maximal. FIG. 20B illustrates how a driver's-eye view is mapped on an exemplary driver interface display in the scenario shown in FIG. 12A and for a leading camera tracking point P'$_x$ 1925 as illustrated in FIG. 20A. In this aspect, camera tracking point P'$_x$ remains in the center of the display. Thus, charging spot 1150 will appear in the upper half of the display area.

Figure 21A:
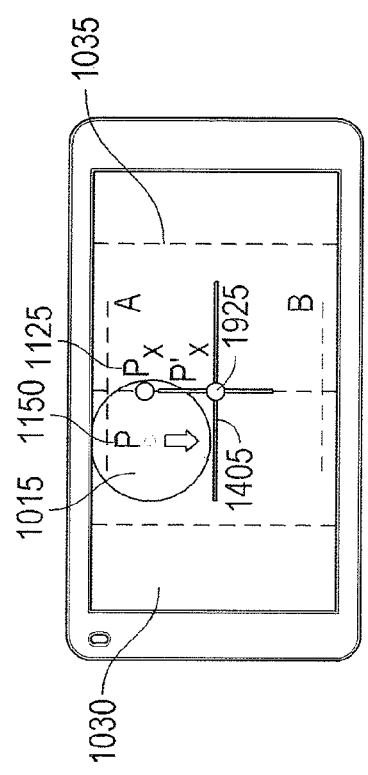
FIG. 21A is a diagram that illustrates how a driver's-eye view projection may be accomplished using a virtual camera in an alternative way for the scenario shown in FIG. 14A.
Figure 21B:
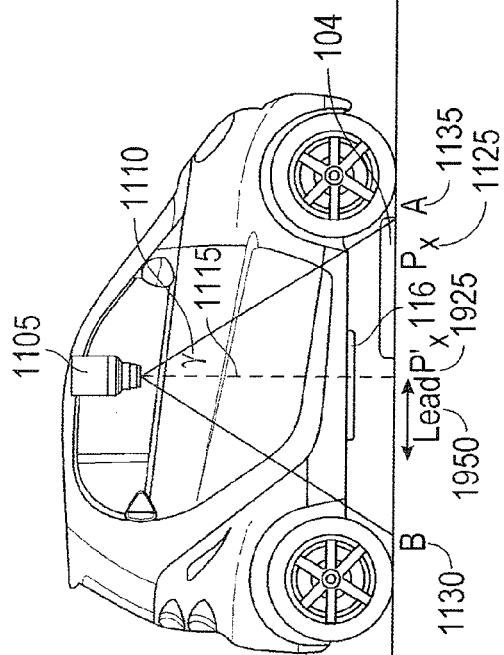
FIG. 21B illustrates how a driver's-eye view is mapped on an exemplary driver interface display in an alternative way for the scenario shown in FIG. 14A.

FIG. 21A is a diagram that illustrates a driver's-eye view projection using a virtual camera 1105 of the electric vehicle 112 in an alignment zone, corresponding to FIG. 14A. However in the alignment zone, when point P'$_x$ 1925 has reached the origin of the vehicle coordinate system (FIG. 21A), meaning that the tilt angle of the virtual camera 1105 has reached 90 degrees, the virtual camera 1105 is locked providing a 2D look down view. In this 2D display mode suitable for alignment, the point P'$_x$ 1925 and the crosshair 1405 remain fixed and the circular charging spot 1015 (P 1150) instead is moving as indicated by the arrow in FIG. 21B. FIG. 21B illustrates how a driver's-eye view is mapped on an exemplary driver interface display in the scenario shown in FIG. 14A with the virtual camera 1105 that is locked in a 90 degrees position. In this embodiment and when camera is locked, both camera tracking point P'$_x$ and crosshair center 1925 remain fixed in the center of the display.

Figure 22A:
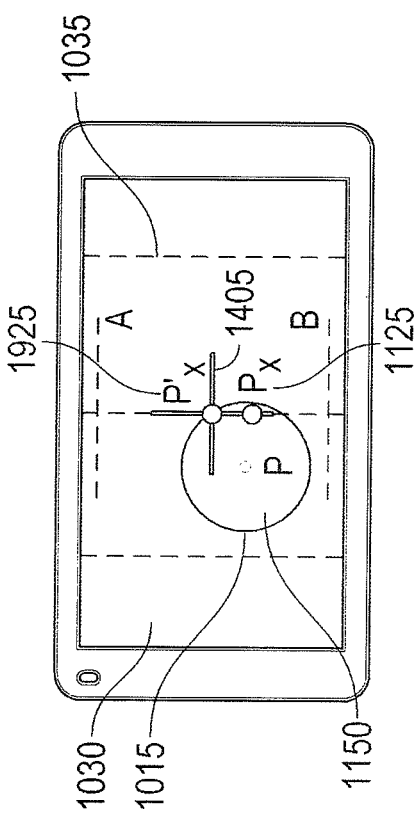
FIG. 22A is a diagram that illustrates how a driver's-eye view projection may be accomplished using a virtual camera in an alternative way for the scenario shown in FIG. 15A.
Figure 22B:
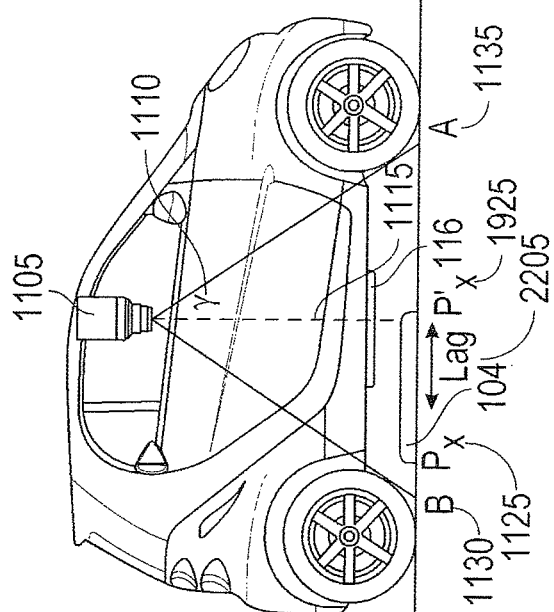
FIG. 22B illustrates how a driver's-eye view is mapped on an exemplary driver interface display in an alternative way for the scenario shown in FIG. 15A.

FIG. 22A is a diagram that illustrates the position of the virtual camera 1105 within the electric vehicle 112 in an alignment zone, corresponding to the scenario shown in FIG. 15A (vehicle is leaving the sweet-spot at the rear). As soon as the difference in distance between P$_x$ 1125 and P'$_x$ 1925 gets larger than a lag length 2205, the virtual camera 1105 becomes unlocked and starts tracking P'$_x$ 1925 with a lag length 2205. FIG. 22B illustrates how a driver's-eye view is mapped on an exemplary driver interface display in the scenario shown in FIG. 16A with a virtual camera tracking a point P'$_x$ 1925 that is lagging P$_x$ 1125.

Figure 23A:
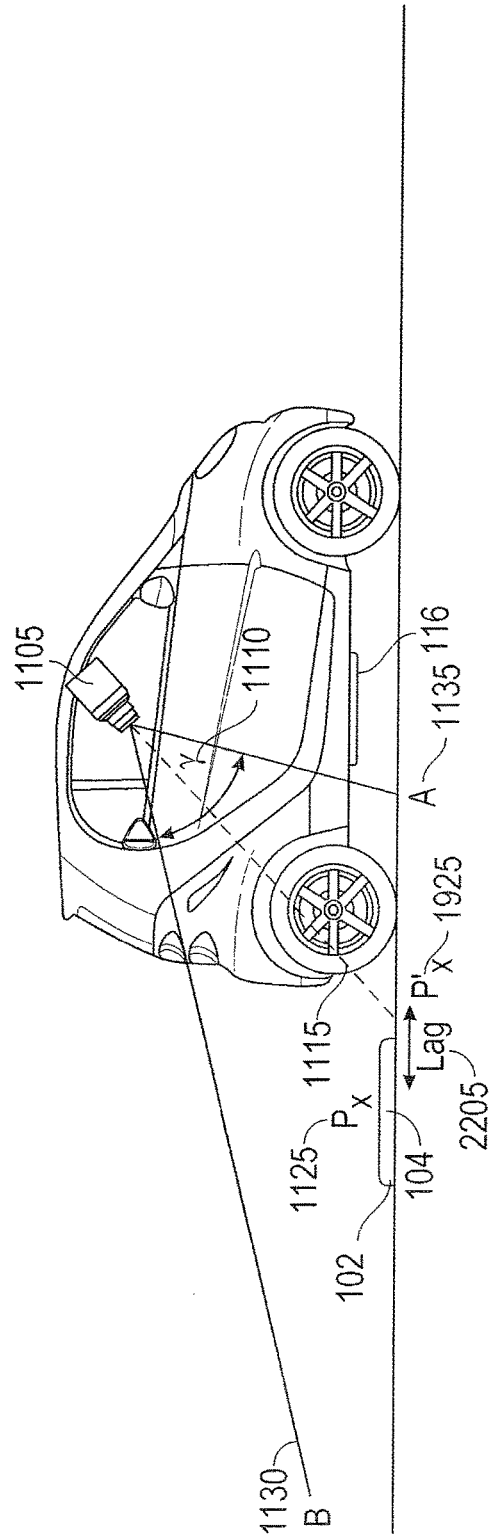
FIG. 23A is a diagram that illustrates how a driver's-eye view projection may be accomplished using a virtual camera in an alternative way for the scenario shown in FIG. 17A.
Figure 23B:
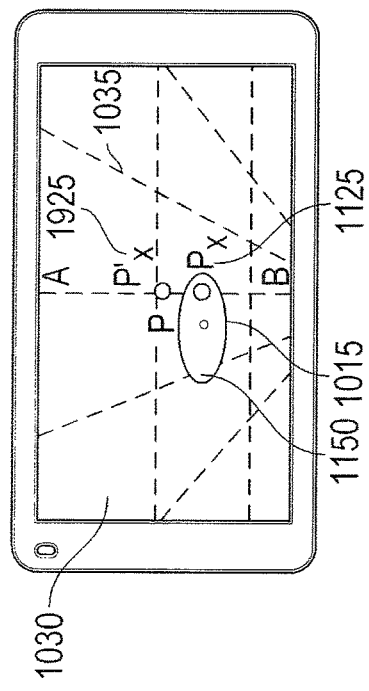
FIG. 23B illustrates how a driver's-eye view is mapped on an exemplary driver interface display in an alternative way for the scenario shown in FIG. 17A.

FIG. 23A is a diagram that illustrates the position of the virtual camera 1105 within the electric vehicle 112 when the electric vehicle 112 is departing from the charging base 102 (scenario shown in FIG. 17A) and the virtual camera 1105 is lagging by the lag length 2205. The increasing camera tilt ($\gamma<90°$) will suggest again a 3D perspective view that is upside-down if the driver's eye view is mapped in the way as shown in FIG. 23B. Alternatively, a rearview mirror view (not shown) may apply.

Figure 24A:
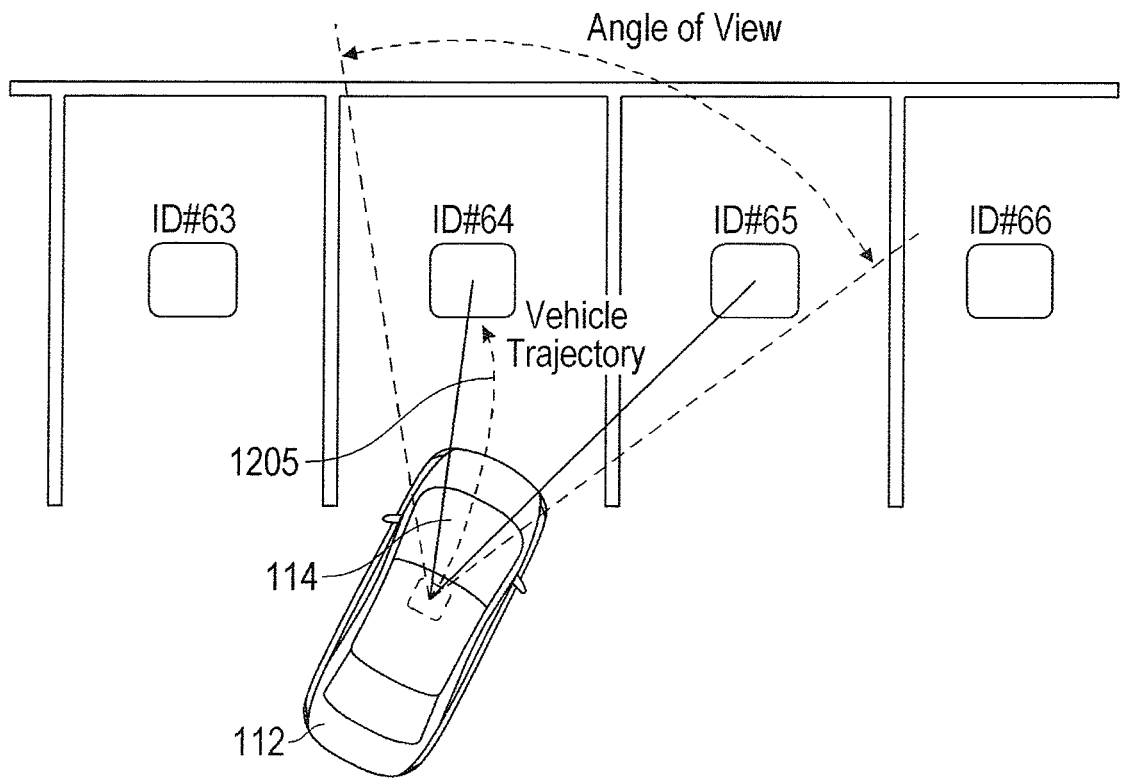
FIG. 24A illustrates an electric vehicle entering a parking stall in a scenario with a plurality of charging bases.
Figure 24B:
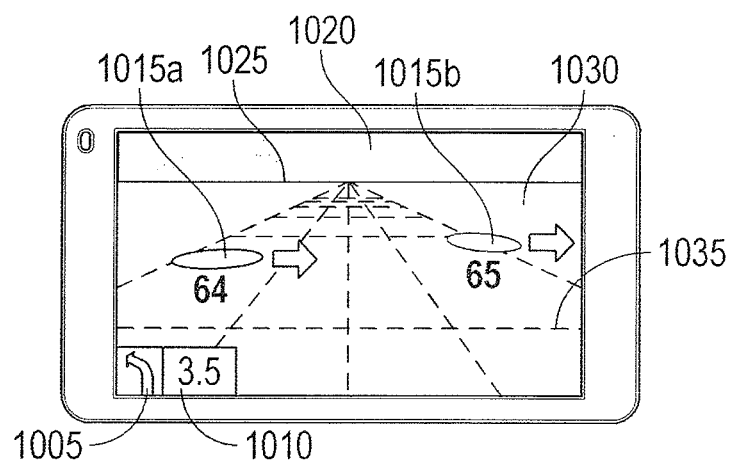
FIG. 24B is a representational screenshot of an exemplary driver interface display, the screenshot corresponding to the scenario of FIG. 24A.

FIG. 24A illustrates a scenario where multiple adjacent parking stalls are equipped with charging bases with exemplary identification numbers (ID #63-66) and the electric vehicle 112 that is about to turn into a desired parking stall. In this embodiment, a guidance system does not know the charging base the driver is going to park his/her vehicle upon. This may be the case if the driver does not know any parking stall number (ID) or if there is a requirement of minimum driver intervention (e.g., no need for the driver to enter a parking stall number when turning in). Such a scenario may require determining a relative position of all charging bases in range of a positioning system. Based on the resulting positions, the system may then instantaneously select those charging spots that are in an angle of view as defined by a virtual camera (e.g., virtual camera 1105) projection and exemplarily illustrated in FIG. 24A. In some embodiments, the virtual camera 1105 may track the nearest of the two spots. FIG. 24B is a representational screenshot of an exemplary driver interface display ("night" display mode) resulting from the angle of view as shown in FIG. 24A. In some aspects, the onboard navigation system of the electric vehicle 112 may mark the two charging bases ID #64 and ID #65 with an identifier (a number, as shown) that may be conveyed by the signals used for positioning, e.g., the magnetic field beacon signals. As the electric vehicle 112 is turning into the parking stall, one of the charging spots 1015 will automatically move out of the display window (1015B, as shown), separating the wanted charging base (ID #64)) from the unwanted charging base (ID #65).

Figure 25A:
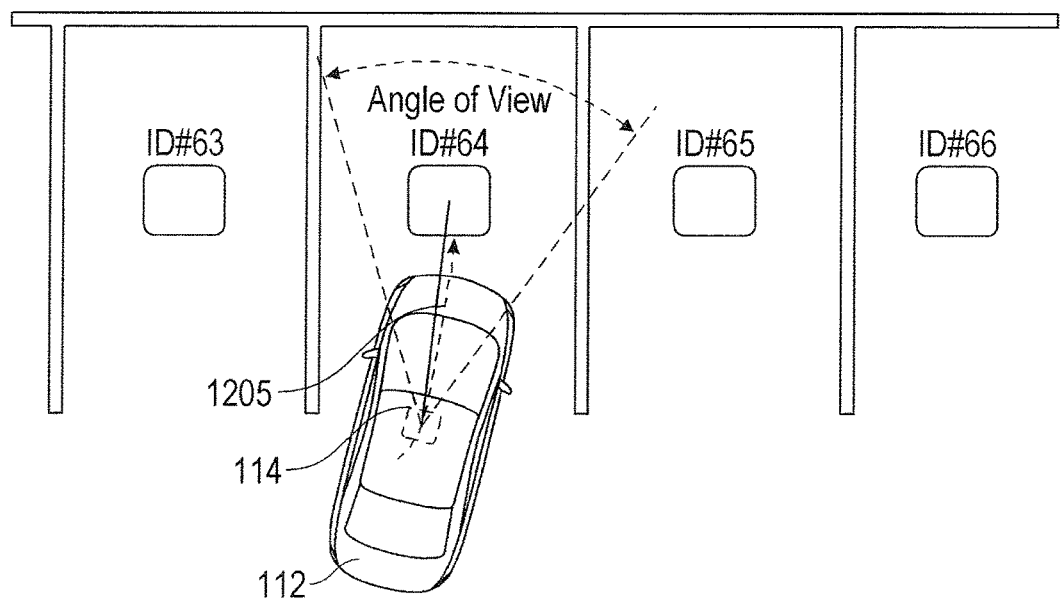
FIG. 25A illustrates an electric vehicle approaching a charging base in a scenario with a plurality of charging bases.
Figure 25B:
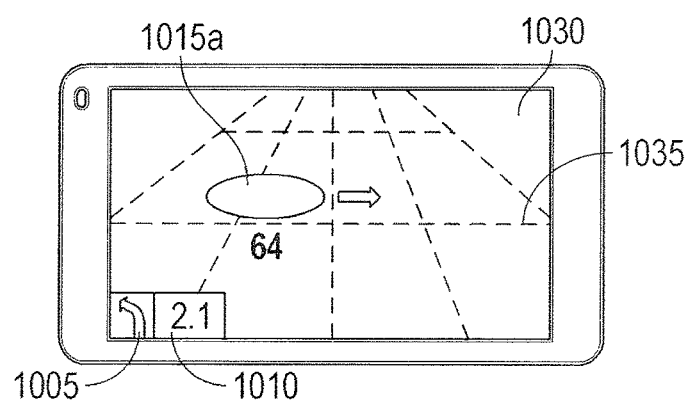
FIG. 25B is a representational screenshot of an exemplary driver interface display, the screenshot corresponding to the scenario of FIG. 25A.

FIG. 25A illustrates a scenario of the electric vehicle 112 as it is further approaching charging base ID #64. In this situation only one charging base. ID #64 may be within angle of view as exemplarily shown in FIG. 25A. FIG. 25B is a representational screenshot of an exemplary driver interface display resulting from the angle of view as shown in FIG. 25A. FIG. 25C illustrates a scenario of the electric vehicle 112 more closely approaching the charging base ID #64 before reaching the sweet spot of charging base ID #64 and a representational screenshot of an exemplary driver interface display as it may result using a virtual camera in one of the methods described above.

Figure 26A:
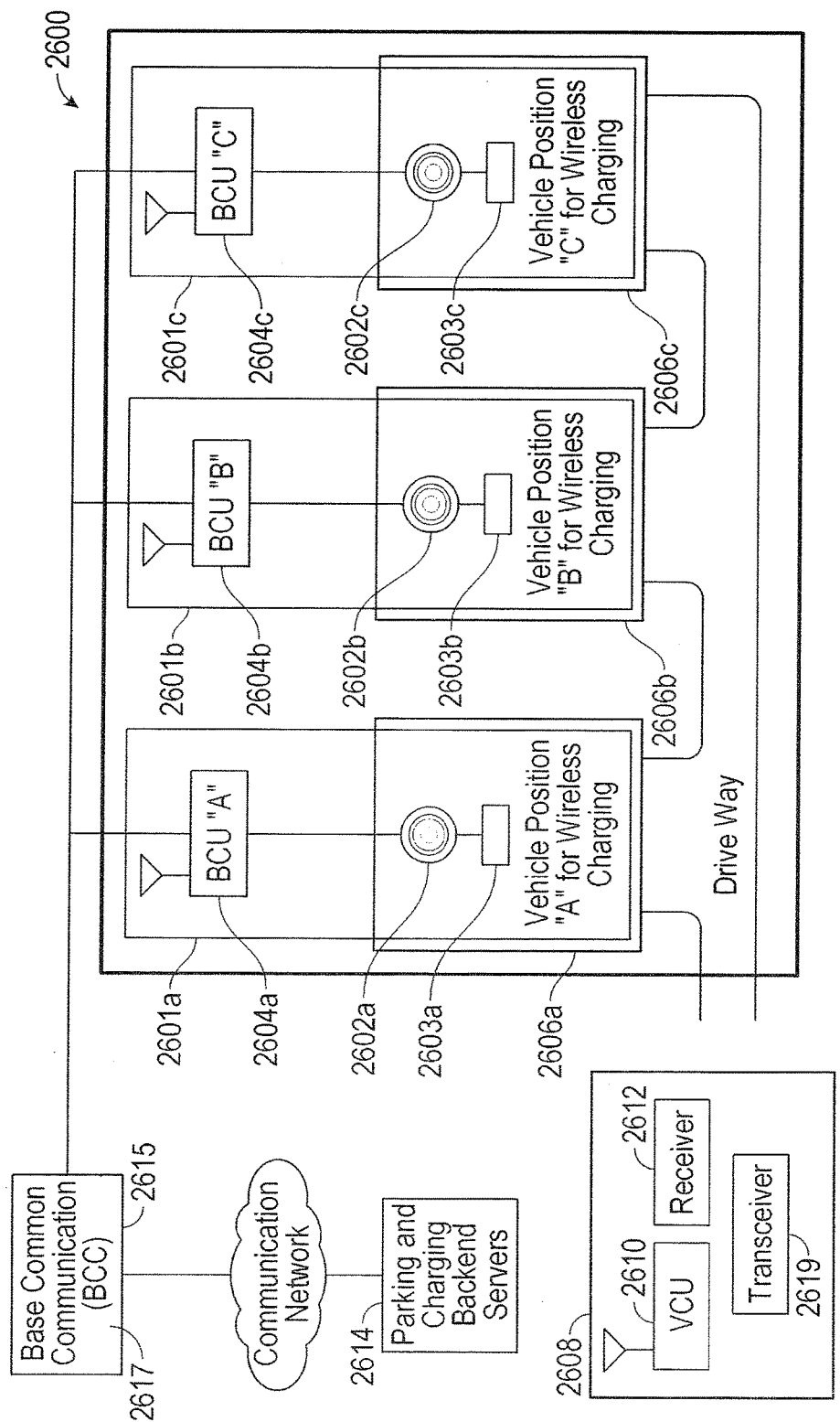
FIG. 26A is a functional block diagram related to communications in an exemplary multi-parking charging system, in accordance with various implementations.

FIG. 26A is a functional block diagram of an example multi-vehicle and multi-parking park and charge system 2600, in accordance with various implementations. The components illustrated in FIG. 26A may be used in the wireless power transfer system 100 of FIG. 1, in accordance with various embodiments. In one embodiment, the park and charge system 2600 may include a plurality of charging bases 2601a-c, each corresponding to one of a plurality of parking spaces 2606a-c, that allow the system 2600 to simultaneously charge a plurality of vehicles, such as an electric vehicle 2608. In some embodiments, each charging base 2601a-c may include a Base Controller Unit (BCU) (e.g., BCUs 2604a-c), a base coupler (e.g., base couplers 2602a-c), and a communication transceiver 2603 (e.g., communication transceivers 2603a-c).

The communication transceiver 2603 can be configured to transmit BCU identification to a vehicle 2608 (e.g., received by a receiver 2612 of the vehicle 2608) that is in a range of reception when the vehicle 2608 is in a location compatible with charging the vehicle 2608 using the BCU corresponding to the transceiver 2603. For example, the transceivers 2603a-c can each transmit a signal (e.g., a beacon signal) comprising the BCU identification and configured to be received by the receiver 2612 of the vehicle 2608. In some aspects, the transceivers 2603a-c may be configured such that the charging base identifier transmitted by a first transceiver 2603a can only be received by a vehicle 2608 that is positioned substantially within a parking space in which the transceiver 2603a is positioned. For example, a vehicle 2608 that is positioned substantially within a parking space in which charging base 2601a is positioned may only be able to receive the charging base identifier from transceiver 2603a but may not be able to receive the charging base identifiers for charging bases 2601b and 2601c. In a non-limiting example, the strength of the transmitted signal from the transceiver 2603a may be at a level sufficient for successful transmission of the charging base identifier to a vehicle 2608 located in a single parking space. In another non-limiting example, the vehicle 2608 receives multiple magnetic field beacon signals transmitted at different frequencies by different neighboring charging bases but it is able to discriminate between the charging bases the vehicle is going to be charged from and other unwanted charging basis. Discriminating beacon signals and charging bases may be performed based on position information, e.g., a distance and an angle between electric vehicle coupler and the charging base that is determined from each of the magnetic field beacon signals for each of the charging bases as explained above and exemplarily illustrated in FIG. 24A. Various communication formats (e.g., RFID, Bluetooth LE, a short range proximity detection technology) are compatible with use for the transceivers 2603a-c and receiver 2612 in accordance with certain embodiments described herein. This communication channel between the BCUs 2604a-c and the vehicle 2608 can be considered to be a type of proximity detector. In certain embodiments in which the BCU 2604 also receives information directly from the vehicle 2608, appropriate transceivers can be used in place of the transceivers 2603 and the receiver 2612.

In some embodiments, the charging base 2601 can be configured to transmit a signal via a magnetic field to a vehicle 2608 (e.g., received by a receiver 2612 of the vehicle 2608) that is in a range of reception when the vehicle 2608 is in a location compatible with charging the vehicle 2608 using the charging base corresponding to the charging base transmitting the signal. For example, the base couplers 2602a-c can each transmit a signal (e.g., a pairing signal) comprising the charging base's identification at a frequency other than each of the other base couplers 2602a-c and configured to be received by the receiver 2612 of the vehicle 2608. In some aspects, the base couplers 2602a-c may be configured such that the charging base identifier transmitted by a first base coupler 2602a can only be received by a vehicle 2608 that is positioned substantially within a parking space in which the base coupler 2602a is positioned. For example, a vehicle 2608 that is positioned substantially within a parking space in which charging base 2601a is positioned may only be able to receive the charging base identifier from base coupler 2602a but may not be able to receive the charging base identifiers for base couplers 2602b and 2602c. In a non-limiting example, the strength of the transmitted signal from the base coupler 2602a may be at a level sufficient for successful transmission of the charging base identifier to a vehicle 2608 located in a single parking space. In another non-limiting example, multiple neighboring base receivers receive a magnetic field beacon signal transmitted by the vehicle 2608. Discrimination of charging bases 2601 may be performed based on position information, e.g., a distance and an angle between the electric vehicle coupler and the base coupler 2602 that is determined by each of the charging bases using the magnetic field beacon signal sent by the vehicle.

In some embodiments, the signal transmitted via a magnetic field by the charging base may be correlated with information transmitted by transceiver 2603 and received by receiver 2612 of vehicle 2608 to identify the charging base.

In some embodiments, the vehicle 2608 receives the signal via magnetic field and establishes a communication link by sending an acknowledging signal via the transceiver 2619 to the base coupler 2602. In another embodiment, the vehicle 2608 sends the acknowledging signal via the magnetic field.

In some embodiments, the base coupler 2602 receives a signal from a transceiver 2619 of the vehicle 2608 and the base coupler 2602 transmits a signal via a magnetic field to the vehicle 2608 in response. The transceiver 2619 may send such a trigger signal based on information received from vehicle sensors. Such sensors may include sensors to detect object near the receiver, magnetic fields, heat, radio frequencies, changes in load, etc. or upon an action of the vehicle driver, e.g., requesting a magnetic field for guidance and alignment from the charging base 2601 when turning into a parking space.

In some embodiments, the magnetic field signal transmit and receive capabilities may be configured to be reciprocal such that the electric vehicle 2608 provides a signal via a magnetic field to the base coupler 2602 and the base coupler 2602 receives the signal. For example, the electric vehicle 2608b can transmit a signal (e.g., a pairing signal) comprising the electric vehicle's identification at a frequency other than a different electric vehicle in the parking area. In some aspects, the electric vehicle 2608 may be configured such that the electric vehicle identifier transmitted by the electric vehicle can only be received by the base coupler 2602a that is positioned substantially within a parking space in which the base coupler 2602a is positioned. For example, the base coupler 2602a that is positioned substantially within a parking space in which charging base 2601a is positioned may only be able to receive the electric vehicle identifier from electric vehicle 2608b but may not be able to receive the electric vehicle identifiers for electric vehicle 2608a. In a non-limiting example, the strength of the transmitted signal from the electric vehicle 2608b may be at a level sufficient for successful transmission of the electric vehicle identifier to a vehicle 2608 located in a single parking space. In another non-limiting example, several neighboring charging bases can receive the vehicle identifier but the system is able to discriminate unwanted charging bases from unwanted using position information, e.g., determined from the magnetic field signal sent by the vehicle.

In some embodiments, the signal transmitted via a magnetic field by the electric vehicle 2608 may be correlated with information transmitted by transceiver 2619 and received by the charging base to identify the electric vehicle.

In some embodiments, the base coupler 2602 receives the signal via magnetic field and establishes a communication link by sending an acknowledging signal via the transceiver 2603 to the vehicle 2608. In another embodiment, the base coupler 2602 sends the acknowledging signal via the magnetic field.

In another embodiment, the vehicle 2608 receives a signal from a transceiver 2603 and the vehicle 2608 transmits a signal via a magnetic field to the base coupler 2602 in response. The transceiver 2603 may send such a trigger signal based on information received from charging base or charging base sensors. Such sensors may include sensors to detect object near the base coupler 2602, magnetic fields, heat, radio frequencies, motion, changes in load, etc. or upon an action of the vehicle driver, e.g., requesting a magnetic field for guidance and alignment from the charging base when turning into a parking space.

The charging bases 2601a-c may communicate with a base common communication (BCC) system 2615 configured to communicate with each of the charging bases 2601a-c and configured to communicate with one or more parking and charging backend servers 2614 via a network 2616. The network 2616 may be any type of communication network such as, for example, the Internet, a wide area network (WAN), a wireless local area network (WLAN), etc. Various communication formats (e.g., Ethernet, RS-485, CAN) are compatible for communication between the BCC system 2615 and the BCUs 2604a-c in accordance with certain embodiments described herein.

The BCC 2615 can comprise a receiver 2617 configured to communicate with a transceiver 2619 of the vehicle 2608, as described more fully below. Various communication formats (e.g., DSRC, Bluetooth LE, WiFi) are compatible for communication between the BCC system 2615 and the vehicle 2608 (via the receiver 2617 and the transceiver 2619) in accordance with certain embodiments described herein. In certain embodiments in which the BCC 2615 also transmits information to the vehicle 2608, an appropriate transceiver can be used in place of the receiver 2617.

In some embodiments, each charging base 2601a-c can correspond to the base wireless charging system 302, discussed above with respect to FIG. 3. For example, the charging bases 2601a-c may correspond to the base controller 342, the base couplers 2602a-c may correspond to the base coupler 304, and each charging base 2601a-c may include the base communication system 372. In other embodiments, the charging system 2600 may include one or more base wireless charging systems 302, which can each include a plurality of each system component such as the base controller 342, and the base coupler 304. In various embodiments, the transceivers 2603a-c can be placed curbside, on the ground next to the base couplers 2602a-c, and/or integrated directly into the base coupler 2602a. The charging bases 2601a-c can include multiple transmitters.

In some embodiments, the plurality of parking spaces 2606a-c are each marked with a space indicator, such as a letter or a number. For example, a sign of a charging base may be provided on the parking space so as to allow a driver to identify the corresponding charging base 2601. As shown in FIG. 26A, the parking space 2606a, corresponding to the charging base 2601a, the BCU 2604a, and the base coupler 2602a, may be marked with a space indicator "A." The parking space 2606b, corresponding to the charging base 2601b, the BCU 2604b, and the base coupler 2602b, may be marked with a space indicator "B." The parking space 2606c, corresponding to the charging base 2601c, the BCU 2604c, and the base coupler 2602c, may be marked with a space indicator "C." The space indicators may assist a user to identify available charging bases 2601a-c in the parking and charging system 2600.

The electric vehicle 2608 may include a Vehicle Controller Unit (VCU) 2610, a receiver 2612, and a transceiver 2619. In an embodiment, the electric vehicle 2608 can be the electric vehicle 112 (FIG. 1). The electric vehicle 2608 can include the electric vehicle charging system 314, described above with respect to FIG. 3. For example, the VCU 2610 may correspond to the electric vehicle controller 344, and the electric vehicle 2608 can include the electric vehicle communication system 374. The electric vehicle 2608 may include multiple receivers, transmitters, and/or transceivers.

The electric vehicle communication system 374 may be used to communicate with one or more of a plurality of base communication systems 372 located within each of the charging bases 2601a-c in the park and charge system 2600. As discussed above, with respect to FIG. 3, the electric vehicle communication system 374 can communicate with the base communication system 372 by any wireless communication system such as Dedicated Short-Range Communications (DSRC), IEEE 702.11x (e.g., WiFi), Bluetooth, zigbee, cellular, etc. and by signals via magnetic field provided by WPT couplers 304 and 316. Accordingly, in some embodiments, the electric vehicle communication system 374 can act as a base station to which the base communication system 372 can connect. In other embodiments, each base communication system 372 can act as a base station to which the electric vehicle communication system 374 can connect.

Figure 26B:
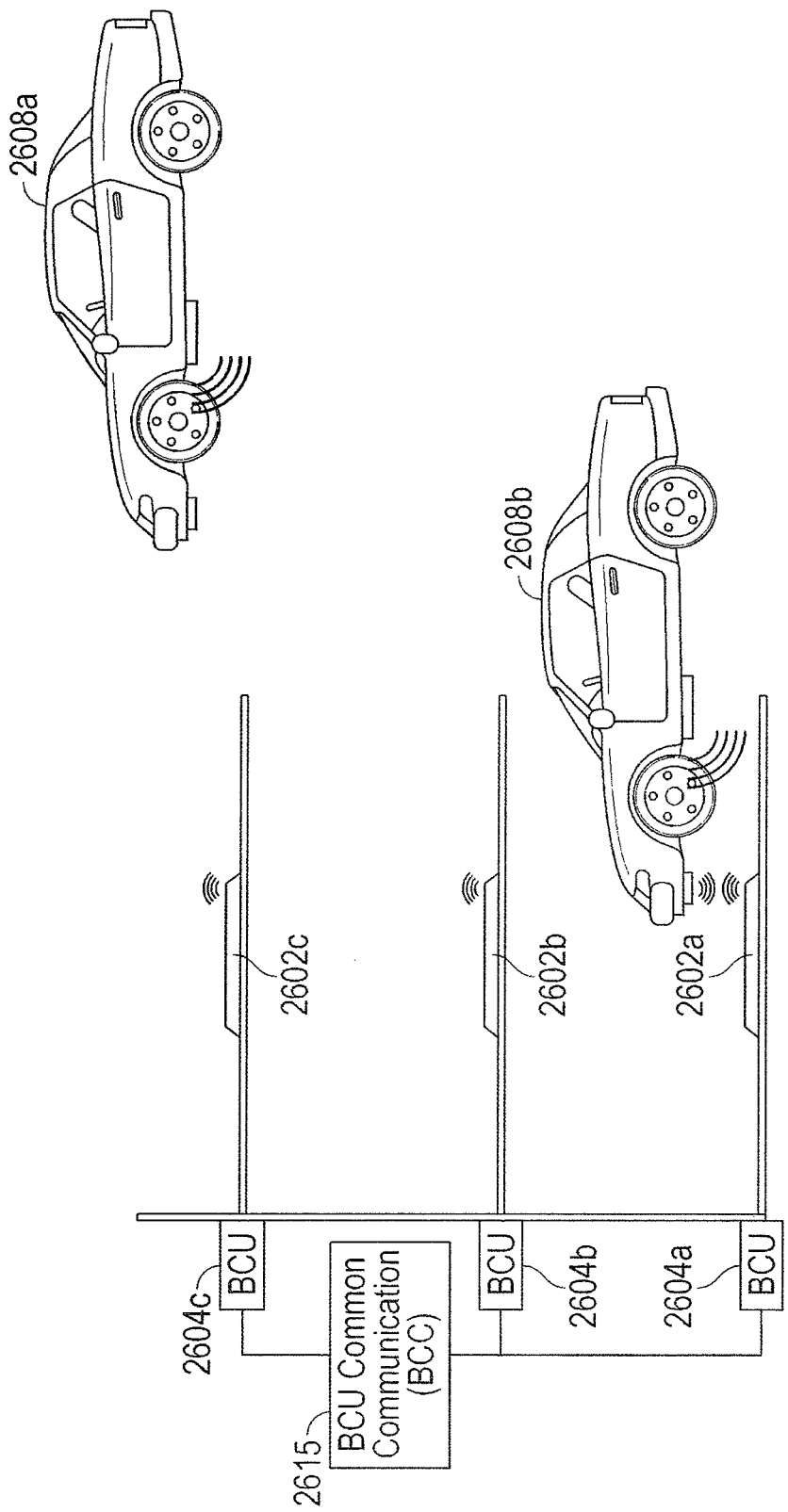
FIG. 26B schematically illustrates an example sequence of communications between the base common communication (BCC), the base controller units (BCUs), and the vehicle, in accordance with certain embodiments described herein.

FIG. 26B schematically illustrates an example configuration with communication between the base coupler 2602 and the vehicle 2608 in accordance with certain embodiments described herein. Prior to the electric vehicle 2608 (e.g., vehicle 2608a) entering the parking and charging system 2600 with the plurality of BCUs 2604a-c, a communication link (denoted by diamond labeled "1" in FIG. 26B) can be established between the vehicle 2608 and the base coupler 2602. The charging base 2601 can transmit, via the base coupler 2602 or via one or more additional coils, a signal via a magnetic field at an intensity level lower than the intensity level for wireless power transmission. For example, in an aspect, the base coupler 2602 may be configured to provide wireless power and the signal via a magnetic field. In another aspect, the base coupler 2602 may be configured to provide wireless power, while the charging base 2601 further comprises one or more additional coils (e.g., integrated within the housing or substantially coplanar with the coil of the base coupler 2602, and the like that are configured to provide the signal. The signal can be provided at a frequency other than a frequency for wireless power transmission. To separate the signal transmission of the charging base 2601 a from the signal transmissions of other charging bases, the signal can be modulated based on a variation of the magnetic field. For example, when the variation is a frequency division scheme, the signal frequencies may be assigned fixed or dynamically on a temporary basis in a separate frequency that is offset from the wireless power transmission operating frequency by at least 10 kHz to avoid interference between the signal and the wireless power transfer and interference between multiple signals. The vehicle 2606 can receive the signal to identify the charging base 2601 and establish a communication link with the charging base to pair with the charging base. The charging base 2601 can also be identified by correlating the signal with information received by the transceiver 2619.

In certain embodiments, a communication link can be established between the vehicle 2608 and the base coupler 2602. The vehicle 2608 can transmit, via the electric vehicle coupler 316 (shown in FIG. 3) or other coils, a signal via a magnetic field at an intensity level lower than the intensity level for wireless power transmission. The signal can be provided at a frequency other than a frequency for wireless power transmission. To separate the signal transmission of vehicle 2608a from the signal transmissions of other vehicles, the signal can be modulated based on a variation of the magnetic field. For example, when the variation is a frequency division scheme, the signal frequencies may be assigned fixed or dynamically on a temporary basis in a separate frequency that is offset from the wireless power transmission operating frequency by at least 10 kHz to avoid interference between the signal and the wireless power transfer and interference between multiple signals. The charging base can receive the signal to identify the vehicle 2608 and establish a communication link with the vehicle to pair with the charging base. The vehicle can also be identified by correlating the signal with information received by the transceiver 2603.

In another embodiment, the charging base can also receive a signal from the transceiver 2619 indicating that the electric vehicle 2608 is in proximity to the charging base. In this embodiment, the charging base can transmit a signal via a magnetic field in response. For example, the vehicle load detecting sensor may detect that the charging base is in proximity to the electric vehicle. The transceiver 2619 can then send a signal via a radio frequency to the transceiver 2603 indicating that the vehicle is in proximity to the charging base. The charging base can then receive and analyze this information and send a signal via a magnetic field to identify the charging base and begin the process of establishing a communication link and pairing the electric vehicle 2608 to the charging base as described above.

In another embodiment, the vehicle 2608 can also receive a signal from the transceiver 2603 indicating that the charging base is in proximity to the vehicle 2608. In this embodiment, the vehicle can transmit a signal via a magnetic field in response. For example, the charging base motion detector sensor may detect that the electric vehicle is in proximity to the charging base. The transceiver 2603 can then send a signal via a radio frequency to the transceiver 2619 indicating that the vehicle is in proximity to the charging base. The electric vehicle 2608 can then receive and analyze this information and send a signal via a magnetic field to identify the electric vehicle 2608 and begin the process of establishing a communication link and pairing the electric vehicle 2608 to the charging base as described above.

In another embodiment, pairing may take place already when the vehicle turns into a parking space when the electric vehicle coupler is in the vicinity of the charging base (approach phase). This may be possible when additional relative position information, e.g., distance and a direction is used and as soon as the system can unambiguously identify the charging base the vehicle is approaching. Position information may be derived from the magnetic field beacon signal by determining the X, Y, Z directional components of the magnetic field using an appropriate sensor system.

When the electric vehicle 2608 enters the park and charge system 2600 with the plurality of available charging bases 2601a-c, a driver of the vehicle 2608 is able to identify one or more of the charging bases 2601 (e.g., the charging base 2601 comprising the BCU 2604 scheduled to charge the vehicle 2608). In one embodiment, the driver of a vehicle 2608 may visually identify the parking spaces 2606 using, for example, the space indicators as described above. Thus, a driver of the vehicle 2608 may navigate within the parking facility to find the available (e.g., assigned, scheduled, or reserved) charging base 2601 for providing energy to charge the electric vehicle 2608. When the vehicle 2608 approaches the parking space 2606, or once the vehicle 2608 is parked in the parking space 2606, the charging base 2601 may attempt to pair via the magnetic field beacon signal described above with the vehicle 2608 which is now within communication range.

Once a communication link is established between the electric vehicle 2608 and the charging base 2601 corresponding to appropriate parking space 2606, the communication link can be used for one or more of: electric vehicle guidance, electric vehicle alignment, charging control, status communication, authorization and/or identification, payment management, etc.

Figure 27:
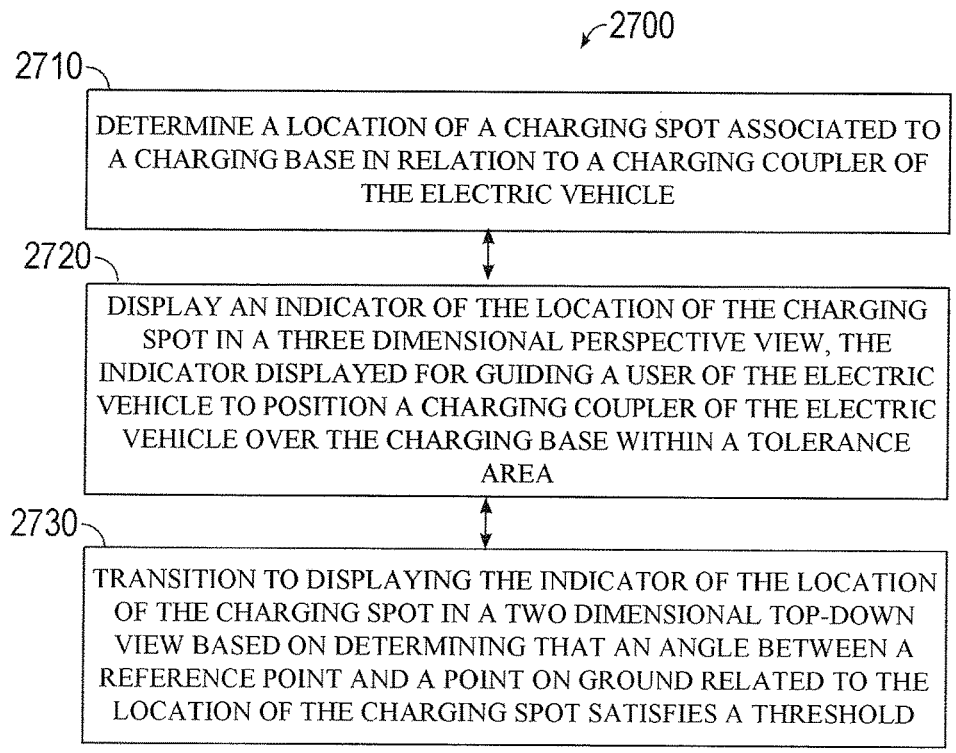
FIG. 27 illustrates a flowchart of an exemplary method of guiding an electric vehicle, in accordance with certain embodiments described herein.

FIG. 27 is a flowchart of an exemplary method 2700 of guiding the electric vehicle 112, in accordance with certain embodiments described herein. Although the method 2700 is described herein with reference to the electric vehicle 112 and multi-vehicle and multi-parking park and charge system 2600, discussed above with respect to FIGS. 26A and 26B, a person having ordinary skill in the art will appreciate that the method 2700 may be implemented by other suitable devices and systems. For example, the method 2700 may be performed by a processor or controller such as, for example, the VCU 2610 (FIG. 26A). Although the method 800 is described herein with reference to a particular order, in various embodiments, blocks herein may be performed in a different order, or omitted, and additional blocks may be added.

In an operational block 2710 of the method 2700, the method comprises determining a location of a charging spot associated to a charging base in relation to a charging coupler of the electric vehicle. In an operational block 2720 of the method 2700, the method comprises displaying an indicator of the location of the charging spot in a three dimensional perspective view, the indicator displayed for guiding a user of the electric vehicle to position a charging coupler of the electric vehicle over the charging base within a tolerance area. The tolerance area may correspond to the area of the charging spot. In an operational block 2730 of the method 2700, the method comprises transitioning to displaying the indicator of the location of the charging spot in a two dimensional top-down view based on determining that an angle between a reference point and a point on ground related to the location of the charging spot satisfies a threshold.

Figure 28:
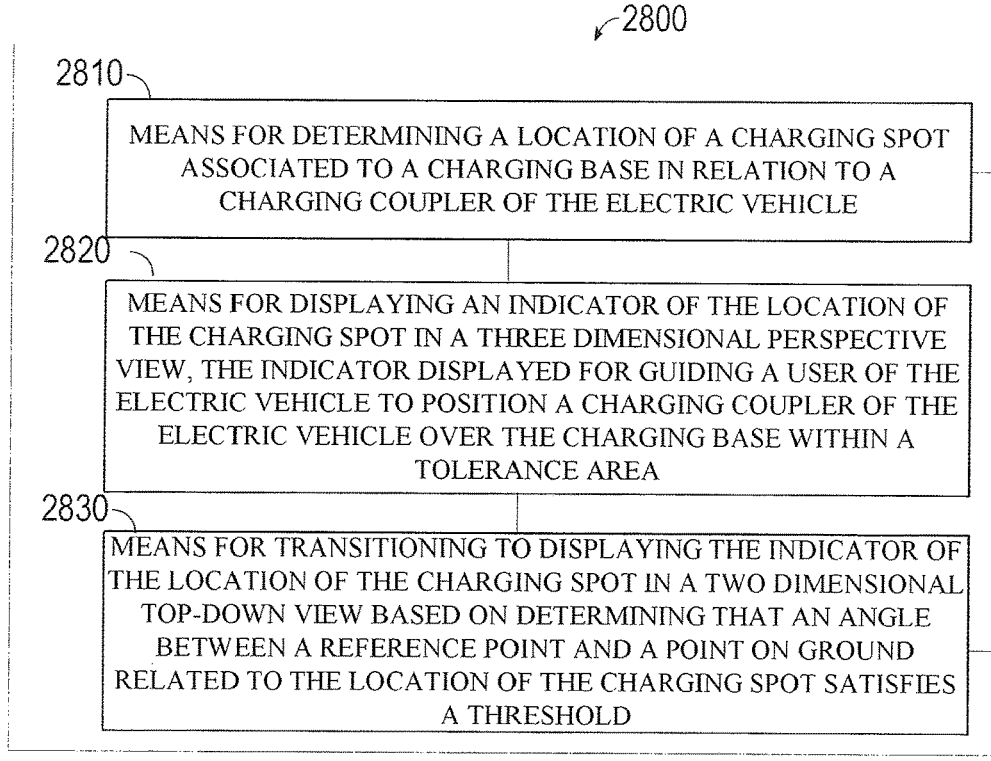
FIG. 28 is a functional block diagram of an apparatus for guiding an electric vehicle, in accordance with certain embodiments described herein.

FIG. 28 is a functional block diagram of an apparatus 2800 for guiding an electric vehicle, in accordance with certain embodiments described herein. Those skilled in the art will appreciate that the apparatus 2800 may have more components than the simplified block diagram shown in FIG. 28. FIG. 28 includes only those components useful for describing some prominent features of implementations within the scope of the claims.

The apparatus 2800 comprises means 2810 for determining a location of a charging spot associated to a charging base in relation to a charging coupler of the electric vehicle. In certain embodiments, the means 2810 for determining a location can be implemented using magnetic field sensors. In certain embodiments, the means 2810 for determining a location can be configured to perform one or more of the function described in operation block 2710 of method 2700 (FIG. 27). The apparatus 2800 further comprises means 2820 for displaying an indicator of the location of the charging spot in a three dimensional perspective view, the indicator displayed for guiding a user of the electric vehicle to position a charging coupler of the electric vehicle over the charging base within a tolerance area. The tolerance area may correspond to the area of the charging spot. In certain embodiments, the means 2820 for displaying comprises a user interface display screen. In certain embodiments, the means 2820 for displaying can be configured to perform one or more of the function described in operation block 2720 of method 2700 (FIG. 27). The apparatus 2800 further comprises means 2830 for transitioning to displaying the indicator of the location of the charging spot in a two dimensional top-down view based on determining that an angle between a reference point and a point on ground related to the location of the charging spot satisfies a threshold. In certain embodiments, the means 2830 for transitioning comprises a processor. In certain embodiments, the means 2830 for transitioning can be configured to perform one or more of the function described in operation block 2730 of method 2700 (FIG. 27).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device for guiding an electric vehicle, comprising:
   a sensor circuit configured to determine a location of a charging spot associated with a charging base in relation to a charging coupler of the electric vehicle; and
   a processor configured to:
      display a virtual indicator of the location of the charging spot in a display of a graphical user interface in a virtual three dimensional perspective view of a virtual environment as observed from a first reference point located within the electric vehicle above the charging coupler such that a second reference point on a ground surface of the virtual environment and on a longitudinal axis of the electric vehicle is mapped onto a point in the display, the second reference point representing a point at a distance from a third reference point that is a projection of a center of the charging spot onto the longitudinal axis;
      adjust, as the electric vehicle moves, the virtual three dimensional perspective view such that the mapped second reference point is maintained in the display; and
      transition to displaying the virtual indicator of the location of the charging spot in a virtual two dimensional top-down view based on determining that an angle between a line running through the first and second reference points and a plane parallel to the ground surface satisfies an angle threshold.

2. The device of claim 1, wherein the processor is further configured to display:
   a representation of a local environment floor plan; and
   a route of the electric vehicle to the location of the charging spot.

3. The device of claim 1, wherein the processor is further configured to display an identifier of the charging base.

4. The device of claim 1, wherein the virtual environment comprises one or more of:
   a ground representation;
   a coordinate grid;
   a number display indicating a distance from the charging spot; and
   a direction display indicating a direction for correction based upon the location of the charging spot.

5. The device of claim 4, wherein the virtual environment further comprises a sky representation and a horizon representation.

6. The device of claim 4, wherein the virtual three dimensional perspective view comprises a display of the virtual environment by a virtual camera positioned at the first reference point and aimed at the location of the charging spot.

7. The device of claim 4, wherein the virtual three dimensional perspective view comprises a display of the virtual environment by a virtual camera positioned within the electric vehicle and above the charging coupler of the electric vehicle, the virtual camera aimed at a projected location of the charging spot on the longitudinal axis.

8. The device of claim 4, wherein the virtual environment further comprises an indicator of a suggested trajectory for the electric vehicle to the charging spot.

9. The device of claim 4, wherein the virtual three dimensional perspective view comprises a display of the virtual environment by a virtual camera positioned directly above the charging coupler of the electric vehicle for tracking an x-position of the charging spot.

10. The device of claim 1, wherein the processor is further configured to display a second virtual environment wherein the virtual two dimensional top-down view comprises one or more of:
   a ground representation;
   a cross-hair display indicating a center position of the charging coupler of the electric vehicle;
   a number display indicating a distance from the charging spot; or
   a direction display indicating a direction for correction based upon the location of the charging spot.

11. The device of claim 1, wherein the processor is further configured to transition from displaying the virtual indicator in the virtual two dimensional top-down view to displaying the virtual indicator of the location of the charging spot in a third view when the angle between the line running through the first and second reference points and the plane parallel to the ground surface satisfies an second angle threshold, the third view including an upside-down view.

12. The device of claim 11, wherein the third view includes an icon indicating that the location of the charging spot has satisfied the second angle threshold.

13. The device of claim 11, wherein the processor is further configured to transition from displaying the virtual indicator in the third view to displaying the virtual indicator of the location of the charging spot in a fourth view when the angle between the line running through the first and second reference points and the plane parallel to the ground surface satisfies a third angle threshold, the fourth view including an upside-down view of the virtual three dimensional perspective view or an icon indicating that the location of the charging spot has satisfied the third threshold.

14. The device of claim 1, wherein the processor is further configured to display a night representation when a time of day satisfies a threshold.

15. The device of claim 1, wherein the senior circuit is further configured to determine a location of a first charging spot of a first charging base and a second charging spot of a second charging base in response to being positioned to be able to detect a signal from both the first and second charging bases, and wherein the processor is further configured to display an indicator of the determined locations of the first aid second charging spots relative to the charging coupler of the electric vehicle.

16. The device of claim 15, wherein the processor is configured to dynamically remove the virtual indicator of the location of one of the first or second charging spots when the location of the first or second charging spots is no longer located within a field of view.

17. The device of claim 1, wherein the virtual indicator is displayed for guiding a user of the electric vehicle to position the charging coupler of the electric vehicle over the charging base within a tolerance area comprising an area where a coupling efficiency between the charging coupler of the electric vehicle and a charging coupler of the charging base satisfies a threshold value.

18. A method of guiding an electric vehicle comprising:
   determining a location of a charging spot associated to a charging base in relation to a charging coupler of the electric vehicle;
   displaying a virtual indicator of the location of the charging spot in a display of a graphical user interface in a virtual three dimensional perspective view of a virtual environment as observed from a first reference point located within the electric vehicle above the charging coupler such that a second reference point on a ground surface of the virtual environment and on a longitudinal axis of the electric vehicle is mapped onto a first point in the display, the second reference point representing a second point at distance from a third reference point that is a projection of a center of the charging spot onto the longitudinal axis;
   adjusting, as the electric vehicle moves, the virtual three dimensional perspective view such that the mapped second reference point is maintained in the display; and
   transitioning to displaying the virtual indicator of the location of the charging spot in a virtual two dimensional top-down view based on determining that an angle between a line running through the first and second reference points and a plane parallel to the ground surface satisfies an angle threshold.

19. The method of claim 18, wherein the virtual environment comprises one or more of:
   a ground representation;
   a coordinate grid;
   a number display indicating a distance from the charging spot; and
   a direction display indicating a direction for correction based upon the location of the charging spot.

20. The method of claim 18, wherein the virtual three-dimensional perspective view comprises a display of the virtual environment by a virtual camera positioned at a reference point and aimed at the location of the charging spot.

21. The method of claim 18, further comprising transitioning from displaying the virtual indicator in the virtual two dimensional top-down view to displaying the virtual indicator of the location of the charging spot in a third view when the angle between the line running through the first and second reference points and the plane parallel to the ground surface satisfies a second angle threshold, the third view comprising an upside-down view of the two dimensional top-down view.

22. The method of claim 18, further comprising displaying an identifier of the charging base.

23. An apparatus for guiding an electric vehicle comprising:
   means for determining a location of a charging spot associated to a charging base in relation to a charging coupler of the electric vehicle; and
   means for displaying a virtual indicator of the location of the charging spot in a display of a graphical user interface in a virtual three dimensional perspective view of a virtual environment as observed from a first reference point located within the electric vehicle above the charging coupler such that a second reference point on a ground surface of the virtual environment and on a longitudinal axis of the electric vehicle is mapped onto a point in the display, the second reference point representing point at a distance from a third reference point that is a projection of a center of the charging spot onto the longitudinal axis;

means for adjusting, as the electric vehicle moves, the virtual three-dimensional perspective view such that the mapped second reference point is maintained in a display axis; and means for transitioning to displaying the virtual indicator of the location of the charging spot in a two dimensional top-down view based on determining that an angle between a line running through the first and second reference points and a plane parallel to the ground surface satisfies an angle threshold.

24. The apparatus of claim 23, wherein the virtual environment comprises one or more of:
a ground representation;
a coordinate grid;
a number display indicating a distance from the charging base; and
a direction display indicating a direction for correction based upon the location of the charging spot.

25. The apparatus of claim 23, further comprising means for transitioning from displaying the virtual indicator in the virtual two dimensional top-down view to displaying the virtual indicator of the location of the charging spot in a third view when the angle between the line running through the first and second reference points and the plane parallel to the ground surface satisfies an angle threshold, the third view comprising an upside-down view of the two dimensional top-down view.

26. The apparatus of claim 25, further comprising means for transitioning from displaying the virtual indicator in the third view to displaying the virtual indicator of the location of the charging spot in a fourth view when the angle between the line running through the first and second reference points and the plane parallel to the ground surface satisfies an angle threshold, the fourth view including an upside-down view of the three dimensional perspective view or an icon indicating that the location of the charging spot has satisfied the third threshold.

27. A device for guiding an electric vehicle, the device comprising:
a sensor system configured to determine a location of a charging spot associated to a charging base in relation to a charging coupler of the electric vehicle; and
a processor configured to:
display a virtual indicator of the location of the charging spot in a display of a graphical user interface in a virtual environment as observed from a first reference point located within the electric vehicle above the charging coupler such that a second reference point on a ground surface of the virtual environment and on a longitudinal axis of the electric vehicle is mapped onto a point in the display, the second reference point representing a point at a distance from a third reference point that is a projection of a center of the charging spot onto the longitudinal axis;
adjust, as the electric vehicle moves, the virtual three-dimensional perspective view such that the mapped second reference point is maintained in the display; and
transition to displaying the virtual indicator of the location of the charging spot and a cross-hair icon in the virtual two dimensional top-down view based on determining that an angle between a line running through the first and second reference point and a plane parallel to the ground surface satisfies an angle threshold, the cross-hair icon representing a center position of the charging coupler of the electric vehicle and displayed in a fixed position relative to the virtual indicator.

28. The device of claim 1, wherein the angle between the line running through the first and second reference points and the plane parallel to the ground surface satisfies an angle threshold changes as the electric vehicle moves.

29. The device according to claim 1, wherein the point in the display is located in a center of the display.

30. The device according to claim 1, wherein the distance from the second reference point to the third reference point is zero.

31. The device according to claim 1, wherein the processor is configured to adjust the virtual three dimensional perspective view based or the angle between the line running through the first and second reference points and the plane parallel to the ground surface.

32. The method according to claim 18, wherein the point in the display is located in a center of the display.

33. The method according to claim 18, herein the distance from the second reference point to the third reference point is zero.

34. The method according to claim 18, further comprising adjusting the virtual three dimensional perspective view based on the angle between the line running through the first and second reference points and the plane parallel to the ground surface.

* * * * *